(12) United States Patent
Raza et al.

(10) Patent No.: US 10,554,582 B2
(45) Date of Patent: *Feb. 4, 2020

(54) SYSTEM INCLUDING MANAGEMENT SYSTEM TO DETERMINE CONFIGURATION FOR INTER-NETWORKING DEVICE BASED ON PHYSICAL LAYER INFORMATION OF A NETWORK

(71) Applicant: CommScope Technologies LLC, Hickory, NC (US)

(72) Inventors: Mohammad H. Raza, Hopkinton, MA (US); Kamlesh G. Patel, Chanhassen, MN (US); John P. Anderson, Eden Prairie, MN (US); Joseph C. Coffey, Burnsville, MN (US); Michael Day, St. Louis Park, MN (US); Hutch Coburn, Eden Prairie, MN (US); David Stone, Irvine, CA (US)

(73) Assignee: CommScope Technolgies LLC, Hickory, NC (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/673,050

(22) Filed: Aug. 9, 2017

(65) Prior Publication Data
US 2017/0366475 A1    Dec. 21, 2017

Related U.S. Application Data

(60) Continuation of application No. 14/614,039, filed on Feb. 4, 2015, now Pat. No. 9,742,696, which is a
(Continued)

(51) Int. Cl.
*H04L 12/933* (2013.01)
*H01R 13/66* (2006.01)
(Continued)

(52) U.S. Cl.
CPC ......... *H04L 49/15* (2013.01); *H01R 13/6658* (2013.01); *H01R 24/64* (2013.01);
(Continued)

(58) Field of Classification Search
None
See application file for complete search history.

(56) References Cited

U.S. PATENT DOCUMENTS

| 5,052,940 A | 10/1991 | Bengal |
| 5,161,988 A | 11/1992 | Krupka |

(Continued)

FOREIGN PATENT DOCUMENTS

| CN | 1322356 A | 11/2001 |
| CN | 1622555 A | 6/2005 |

(Continued)

OTHER PUBLICATIONS

Farkas et al., "Automatic Discovery of Physical Topology in Ethernet Networks", "Advance Information Networking and Applications, 2008. AINA 2008. 22nd International Conference on", Mar. 25-28, 2008, pp. 848-854, Publisher: IEEE, Published in: Okinawa.

(Continued)

*Primary Examiner* — Angela Nguyen
(74) *Attorney, Agent, or Firm* — Fogg & Powers LLC

(57) ABSTRACT

One exemplary embodiment is directed to a system comprising a switch used in a network and a central function configured to receive physical layer information related to the network. The physical layer information includes information associating media access control (MAC) addresses of devices on the network with ports of the switch. The switch is configured to use information about a spanning tree determined by the central function to configure the switch to carry out a switching function performed by the switch. The central function is configured to use at least some physical (Continued)

layer information about patching equipment in the network and end devices in the network in associating MAC addresses of devices on the network with the ports of the switch. Other embodiments are disclosed.

18 Claims, 23 Drawing Sheets

Related U.S. Application Data division of application No. 12/705,506, filed on Feb. 12, 2010, now Pat. No. 9,491,119.

(60) Provisional application No. 61/152,624, filed on Feb. 13, 2009.

(51) Int. Cl.
*H01R 24/64* (2011.01)
*H04L 12/24* (2006.01)
*H04L 29/08* (2006.01)
*H04L 12/721* (2013.01)
*H04L 12/931* (2013.01)

(52) U.S. Cl.
CPC .............. *H04L 41/12* (2013.01); *H04L 41/22* (2013.01); *H04L 41/24* (2013.01); *H04L 41/26* (2013.01); *H04L 45/66* (2013.01); *H04L 49/351* (2013.01); *H04L 67/16* (2013.01)

(56) References Cited

U.S. PATENT DOCUMENTS

| | | |
|---|---|---|
| 5,195,902 A | 3/1993 | Bengal |
| 5,299,944 A | 4/1994 | Larabell et al. |
| 5,394,503 A | 2/1995 | Dietz et al. |
| 5,418,334 A | 5/1995 | Williams |
| 5,420,512 A | 5/1995 | Spillane et al. |
| 5,448,675 A | 9/1995 | Leone et al. |
| 5,461,693 A | 10/1995 | Pimpinella |
| 5,463,706 A | 10/1995 | Dumont et al. |
| 5,473,715 A | 12/1995 | Schofield et al. |
| 5,483,467 A | 1/1996 | Krupka et al. |
| 5,487,666 A | 1/1996 | DiGiovanni |
| 5,522,737 A | 6/1996 | Brunker et al. |
| 5,541,586 A | 7/1996 | Wise |
| 5,550,755 A | 8/1996 | Martin et al. |
| 5,606,664 A | 2/1997 | Brown et al. |
| 5,649,001 A | 7/1997 | Thomas et al. |
| 5,764,043 A | 6/1998 | Czosnowski et al. |
| 5,832,071 A | 11/1998 | Voelker |
| 5,854,824 A | 12/1998 | Bengal et al. |
| 5,876,240 A | 3/1999 | Derstine et al. |
| 5,909,464 A | 6/1999 | Cohen et al. |
| 5,910,776 A | 6/1999 | Black |
| 6,002,331 A | 12/1999 | Laor |
| 6,222,908 B1 | 4/2001 | Bartolutti et al. |
| 6,223,219 B1 | 4/2001 | Uniacke et al. |
| 6,234,830 B1 | 5/2001 | Ensz et al. |
| 6,238,235 B1 | 5/2001 | Shavit et al. |
| 6,240,090 B1 | 5/2001 | Enhager |
| 6,285,293 B1 | 9/2001 | German et al. |
| 6,300,877 B1 | 10/2001 | Schannach et al. |
| 6,307,880 B1 | 10/2001 | Evans et al. |
| 6,330,307 B1 | 12/2001 | Bloch et al. |
| 6,350,148 B1 | 2/2002 | Bartolutti et al. |
| 6,359,859 B1 | 3/2002 | Brolin et al. |
| 6,368,155 B1 | 4/2002 | Bassler et al. |
| 6,424,710 B1 | 7/2002 | Bartolutti et al. |
| 6,442,032 B1 | 8/2002 | Linares et al. |
| 6,499,861 B1 | 12/2002 | German et al. |
| 6,516,345 B1 | 2/2003 | Kracht |
| 6,522,737 B1 | 2/2003 | Bartolutti et al. |
| 6,564,258 B1 | 5/2003 | Uniacke |
| 6,574,221 B1 | 6/2003 | Petersen |
| 6,574,586 B1 | 6/2003 | David et al. |
| 6,577,243 B1 | 6/2003 | Dannenmann et al. |
| 6,636,152 B2 | 10/2003 | Schannach et al. |
| 6,678,273 B1 | 1/2004 | Brown |
| 6,684,179 B1 | 1/2004 | David |
| 6,725,177 B2 | 4/2004 | David et al. |
| 6,778,505 B1 | 8/2004 | Bullman et al. |
| 6,881,096 B2 | 4/2005 | Brown et al. |
| D510,068 S | 9/2005 | Haggay et al. |
| 6,961,675 B2 | 11/2005 | David |
| 6,968,994 B1 | 11/2005 | Smith |
| 6,976,867 B2 | 12/2005 | Navarro et al. |
| 6,993,417 B2 | 1/2006 | Osann |
| 7,038,135 B1 | 5/2006 | Chan et al. |
| 7,039,028 B2 | 5/2006 | Chen et al. |
| 7,042,562 B2 | 5/2006 | Kiani et al. |
| 7,057,105 B2 | 6/2006 | Gottardo et al. |
| 7,075,910 B2 | 7/2006 | Chen et al. |
| 7,077,710 B2 | 7/2006 | Haggay et al. |
| 7,081,808 B2 | 7/2006 | Colombo et al. |
| 7,123,810 B2 | 10/2006 | Parrish |
| 7,126,918 B2 | 10/2006 | Roberts |
| 7,136,936 B2 | 11/2006 | Chan et al. |
| 7,142,536 B1 | 11/2006 | Gossett et al. |
| 7,153,142 B2 | 12/2006 | Shifris et al. |
| 7,159,026 B2 | 1/2007 | Lau et al. |
| 7,160,143 B2 | 1/2007 | David et al. |
| 7,193,422 B2 | 3/2007 | Velleca et al. |
| 7,226,217 B1 | 6/2007 | Benton et al. |
| 7,229,020 B2 | 6/2007 | Goodison et al. |
| 7,234,944 B2 | 6/2007 | Nordin et al. |
| 7,254,652 B2 | 8/2007 | Anderson et al. |
| 7,266,087 B2 | 9/2007 | Wahl |
| 7,289,334 B2 | 10/2007 | Behrens et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| 7,317,735 B1 | 1/2008 | Ojard |
| 7,328,033 B2 | 2/2008 | Rappaport et al. |
| D564,966 S | 3/2008 | Shifris |
| 7,352,289 B1 | 4/2008 | Harris |
| 7,359,959 B2 | 4/2008 | Lizzi et al. |
| 7,369,513 B1 | 5/2008 | Sankaran |
| 7,377,819 B1 | 5/2008 | Cooper et al. |
| 7,382,765 B2 | 6/2008 | Kennedy et al. |
| 7,401,985 B2 | 7/2008 | Aronson et al. |
| D575,743 S | 8/2008 | Shifris et al. |
| 7,411,405 B2 | 8/2008 | Nordin |
| 7,433,363 B2 | 10/2008 | Rosen et al. |
| 7,445,389 B2 | 11/2008 | Aronson |
| 7,453,864 B2 | 11/2008 | Kennedy et al. |
| 7,468,669 B1 | 12/2008 | Beck et al. |
| 7,479,032 B2 | 1/2009 | Hoath et al. |
| 7,483,419 B2 | 1/2009 | Bullman et al. |
| 7,499,616 B2 | 3/2009 | Aronson et al. |
| 7,517,243 B2 | 4/2009 | Caveney et al. |
| 7,540,667 B2 | 6/2009 | Murano |
| 7,551,456 B2 | 6/2009 | Behrens et al. |
| 7,564,795 B2 | 7/2009 | Stephenson et al. |
| 7,586,942 B2 | 9/2009 | Golasky et al. |
| 7,616,589 B2 | 11/2009 | Nagata et al. |
| 7,698,156 B2 | 4/2010 | Martucci et al. |
| 7,839,266 B2 | 11/2010 | Hoglund et al. |
| 7,870,242 B2 | 1/2011 | Nguyen |
| 7,934,022 B2 | 4/2011 | Velleca et al. |
| 8,037,173 B2 | 10/2011 | Tuckey et al. |
| 8,274,989 B1 | 9/2012 | Allan et al. |
| 8,897,637 B2 | 11/2014 | Feltgen |
| 8,982,715 B2 | 3/2015 | Raza et al. |
| 9,491,119 B2 | 11/2016 | Raza et al. |
| 9,667,566 B2 | 5/2017 | Raza et al. |
| 9,674,115 B2 | 6/2017 | Raza et al. |
| 9,742,696 B2 | 8/2017 | Raza et al. |
| 2001/0001270 A1 | 5/2001 | Vigliaturo |
| 2002/0138604 A1 | 9/2002 | Kopelovitz et al. |
| 2003/0046339 A1 | 3/2003 | Ip |
| 2003/0061393 A1 | 3/2003 | Steegmans et al. |

(56) References Cited

U.S. PATENT DOCUMENTS

| | | |
|---|---|---|
| 2003/0194912 A1 | 10/2003 | Ferentz |
| 2003/0197619 A1 | 10/2003 | Lawrence et al. |
| 2003/0219033 A1 | 11/2003 | Silvester |
| 2004/0013387 A1 | 1/2004 | Wakileh et al. |
| 2004/0024717 A1 | 2/2004 | Sneeringer |
| 2004/0042418 A1 | 3/2004 | Hamada et al. |
| 2004/0073597 A1 | 4/2004 | Caveney et al. |
| 2004/0103163 A1 | 5/2004 | Lin et al. |
| 2004/0123998 A1 | 7/2004 | Berglund et al. |
| 2004/0208509 A1 | 10/2004 | Gerstel et al. |
| 2005/0071514 A1 | 3/2005 | Anderson et al. |
| 2005/0086389 A1 | 4/2005 | Chang |
| 2005/0164548 A1 | 7/2005 | Spears et al. |
| 2005/0186819 A1 | 8/2005 | Velleca et al. |
| 2005/0190768 A1 | 9/2005 | Cutler |
| 2005/0245127 A1 | 11/2005 | Nordin et al. |
| 2006/0043202 A1 | 3/2006 | Kim et al. |
| 2006/0047800 A1 | 3/2006 | Caveney et al. |
| 2006/0059293 A1 | 3/2006 | Wurzburg et al. |
| 2006/0160395 A1 | 7/2006 | Macauley et al. |
| 2006/0160396 A1 | 7/2006 | Macauley et al. |
| 2006/0179144 A1 | 8/2006 | Nagase |
| 2006/0185887 A1 | 8/2006 | Neujahr |
| 2006/0203715 A1 | 9/2006 | Hunter et al. |
| 2006/0227759 A1 | 10/2006 | Bohm et al. |
| 2006/0253561 A1 | 11/2006 | Holmeide et al. |
| 2006/0268507 A1 | 11/2006 | Takahashi |
| 2006/0268747 A1 | 11/2006 | Haalen et al. |
| 2006/0282527 A1 | 12/2006 | Chiou et al. |
| 2007/0024125 A1 | 2/2007 | Biskup et al. |
| 2007/0025306 A1 | 2/2007 | Cox et al. |
| 2007/0058338 A1 | 3/2007 | Lee |
| 2007/0117444 A1 | 5/2007 | Caveney et al. |
| 2007/0153823 A1 | 7/2007 | Wojtowicz |
| 2007/0162954 A1 | 7/2007 | Pela |
| 2007/0230452 A1 | 10/2007 | Hough et al. |
| 2007/0238343 A1 | 10/2007 | Velleca et al. |
| 2007/0274234 A1 | 11/2007 | Kubota |
| 2007/0283045 A1 | 12/2007 | Nguyen et al. |
| 2008/0022023 A1 | 1/2008 | Kim et al. |
| 2008/0049627 A1 | 2/2008 | Nordin |
| 2008/0100467 A1 | 5/2008 | Downie et al. |
| 2008/0159738 A1 | 7/2008 | Lavranchuk |
| 2008/0181136 A1 | 7/2008 | Watanabe et al. |
| 2008/0181138 A1 | 7/2008 | Dalberg |
| 2008/0219268 A1 | 9/2008 | Dennison |
| 2008/0222313 A1 | 9/2008 | Andrus et al. |
| 2008/0265915 A1 | 10/2008 | Clark et al. |
| 2008/0316940 A1 | 12/2008 | Brooks et al. |
| 2009/0061678 A1 | 3/2009 | Minoo et al. |
| 2009/0081888 A1 | 3/2009 | Nordin et al. |
| 2009/0100298 A1 | 4/2009 | Lange et al. |
| 2009/0195349 A1 | 8/2009 | Frader-Thompson et al. |
| 2009/0285128 A1 | 11/2009 | Swan |
| 2009/0322487 A1 | 12/2009 | Lange et al. |
| 2010/0020722 A1 | 1/2010 | Farkas et al. |
| 2010/0054157 A1 | 3/2010 | Farkas et al. |
| 2010/0211664 A1 | 8/2010 | Raza et al. |
| 2010/0238003 A1 | 9/2010 | Chan et al. |
| 2010/0267274 A1 | 10/2010 | McNally et al. |
| 2010/0271961 A1 | 10/2010 | Caveney |
| 2011/0255611 A1 | 10/2011 | Caveney et al. |
| 2012/0309211 A1 | 12/2012 | Jacks et al. |
| 2015/0146739 A1 | 5/2015 | Raza et al. |
| 2015/0149915 A1 | 5/2015 | Raza et al. |

FOREIGN PATENT DOCUMENTS

| | | |
|---|---|---|
| CN | 1809985 | 7/2006 |
| CN | 1809985 A | 7/2006 |
| CN | 1811743 A | 8/2006 |
| CN | 101192072 A | 6/2008 |
| CN | 101199161 A | 6/2008 |
| CN | 102396191 A | 3/2012 |
| CN | 101027873 B | 8/2012 |
| EP | 1569494 | 8/2005 |
| EP | 1569494 A2 | 8/2005 |
| JP | 2001297044 | 10/2001 |
| JP | 2001297044 A | 10/2001 |
| KR | 20040022517 A | 3/2004 |
| KR | 1020040022517 | 3/2004 |
| KR | 20080017170 A | 2/2008 |
| KR | 102008017170 | 2/2008 |
| WO | 2004105317 | 12/2004 |
| WO | 2004105317 A1 | 12/2004 |
| WO | 2008076052 A1 | 6/2008 |
| WO | 2010093988 A2 | 8/2010 |

OTHER PUBLICATIONS

Feltgen, "PCT Patent Application PCT/EP2009/009036: Method and Arrangement for Identifying at Least One Object", Dec. 16, 2009, pp. 1-25, Published in: WO.

Feuzeu et al., "A New Scheme for Interconnecting LANs With Label Switching Bridges", "Local Computer Networks, 2005. 30th Anniversary. The IEEE Conference on", Nov. 17, 2005, pp. 303-311, Publisher: IEEE, Published in: Sydney.

Figueira et al., "10GE WAN PHY: Physical Medium Attachment (PMA)", "IEEE 802.3 Meeting, Albuquerque", Mar. 2000, pp. 1-42.

Institute Mexicano De La Propiedad Industrial, "Office Action from MX Application No. Mx/a/2011/008517 dated May 28, 2014", "from Foreign Counterpart of U.S. Appl. No. 12/705,506", dated May 28, 2014, pp. 1-11, Published in: MX.

Instituto Meixcano De La Propiedad Industrial, "Notice of Allowance from MX Application No. MX/a/2011/008507 dated Oct. 17, 2014", "from Foreign Counterpart of U.S. Appl. No. 12/705,506", dated Oct. 17, 2014, pp. 1-2, Published in: MX.

Instituto Mexicano De La Propiedad Industrial, "Notice of Allowance for MX Application No. MX/a/2011/008507 dated Oct. 17, 2014", Foreign Counterpart to U.S. Appl. No. 12/705,501, dated Oct. 17, 2014, pp. 1-2, Published in: MX.

Instituto Mexicano De La Propiedad Industrial, "Notice of Allowance from MX Application No. MX/a/2011/008513 dated Apr. 30, 2014", From Foreign Counterpart of U.S. Appl. No. 12/705,497; pp. 1-2; Published in MX.

Instituto Mexicano De La Propiedad Industrial, "Office Action from MX Application No. MX/a/2015/016990 dated Jun. 10, 2016", From Foreign Counterpart of U.S. Appl. No. 12/705,501; pp. 1-3; Published in MX.

Instituto Mexicano De La Propiedad Industrial, "Notice of Allowance for MX Application No. MX/a/2011/008506 dated Jan. 30, 2014", "from Foreign Counterpart of U.S. Appl. No. 12/705,514", dated Jan. 30, 2014, pp. 1-3, Published in: MX.

Instituto Mexicano De La Propiedad Industrial, "Notice of Allowance from MX Application No. MX/a/2011/008517 dated Oct. 17, 2014", "from Foreign Counterpart of U.S. Appl. No. 12/705,506", dated Oct. 17, 2014, pp. 1-2, Published in: MX.

Instituto Mexicano De La Propiedad Industrial, "Office Action from MX Application No. MX/a/2011/008513 dated Feb. 21, 2014", "from Foreign Counterpart of U.S. Appl. No. 12/705,497", dated Feb. 21, 2014, pp. 1-11, Published in: MX.

Instituto Mexicano De La Propiedad Industrial, "Office Action from MX Application No. MX/a/2014/012183 dated Jan. 26, 2015", "from Foreign Counterpart of U.S. Appl. No. 14/614,039", dated Jan. 26, 2015, pp. 1-5, Published in: MX.

Instituto Mexicano De La Propiedad Industrial, "Second Office Action from MX Application No. MX/a/2011/008507 dated Mar. 19, 2014", "from Foreign Counterpart of U.S. Appl. No. 12/705,501", dated Mar. 19, 2014, pp. 1-23, Published in: MX.

Instituto Mexicano De La Propiedad Industrial, "Second Office Action from MX Application No. MX/a/2011/008517 dated Mar. 20, 2014", "from Foreign Counterpart of U.S. Appl. No. 12/705,506", dated Mar. 20, 2014, pp. 1-9, Published in: MX.

Instituto Mexicano De La Propiedad Industrial, "Third Office Action from MX Application No. MX/a/2011/008507 dated May 29, 2014", "from Foreign Counterpart of U.S. Appl. No. 12/705,501", dated May 29, 2014, pp. 1-20, Published in: MX.

(56) References Cited

OTHER PUBLICATIONS

Instituo Mexicano De La Proprided Industrial, "Final Office Action from MX Application No. MA/a/2011/008507 dated Sep. 15, 2014", "from Foreign Counterpart of U.S. Appl. No. 12/705,501", dated Sep. 15, 2014, pp. 1-16, Published in: MX.
Instituto Mexicano De La Proprided Industrial, "Final Office Action from MX Application No. MX/a/2011/008517 dated Sep. 15, 2014", "from Foreign Counterpart of U.S. Appl. No. 12/705,506", dated Sep. 15, 2014, pp. 1-7, Published in: MX.
Instituto Mexicano De Le Propieded Industrial, "Third Office Action from MX Application No. MA/a/2011/008507", "from Foreign Counterpart of U.S. Appl. No. 12/705,501", dated Jun. 12, 2014, pp. 1-20, Published in: MX.
Instituto Mexicano De Le Propieded Industrial, "Third Office Action from MX Application No. MX/a/2011/008517 dated Jun. 16, 2014", dated Jun. 16, 2014, pp. 1-11, Publisher: from Foreign Counterpart of U.S. Appl. No. 12/705,506, Published in MX.
International Searching Authority, "International Preliminary Report on Patentability for PCT Application No. PCT/US2010/024181 dated Aug. 25, 2011", "Foreign Counterpart to U.S. Appl. No. 12/705,497", filed Aug. 25, 2011, pp. 1-7, Published in: WO.
International Searching Authority, "International Preliminary Report on Patentability for PCT Application No. PCT/US2010/024186 dated Aug. 25, 2011", "Foreign Counterpart to U.S. Appl. No. 12/705,506", filed Aug. 25, 2011, pp. 1-6, Published in: WO.
International Searching Authority, "International Preliminary Report on Patentability for PCT Application No. PCT/US2010/024188 dated Aug. 25, 2011", "Foreign Counterpart to U.S. Appl. No. 12/705,514", filed Aug. 25, 2011, pp. 1-6, Published in: WO.
International Searching Authority, "International Preliminary Report on Patentability for PCT Application No. PCT/US2010/024184 dated Aug. 25, 2011", "Foreign Counterpart to U.S. Appl. No. 12/705,501", filed Aug. 25, 2011, pp. 1-7, Published in: WO.
International Searching Authority, "International Search Report and Written Opinion for PCT Application No. PCT/US2010/024181 dated Sep. 28, 2010", "Foreign Counterpart to U.S. Appl. No. 12/705,497", filed Sep. 28, 2010, pp. 1-10, Published in: WO.
International Searching Authority, "International Search Report and Written Opinion for PCT Application No. PCT/US2010/024184 dated Sep. 27, 2010", "Foreign Counterpart to U.S. Appl. No. 12/705,501", filed Sep. 27, 2010, pp. 1-10, Published in: WO.
International Searching Authority, "International Search Report and Written Opinion for PCT Application No. PCT/US2010/024188 dated Sep. 28, 2010", Foreign Counterpart to U.S. Appl. No. 12/705,514, filed Sep. 28, 2010, pp. 1-9, Published in: WO.
International Searching Authority, "International Search Report from PCT Application No. PCT/US2010/024186 dated Sep. 30, 2010", "from Foreign Counterpart of U.S. Appl. No. 12/705,506", dated Sep. 30, 2010, pp. 1-9, Published in: WO.
Kang et al., "Design and Implementation of Network Management System for Power Line Communication Network", 'IEEE International Symposium on Power Line Communications and its Applications (ISPLC 2007), Mar. 28, 2007, pp. 23-28, Publisher: IEEE.
Korean Patent Office, "Decision to Grant for KR Application No. 10-2011-7021267", "from Foreign Counterpart to U.S. Appl. No. 12/705,506", dated Mar. 30, 2016, pp. 1-6, Published in: KR.
Korean Patent Office, "Decision to Grant for KR Application No. 2011-7021268", "from Foreign Counterpart to U.S. Appl. No. 12/705,514", dated Jul. 19, 2016, pp. 1-6, Published in: KR.
Korean Patent Office, "Office Action for Application Serial No. 2011-7021268", "from Foreign Counterpart to U.S. Appl. No. 12/705,514", dated Jun. 25, 2015, pp. 1-15, Published in: KR.
Korean Patent Office, "Office Action for Korean Patent Application No. 2011-7021267", "from Foreign Counterpart to U.S. Appl. No. 12/705,506", dated May 13, 2015, pp. 1-10, Published in: KR.
Korean Patent Office, "Office Action for KR Application No. 10-2016-7017500", "from Foreign Counterpart to U.S. Appl. No. 12/705,506", dated Sep. 29, 2016, pp. 1-4, Published in: KR.
Korean Patent Office, "Office Action for KR Application No. 2011-7021268", "from Foreign Counterpart to U.S. Appl. No. 12/705,514", dated Feb. 12, 2016, pp. 1-12, Published in: KR.
Korean Patent Office, "Office Action from KR Patent Application No. 10-2011-7021041", "from Foreign Counterpart to U.S. Appl. No. 12/705,501", dated Sep. 13, 2016, pp. 1-13, Published in: KR.
Korean Patent Office, "Office Action from KR Patent Application No. 10-2016-7029115", "from Foreign Counterpart to U.S. Appl. No. 12/705,514", dated Jan. 6, 2017, pp. 1-14, Published in: KR.
Meredith, "Managers Missing Point of Intelligent Patching", "http://searchdatacenter.techtarget.com/news/article/0,289142,sid80-gci1099991,00.html", Jun. 21, 2005, pp. 1-2, Publisher: SearchDataCenter.com.
Mexican Patent Office, "Notice of Allowance for Mexican Application No. MX/a/2014/012184", "from U.S. Appl. No. 12/705,501", dated Oct. 2, 2015, pp. 1-2, Published in: MX.
Mexican Patent Office, "Notice of Allowance for Mexican Patent Application No. MX/a/2014/012183", "from Foreign Counterpart to U.S. Appl. No. 12/705,506", dated Apr. 14, 2015, pp. 1-2, Published in: MX.
Mexican Patent Office, "Notice of Allowance for MX Application No. MX/a/2015/008658", "from Foreign Counterpart to U.S. Appl. No. 12/705,506", dated Dec. 16, 2015, pp. 1-2, Published in: MX.
Mexican Patent Office, "Office Action for Mexican Application No. MX/a/2014/012184", "from Foreign Counterpart to now U.S. Pat. No. 8,982,715", dated May 13, 2015, pp. 1-9, Published in: MX.
Mexican Patent Office, "Office Action for MX Applicatin No. MX/a/2015/016990", "from Foreign Counterpart to U.S. Appl. No. 12/705,501", dated Jul. 29, 2016, pp. 1-3, Published in: MX.
Mexican Patent Office, "Office Action for MX Application No. MX/a/2015/016990", "from Foreign Counterpart to U.S. Appl. No. 12/705,501", dated Jan. 30, 2017, pp. 1-4, Published in: MX.
Mexican Patent Office, "Office Action from MX Application No. MX/a/2011/005813 dated Oct. 11, 2013", "from Foreign Counterpart of U.S. Appl. No. 12/705,497", dated Oct. 11, 2013, pp. 1-8, Published in: MX.
Mexican Patent Office, "Office Action from MX Application No. MX/a/2011/008506 dated Oct. 10, 2013", "from Foreign Counterpart of U.S. Appl. No. 12/705,514", dated Oct. 10, 2013, pp. 1-5, Published in: MX.
Mexican Patent Office, "Office Action from MX Application No. MX/a/2011/008507 dated Oct. 11, 2013", "from Foreign Counterpart of U.S. Appl. No. 12/705,501", dated Oct. 11, 2013, pp. 1-11, Published in: MX.
Mexican Patent Office, "Office Action from MX Application No. MX/a/2011/008517 dated Oct. 11, 2013", "from Foreign Counterpart of U.S. Appl. No. 12/705,506", dated Oct. 11, 2013, pp. 1-7, Published in: MX.
Milligan, "Intelligent Patching Systems Carving out a 'Large' Niche", "http://www.cablinginstall.com/index/display/article-display/207641/articles/cabling-installation-maintenance/volume-12/issue-7/contents/technology/int", Jul. 1, 2004, pp. 1-6, vol. 12, No. 7, Publisher: Cabling Installation & Maintenance.
Mirjalily et al., "Best Multiple Spanning Tree in Metro Ethernet Networks", "Computer and Electrical Engineering, 2009. ICEE'09. Second International Conference on", Dec. 28-30, 2009, pp. 117-121, vol. 2, Publisher: IEEE, Published in: Dubai.
"Embedded Ethernet System Design Guide", Aug. 2008, Publisher: Silicon Laboratories.
"IntelliMAC", May 2003, pp. 1-6, Publisher: Nordx/CDT.
"The Ethersmart Wildcard", "http://www.mosaic-industries.com/Products/WildCards/ETHx/", 2008, Publisher: Mosaic Industries, Inc.
"UPnP Device Architecture 1.1", Oct. 15, 2008, pp. 1-272, Publisher: UPnP Forum.
Australia Patent Office, "Office Action for AU Application No. 2015201074", "from Foreign Counterpart to U.S. Appl. No. 12/705,506", dated Nov. 5, 2015, pp. 1-3, Published in: AU.
Australia Patent Office, "Office Action for AU Application No. 2015201075", "from Foreign Counterpart to U.S. Appl. No. 12/705,501", dated Feb. 2, 2016, pp. 1-3, Published in: AU.

(56) References Cited

OTHER PUBLICATIONS

Australian Government IP Australia, "Notice of Acceptance from AU Application No. 2010213550 dated Nov. 17, 2014", From Foreign Counterpart of U.S. Appl. No. 12/705,514; pp. 1-2; Published in AU.
Australian Government IP Australia, "Patent Examination Report No. 1 from AU Application No. 2010213549 dated May 5, 2014", "from Foreign Counterpart of U.S. Appl. No. 12/705,506", dated May 5, 2014, pp. 1-4, Published in: AU.
Australian Government IP Australia, "Patent Examination Report No. 1 from AU Application No. 2010213550 dated Apr. 9, 2014", "from foreign counterpart of U.S. Appl. No. 12/705,514", dated Apr. 9, 2014, pp. 1-3, Published in: AU.
Australian Government, "Notice of Acceptance from AU Application No. 2010213548 dated Nov. 19, 2014", "from Foreign Counterpart of U.S. Appl. No. 12/705,501", dated Nov. 19, 2014, pp. 1-2, Published in: AU.
Australian Government, "Notice of Acceptance from AU Application No. 2010213549 dated Nov. 19, 2014", "from Foreign Counterpart of U.S. Appl. No. 12/705,506", dated Nov. 19, 2014, pp. 1-2, Published in: AU.
Australian Government, "Patent Examination Report No. 1 from AU Application No. 2010213547 dated Apr. 2, 2014", "from Foreign Counterpart of U.S. Appl. No. 12/705,497", dated Apr. 2, 2014, pp. 1-3, Published in: AU.
Australian Government, "Patent Examination Report No. 1 from AU Application No. 2010213548 dated Aug. 21, 2014", "from Foreign Counterpart of U.S. Appl. No. 12/705,501", dated Aug. 21, 2014, pp. 1-5, Published in: AU.
Australian Government, "Patent Examination Report No. 2 from AU Application No. 2010213547 dated Feb. 6, 2015", "from Foreign Counterpart of U.S. Appl. No. 12/705,497", dated Feb. 6, 2015, pp. 1-4, Published in: AU.
Australian Patent Office, "Notice of Acceptance for AU Patent Application No. 2015201075", "from Foreign Counterpart of U.S. Appl. No. 14/614,032", dated Oct. 12, 2016, pp. 1-2, Published in: AU.
Australian Patent Office, "Notice of Acceptance for Australian Application No. 2010213547", "from Foreign Counterpart to U.S. Appl. No. 12/705,497", dated May 4, 2015, pp. 1-2, Published in: AU.
Australian Patent Office, "Notice of Acceptance of Australian Application No. 2010213547", "from Foreign Counterpart to U.S. Appl. No. 12/705,497", dated May 25, 2015, pp. 1-2, Published in: AU.
Australian Patent Office, "Notice of Allowance for AU Application No. 2015201074", "from Foreign Counterpart to U.S. Appl. No. 12/705,506", dated Sep. 1, 2016, pp. 1-2, Published in: AU.
Canadian Intellectual Property Office, "Notice of Allowance for CA Application No. 2,756,267 dated Nov. 24, 2016", "Foreign Counterpart to U.S. Appl. No. 12/705,506", filed Nov. 24, 2016, pp. 1, Published in: CA.
Canadian Intellectual Property Office, "Office Action for CA Application No. 2,756,264", "From U.S. Appl. No. 12/705,497", dated Mar. 29, 2017, pp. 1-4, Published in: CA.
Canadian Intellectual Property Office, "Office Action CA Application No. 2,756,269", "Foreign Counterpart to U.S. Appl. No. 12/705,514", dated Jan. 3, 2017, pp. 1-4, Published in: CA.
Canadian Intellectual Property, "Office Action for CA Application No. 2,953,802 dated Oct. 23, 2017", "Foreign Counterpart to U.S. Appl. No. 12/705,506", filed Oct. 23, 2017, pp. 1-4, Published in: CA.
Canadian Intellectual Property, "Office Action for CA Patent Application No. 2,756,265", "from U.S. Appl. No. 12/705,501", dated Oct. 21, 2016, pp. 1-4, Published in: CA.
Canadian Patent Office, "Office Action for CA Application No. 2,756,264", "from Foreign Counterpart to U.S. Appl. No. 12/705,497", dated Mar. 29, 2016, pp. 1-5, Published in: CA.

Canadian Patent Office, "Office Action for CA Application No. 2,756,267", "from Foreign Counterpart to U.S. Appl. No. 12/705,506", dated Jan. 27, 2016, pp. 1-4, Published in: CA.
Canadian Patent Office, "Office Action from CA Application No. 2,756,265", "from Foreign Counterpart to now U.S. Pat. No. 8,982,715", dated Feb. 16, 2016, pp. 1-4, Published in: CA.
Candian Patent Office, "Office Action for CA Application No. 2,756,269", "from Foreign Counterpart to U.S. Appl. No. 12/705,514", dated Feb. 1, 2016, pp. 1-4, Published in: CA.
Chinese Patent Office, "First Office Action from CN Application No. 201080016490A dated Sep. 5, 2012", "from Foreign Counterpart of U.S. Appl. No. 12/705,501", dated Sep. 5, 2012, pp. 1-24, Published in: CN.
Chinese Patent Office, "First Office Action", "from Foreign Counterpart of U.S. Appl. No. 12/705,497", dated Nov. 2, 2012, pp. 1-34, Published in: CN.
Chinese Patent Office, "Notice of Reexamination for CN Patent Application No. 201080016488.7", "from Foreign Counterpart to U.S. Appl. No. 12/705,497", dated Jul. 1, 2015, pp. 1-7, Published in: CN.
Chinese Patent Office, "Notification to Grant Patent Right for CN Application No. 201080016474.5", "from Foreign Counterpart to U.S. Appl. No. 12/705,506", dated Dec. 22, 2015, pp. 1-5, Published in: CN.
Chinese Patent Office, "Notification to Grant Patent Right for CN Application No. 201080016488.7", "from Foreign Counterpart to U.S. Appl. No. 12/705,497", dated Jan. 8, 2016, pp. 1-5, Published in: CN.
Chinese Patent Office, "Office Action", "from Foreign Counterpart of U.S. Appl. No. 12/705,497", dated Apr. 24, 2013, pp. 1-10, Published in: CN.
Chinese Patent Office, "Office Action", "from Foreign Counterpart of U.S. Appl. No. 12/705,501", dated Mar. 13, 2013, pp. 1-38, Published in: CN.
Chinese Patent Office, "Reexamination Decision for CN Application No. 201080016488.7", "from Foreign Counterpart to U.S. Appl. No. 12/705,497", dated Sep. 30, 2015, pp. 1-58, Published in: CN.
Chinese Patent Office, "Third Office Action for Chinese Application No. 201080016474.5", "from Foreign Counterpart to U.S. Appl. No. 12/705,506", dated Jul. 7, 2015, pp. 1-11, Published in: CN.
Dimitrov et al., "Embedded Internet Based System", 2008, pp. 103-107.
European Patent Office, "EP Office Action from EP Application No. 10741842.8 dated Mar. 26, 2018", From Foreign Counterpart of U.S. Appl. No. 12/705,497; pp. 1-5; Published in EP.
European Patent Office, "EP Office Action from EP Application No. 11007151.1 dated Mar. 26, 2018", From Foreign Counterpart of U.S. Appl. No. 12/705,501; pp. 1-7; Published in EP.
European Patent Office, "Office Action from EP Application No. 10741843.6 dated Mar. 21, 2018", From Foreign Counterpart of U.S. Appl. No. 12/705,501; pp. 1-5; Published in: EP.
European Patent Office, "Extended European Search Report from EP Application No. 10741842.8 dated Sep. 27, 2012", "from Foreign Counterpart of U.S. Appl. No. 12/705,497", dated Sep. 27, 2012, pp. 1-6, Published in: EP.
European Patent Office, "Extended European Search Report from EP Application No. 10741843.6 dated Sep. 19, 2012", "from Foreign Counterpart of U.S. Appl. No. 12/705,501", dated Sep. 19, 2012, pp. 1-9, Published in: EP.
European Patent Office, "Extended European Search Report from EP Application No. 10741844.4 dated Oct. 11, 2012", "from Foreign Counterpart of U.S. Appl. No. 12/705,506", dated Oct. 11, 2012, pp. 1-9, Published in: EP.
European Patent Office, "Extended European Search Report from EP Application No. 10741845.1 dated Oct. 11, 2012", "from Foreign Counterpart of U.S. Appl. No. 12/705,514", filed Oct. 11, 2012, pp. 1-6, Published in: EP.
European Patent Office, "Extended European Search Report", "from Foreign Counterpart of U.S. Appl. No. 12/705,501", dated May 22, 2012, pp. 1-7, Published in: EP.

(56) References Cited

OTHER PUBLICATIONS

European Patent Office, "Office Action for EP Application No. 10741843.6", "from Foreign Counterpart to U.S. Appl. No. 12/705,501", dated Aug. 31, 2015, pp. 1-5, Published in: EP.
European Patent Office, "Office Action for EP Serial No. 11007151.1", "from Foreign Counterpart to now U.S. Pat. No. 8,982,715", dated Jul. 9, 2015, pp. 1-7, Published in: EP.
European Patent Office, "Office Action for European Patent No. 10741844.4", "from U.S. Foreign Counterpart to U.S. Appl. No. 12/705,506", dated Jul. 6, 2015, pp. 1-5, Published in: EP.
European Patent Office, "Office Action for European Patent No. 10741845.1", "from Foreign Counterpart to U.S. Appl. No. 12/8705,514", dated Jul. 3, 2015, pp. 1-6, Published in: EP.
European Search Report, "Office Action for EP Application No. 10741842.8", "from Foreign Counterpart to U.S. Appl. No. 12/705,497", dated Aug. 31, 2015, pp. 1-5, Published in: EP.
Australian Patent Office, "Patent Examination Report No. 1 from AU Application No. 2010213547 dated Apr. 2, 2014", dated Apr. 2, 2014, pp. 1-3, Publisher: from Foreign Counterpart of U.S. Appl. No. 12/705,497, Published in: AU.
Australian Patent Office, "Patent Examination Report No. 1 from AU Application No. 2010213547 dated Apr. 2, 2014", "from Foreign Counterpart of U.S. Appl. No. 12/705,497", filed Apr. 2, 2014, pp. 1-3, Published in: AU.
Australian Patent Office, "Patent Examination Report No. 2 from AU Application No. 2010213547 dated Feb. 6, 2015", "from Foreign Counterpart of U.S. Appl. No. 12/705,497", filed Feb. 6, 2015, pp. 1-4, Published in: AU.
Canadian Intellectual Property Office, "Office Action for CA Application No. 2,756,264", "from Foreign Counterpart to U.S. Appl. No. 12/705,497", dated Mar. 29, 2016, pp. 1-5, Published in: CA.
State Intellectual Property Office, P.R. China, "First Office Action for CN Application No. 201080016488.7 dated Nov. 2, 2012", "from Foreign Counterpart of U.S. Appl. No. 12/705,497", filed Nov. 2, 2012, pp. 1-34, Published in: CN.
State Intellectual Property Office, P.R. China, "Office Action for CN Application No. 201080016488.7 dated Apr. 24, 2013", "from Foreign Counterpart of U.S. Appl. No. 12/705,497", filed Apr. 24, 2013, pp. 1-10, Published in: CN.
State Intellectual Property Office, P.R. China, "Third Office Action from CN Application No. 201080016488.7 dated Dec. 2, 2013", "from Foreign Counterpart of U.S. Appl. No. 12/705,497", filed Dec. 2, 2013, pp. 1-38, Published in: CN.
State Intellectual Property Office, P.R. China, "Decision on Rejection from CN Application No. 201080016488.7 dated Feb. 25, 2014", "from Foreign Counterpart of U.S. Appl. No. 12/705,497", filed Feb. 25, 2014, pp. 1-41, Published in: CN.
State Intellectual Property Office, P.R. China, "CN Notice of Reexamination from CN Application No. 201080016488.7 dated Jan. 4, 2015", "from foreign counterpart of U.S. Appl. No. 12/705,497", filed Jan. 4, 2015, pp. 1-9, Published in: CN.
State Intellectual Property Office, P.R. China, "Notification to Grant Patent Right for CN Application No. 201080016488.7", "from Foreign Counterpart to U.S. Appl. No. 12/705,497", dated Jan. 8, 2016, pp. 1-5, Published in: CN.
State Intellectual Property Office, P.R. China, "Notice of Reexamination for CN Patent Application No. 201080016488.7", "from Foreign Counterpart to U.S. Appl. No. 12/705,497", dated Jul. 1, 2015, pp. 1-7, Published in: CN.
State Intellectual Property Office, P.R. China, "Reexamination Decision for CN Application No. 201080016488.7", "from Foreign Counterpart to U.S. Appl. No. 12/705,497", dated Sep. 30, 2015, pp. 1-58, Published in: CN.
European Patent Office, "Extended European Search Report from EP Application No. 10741842.8 dated Sep. 27, 2012", "from Foreign Counterpart of U.S. Appl. No. 12/705,497", filed Sep. 27, 2012, pp. 1-6, Published in: EP.
European Patent Office, "Office Action for EP Application No. 10741842.8", "from Foreign Counterpart to U.S. Appl. No. 12/705,497", dated Aug. 31, 2015, pp. 1-5, Published in: EP.

Mexican Patent Office, "Office Action from MX Application No. MX/a/2011/005813 dated Oct. 11, 2013", "from Foreign Counterpart of U.S. Appl. No. 12/705,497", filed Oct. 11, 2013, pp. 1-8, Published in: MX.
Mexican Patent Office, "Office Action from MX Application No. MX/a/2011/008513 dated Feb. 21, 2014", "from Foreign Counterpart of U.S. Appl. No. 12/705,497", filed Feb. 21, 2014, pp. 1-11, Published in: MX.
Mexican Patent Office, "Notice of Allowance for Mexican Patent Application No. MX/a/2001/008513", "from Foreign Counterpart to U.S. Appl. No. 12/705,497", dated May 20, 2014, pp. 1-2, Published in: MX.
United States Patent and Trademark Office, "Final Office Action", "U.S. Appl. No. 12/705,497", dated Oct. 16, 2012, pp. 1-29.
United States Patent and Trademark Office, "Final Office Action", "U.S. Appl. No. 12/705,497", dated Dec. 10, 2014, pp. 1-29.
United States Patent and Trademark Office, "Final Office Action", "from U.S. Appl. No. 12/705,497", dated Dec. 24, 2015, pp. 1-35, Published in: US.
United States Patent and Trademark Office, "Notice of Allowance", "from U.S. Appl. No. 12/705,497", dated Nov. 18, 2016, pp. 1-13, Published in: US.
United States Patent and Trademark Office, "Notice of Allowance", "from U.S. Appl. No. 12/705,497", dated Mar. 8, 2017, pp. 1-9, Published in: US.
United States Patent and Trademark Office, "Office Action", "U.S. Appl. No. 12/705,497", dated Apr. 17, 2012, pp. 1-31.
United States Patent and Trademark Office, "Office Action", "from U.S. Appl. No. 12/705,497", dated Jun. 6, 2014, pp. 1-54, Published in: US.
United States Patent and Trademark Office, "Office Action", "from U.S. Appl. No. 12/705,497", dated Jul. 1, 2015, pp. 1-33, Published in: US.
United States Patent and Trademark Office, "Office Action", "from U.S. Appl. No. 12/705,497", dated Mar. 14, 2016, pp. 1-26, Published in: US.
Korean Intellectual Property Office, "International Search Report", "from PCT Application No. PCT/US2010/024181", dated Sep. 28, 2010, pp. 1-10, Published in: KR.
Australian Government, "Notice of Acceptance from AU Application No. 2010213548 dated Nov. 19, 2014", "from Foreign Counterpart of U.S. Appl. No. 12/705,501", filed Nov. 19, 2014, pp. 1-2, Published in: AU.
Australian Government, "Patent Examination Report No. 1 from AU Application No. 2010213548 dated Aug. 21, 2014", "from Foreign Counterpart of U.S. Appl. No. 12/705,501", filed Aug. 21, 2014, pp. 1-5, Published in: AU.
Australian Governement, "Notice of Acceptance for AU Patent Application No. 2015201075", "from Foreign Counterpart of U.S. Appl. No. 14/614,032", dated Oct. 12, 2016, pp. 1-2, Published in: AU.
Canadian Patent Office, "Office Action from CA Application No. 2,756,265", "from Foreign Counterpart to U.S. Pat. No. 8,982,715", dated Feb. 16, 2016, pp. 1-4, Published in: CA.
State Intellectual Property Office, P.R. China, "Sixth Office Action from CN Application No. 201080016490.4 dated Jul. 18, 2014", "from Foreign Counterpart of U.S. Appl. No. 12/705,501", filed Jul. 18, 2014, pp. 1-7, Published in: CN.
State Intellectual Property Office of PR China, "Notification to Grant Patent from CN Application No. 201080016490.4 dated Dec. 1, 2014", "from Foreign Counterpart of U.S. Appl. No. 12/705,501", filed Dec. 1, 2014, pp. 1-5, Published in: CN.
State Intellectual Property Office, P.R. China, "Fifth Office Action from CN Application No. 201080016490.4 dated Mar. 27, 2014", "from Foreign Counterpart of U.S. Appl. No. 12/705,501", filed Mar. 27, 2014, pp. 1-7, Published in: CN.
State Intellectuall Property Office, P.R. China, "First Office Action from CN Application No. 201080016490.4 dated Sep. 5, 2012", "from Foreign Counterpart of U.S. Appl. No. 12/705,501", filed Sep. 5, 2012, pp. 1-24, Published in: CN.
State Intellectuall Property Office, P.R. China, "Office Action from CN Application No. 2010800164904 dated Mar. 13, 2013", "from

(56) References Cited

OTHER PUBLICATIONS

Foreign Counterpart of U.S. Appl. No. 12/705,501", filed Mar. 13, 2013, pp. 1-38, Published in: CN.
State Intellectual Property Office, P.R. China, "Third Office Action from CN Application No. 201080016490.4 dated Jul. 31, 2013", "from Foreign Counterpart of U.S. Appl. No. 12/705,501", filed Jul. 31, 2013, pp. 1-7, Published in: CN.
State Intellectuall Property Office, P.R. China, "Fourth Office Action from CN Application No. 201080016490.4 dated Dec. 4, 2013", "from Foreign Counterpart of U.S. Appl. No. 12/705,501", filed Dec. 4, 2013, pp. 1-7, Published in: CN.
European Patent Office, "Office Action for EP Serial No. 11007151. 1", "from Foreign Counterpart to U.S. Pat. No. 8,982,715", dated Jul. 9, 2015, pp. 1-7, Published in: EP.
European Patent Office, "Extended European Search Report from EP Application No. 10741843.6 dated Sep. 19, 2012", "from Foreign Counterpart of U.S. Appl. No. 12/705,501", filed Sep. 19, 2012, pp. 1-9, Published in: EP.
European Patent Office, "European Search Report from EP Application No. 10741843.6 dated Sep. 19, 2012", "from Foreign Counterpart of U.S. Appl. No. 12/705,501", filed Sep. 19, 2012, pp. 1-9, Published in: EP.
European Patent Office, "Extended European Search Report from EP Application No. 11007151.1 dated May 22, 2012", "from Foreign Counterpart of U.S. Appl. No. 12/705,501", filed May 22, 2012, pp. 1-7, Published in: EP.
United States Patent and Trademark Office, "Advisory Action for U.S. Appl. No. 14/614,039", dated May 22, 2017, pp. 1-4, Published in: US.
United States Patent and Trademark Office, "Final Office Action for U.S. Appl. No. 14/614,039", dated Mar. 9, 2017, pp. 1-14, Published in: US.
United States Patent and Trademark Office, "Notice of Allowance for U.S. Appl. No. 12/705,514", dated Jan. 24, 2018, pp. 1-17, Published in: US.
U.S. Patent and Trademark Office, "Notice of Allowance for U.S. Appl. No. 14/614,039", dated Jul. 12, 2017, pp. 1-19, Published in: US.
U.S. Patent and Trademark Office, "Notice of Allowability from U.S. Appl. No. 12/705,506 dated Aug. 31, 2016", pp. 1-6; Published in US.
U.S. Patent and Trademark Office, "Notice of Allowability from U.S. Appl. No. 12/705,506 dated Oct. 13, 2016", pp. 1-6; Published in US.
U.S. Patent and Trademark Office, "Notice of Allowability from U.S. Appl. No. 12/705,506 dated Oct. 19, 2015", pp. 1-6; Published in US.
U.S. Patent and Trademark Office, "Office Action for U.S. Appl. No. 14/614,039", dated Nov. 3, 2016, pp. 1-108, Published in: US.
State Intellectual Property Office, P.R. China, "Second Office Action for CN Application No. 201410579849.9 dated Mar. 27, 2018", Foreign Counterpart to U.S. Appl. No. 12/705,514, filed Mar. 27, 2018, pp. 1-28, Published in: CN.
State Intellectual Property Office, P.R. China, "First Office Action for CN Application No. 201410579849.9 dated Jul. 21, 2017", "Foreign Counterpart to U.S. Appl. No. 12/705,514", filed Jul. 21, 2017, pp. 1-21, Published in: CN.
U.S. Patent and Trademark Office, Restriction Requirement for U.S. Appl. No. 14/614,039, dated Jul. 14, 2016, pp. 1-6, Published in: US.
U.S. Patent Office, "Notice of Allowance", "from U.S. Appl. No. 12/705,506", dated Oct. 1, 2015, pp. 1-11, Published in: US.
U.S. Patent Office, "Notice of Allowance", "from U.S. Appl. No. 12/705,506", dated Jul. 1, 2016, pp. 1-11, Published in: US.
U.S. Patent and Trademark Office, "Office Action", "U.S. Appl. No. 12/705,506", dated Jun. 28, 2012, pp. 1-32.
U.S. Patent and Trademark Office, "Office Action", "from U.S. Appl. No. 12/705,506", dated Jun. 4, 2014, pp. 1-62, Published in: US.
U.S. Patent Office, "Office Action", "for U.S. Appl. No. 12/705,506", dated Feb. 4, 2016, pp. 1-22, Published in: US.
U.S. Patent Office, "Advisory Action", "from U.S. Appl. No. 14/614,039", dated May 22, 2017, pp. 1-4, Published in: US.
United States Patent and Trademark Office, "Final Office Action", "from U.S. Appl. No. 14/614,039", dated Mar. 9, 2017, pp. 1-14, Published in: US.
United States Patent and Trademark Office, "Notice of Allowance", "From U.S. Appl. No. 14/614,039", dated Jul. 12, 2017, pp. 1-19, Published in: US.
U.S. Patent Office, "Office Action", "from U.S. Appl. No. 14/614,039", dated Nov. 3, 2016, pp. 1-108, Published in: US.
International Searching Authority, "International Search Report from PCT Application No. PCT/US2010/024186 dated Sep. 30, 2010", "from Foreign Counterpart of U.S. Appl. No. 12/705,506", filed Sep. 30, 2010, pp. 1-9, Published in: WO.
Australian Government IP Australia, "Patent Examination Report No. 1 from AU Application No. 2010213550 dated Apr. 9, 2014", "from foreign counterpart of U.S. Appl. No. 12/705,514", filed Apr. 9, 2014, pp. 1-3, Published in: AU.
Australian Patent Office, "Notice of Acceptance for AU Application Serial No. 2010213550", "U.S. Appl. No. 12/705,514", dated Nov. 17, 2014, pp. 1-2, Published in: AU.
Australian Government, "Patent Examination Report No. 1 from AU Application No. 2010213550 dated Apr. 9, 2014", "from Foreign Counterpart of U.S. Appl. No. 12/705,514", filed Apr. 9, 2014, pp. 1-3, Published in: AU.
State Intellectual Property Office, P.R. China, "Notification to Grant Patent Right for Invention from CN Application No. 201080016472.6 dated Aug. 12, 2014", "from Foreign Counterpart of U.S. Appl. No. 12/705,514", filed Aug. 12, 2014, pp. 1-5, Published in: CN.
Chinese Patent Office, "First Office Action from CN Application No. 201080016472.6 dated Sep. 4, 2012", "from Foreign Counterpart of U.S. Appl. No. 12/705,514", filed Sep. 4, 2012, pp. 1-14, Published in: CN.
Chinese Patent Office, "Office Action from CN Application No. 201080016472.6 dated Mar. 5, 2013", "from Foreign Counterpart of U.S. Appl. No. 12/705,514", filed Mar. 5, 2013, pp. 1-24, Published in: CN.
State Intellectual Property Office, P.R. China, "Fourth Office Action from CN Application No. 201080016472.6 dated Nov. 5, 2013", "from Foreign Counterpart of U.S. Appl. No. 12/705,514", filed Nov. 5, 2013, pp. 1-20, Published in: CN.
State Intellectual Property Office, P.R. China, "Fifth Office Action from CN Application No. 201080016472.6 dated May 6, 2014", "from Foreign Counterpart of U.S. Appl. No. 12/705,514", filed May 6, 2014, pp. 1-8, Published in: CN.
State Intellectual Property Office, P.R. China, "Notification to Grant Patent Right for Invention from CN Application No. 201080016472.6 dated Aug. 12, 2014", dated Aug. 12, 2014, pp. 1-5, Publisher: from Foreign Counterpart of U.S. Appl. No. 12/705,514, Published in: CN.
State Intellectual Property Office, P.R. China, "Third Office Action from CN Application No. 201080016472.6 dated Jun. 24, 2013", "from Foreign Counterpart of U.S. Appl. No. 12/705,514", filed Jun. 24, 2013, pp. 1-18, Published in: CN.
Korean Intellectual Property Office, "Office Action for KR Patent Application No. 10-2016-7029115", "from U.S. Appl. No. 12/705,514", Jan. 6, 2017, pp. 1-14, Published in: KR.
Instituto Mexicano De La Propiedad Industrial, "Notice of Allowance for MX Application No. MX/a/2011/008506 dated Jan. 30, 2014", "from Foreign Counterpart of U.S. Appl. No. 12/705,514", filed Jan. 30, 2014, pp. 1-3, Published in: MX.
Mexican Patent Office, "Office Action from MX Application No. MX/a/2011/008506 dated Oct. 10, 2013", "from Foreign Counterpart of U.S. Appl. No. 12/705,514", filed Oct. 10, 2013, pp. 1-5, Published in: MX.
U.S. Patent and Trademark Office, "Advisory Action", "U.S. Appl. No. 12/705,514", dated Nov. 14, 2012, pp. 1-4, Published in: US.
U.S. Patent and Trademark Office, "Advisory Action", "from U.S. Appl. No. 12/705,514", dated Mar. 25, 2014, pp. 1-4, Published in: US.

(56) References Cited

OTHER PUBLICATIONS

U.S. Patent Office, "Advisory Action", "from U.S. Appl. No. 12/705,514", dated Aug. 16, 2016, pp. 1-18, Published in: US.
United States Patent and Trademark Office, "Advisory Action", "From U.S. Appl. No. 12/705,514", dated Jun. 6, 2017, pp. 1-4, Published in: US.
U.S. Patent and Trademark Office, "Final Office Action", "U.S. Appl. No. 12/705,514", dated Aug. 23, 2012, pp. 1-20, Published in: US.
U.S. Patent and Trademark Office, "Final Office Action", "from U.S. Appl. No. 12/705,514", dated Feb. 11, 2014, pp. 1-15, Published in: US.
U.S. Patent Office, "Final Office Action", "from U.S. Appl. No. 12/705,514", dated Apr. 25, 2016, pp. 1-25, Published in: US.
United States Patent and Trademark Office, "Final Office Action", "from U.S. Appl. No. 12/705,514", dated Mar. 23, 2017, pp. 1-27, Published in: US.
United States Patent Office, "Notice of Allowance for U.S. Appl. No. 12/705,514", dated Apr. 1, 2015, pp. 1-9, Published in: US.
U.S. Patent Office, "Notice of Allowance", "from U.S. Appl. No. 12/705,514", dated Jul. 28, 2015, pp. 1-11, Published n: US.
U.S. Patent and Trademark Office, "Office Action", "from U.S. Appl. No. 12/705,514", dated Sep. 25, 2013, pp. 1-45, Published in: US.
U.S. Patent and Trademark Office, "Office Action", "U.S. Appl. No. 12/705,514", dated Nov. 4, 2014, pp. 1-36.
U.S. Patent Office, "Office Action", "from U.S. Appl. No. 12/705,514", dated Nov. 13, 2015, No. 1-15, Published in: US.
US Patent Office, "Office Action", "from U.S. Appl. No. 12/705,514", dated Nov. 14, 2016, pp. 1-28, Published in: US.
U.S. Patent and Trademark Office, "Pre-Appeal Brief Decision", "U.S. Appl. No. 12/705,514", filed Dec. 18, 2012, pp. 1-2.
Korean Intellectual Property Office, "International Search Report", "from PCT Application No. PCT/US2010/024188", dated Sep. 28, 2010, pp. 1-9, Published in: KR.
State Intellectuall Property Office, P.R. China, "Fifth Office Action from CN Application No. 201080016490.4 dated Mar. 27, 2014", "from Foreign Counterpart of U.S. Appl. No. 12/705,501", filed Mar. 27, 2014, pp. 1-7, Published in: CN.
U.S. "Office Action", "for U.S. Appl. No. 12/705,506", dated Feb. 4, 2016, pp. 1-22, Published in: US.
U.S. "Office Action", "for U.S. Appl. No. 14/614,032", dated Apr. 21, 2016, pp. 1-85, Published in: US.
U.S. "Office Action", "from U.S. Appl. No. 12/705,497", dated Jul. 1, 2015, pp. 1-33, Published in: US.
U.S. "Office Action", "from U.S. Appl. No. 12/705,497", dated Jun. 6, 2014, pp. 1-54, Published in: US.
U.S. "Office Action", "from U.S. Appl. No. 12/705,497", dated Mar. 14, 2016, pp. 1-26, Published in: US.
U.S. "Office Action", "from U.S. Appl. No. 12/705,501", dated Sep. 24, 2013, pp. 1-18.
U.S. "Office Action", "from U.S. Appl. No. 12/705,506", dated Jun. 4, 2014, p. 1-62, Published in: US.
U.S. "Office Action", "from U.S. Appl. No. 12/705,514", dated Nov. 13, 2015, No. 1-15, Published in: US.
U.S. "Office Action", "from U.S. Appl. No. 12/705,514", dated Nov. 14, 2016, pp. 1-28, Published in: US.
U.S. "Office Action", "from U.S. Appl. No. 12/705,514", dated Sep. 25, 2013, pp. 1-45, Published in: US.
U.S. "Office Action", "U.S. Appl. No. 12/705,497", dated Apr. 17, 2012, pp. 1-31.
U.S. "Office Action", "U.S. Appl. No. 12/705,501", dated Apr. 5, 2013, pp. 1-39.
U.S. "Office Action", "U.S. Appl. No. 12/705,506", dated Jun. 28, 2012, pp. 1-32.
U.S. "Office Action", "U.S. Appl. No. 12/705,514", dated Nov. 4, 2014, pp. 1-36.
U.S. "Pre-Appeal Brief Decision", "U.S. Appl. No. 12/705,514", dated Dec. 18, 2012, pp. 1-2.
U.S. "Restriction Requirement", "U.S. Appl. No. 12/705,501", dated Dec. 14, 2012, pp. 16.
Korean Intellectual Property Office, "International Search Report", "from PCT Application No. PCT/US2010/024184", dated Sep. 27, 2010, pp. 1-10, Published in: KR.
Canadian Intellectual Property Office, "Notice of Allowance Application No. 2,756,267", "from U.S. Appl. No. 12/705,506", dated Nov. 24, 2016, p. 1, published in: CA.
Mexican Patent Office, "Third Office Action from MX Application No. MA/a/2011/008507", "from Foreign Counterpart of U.S. Appl. No. 12/705,501", dated Jun. 12, 2014, pp. 1-20, Published in: MX.
Mexican Patent Office, "Notice of Allowance from MX Application No. MX/a/2011/008507 dated Oct. 17, 2014", "from Foreign Counterpart of U.S. Appl. No. 12/705,506", filed Oct. 17, 2014, pp. 1-2, Published in: MX.
Mexican Patent Office, "Office Action from MX Application No. MX/a/2011/008507 dated Oct. 11, 2013", "from Foreign Counterpart of U.S. Appl. No. 12/705,501", filed Oct. 11, 2013, pp. 1-11, Published in: MX.
Mexican Patent Office, "Second Office Action from MX Application No. MX/a/2011/008507 dated Mar. 19, 2014", "from Foreign Counterpart of U.S. Appl. No. 12/705,501", filed Mar. 19, 2014, pp. 1-23, Published in: MX.
Mexican Patent Office, "Final Office Action from MX Application No. MX/a/2011/008507 dated Sep. 15, 2014", "from Foreign Counterpart of U.S. Appl. No. 12/705,501", filed Sep. 15, 2014, pp. 1-16, Published in: MX.
Mexican Patent Office, "Third Office Action from MX Application No. MX/a/2011/008507 dated May 29, 2014", "from Foreign Counterpart of U.S. Appl. No. 12/705,501", filed May 29, 2014, pp. 1-20, Published in: MX.
Mexican Patent Office, "Office Action for Mexican Application No. MX/a/2014/012184", "from Foreign Counterpart to U.S. Pat. No. 8,982,715", dated May 13, 2015, pp. 1-9, Published in: MX.
Mexican Patent Office, "Office Action for MX Application No. MX/a/2015/016990", "from Foreign Counterpart to U.S. Appl. No. 12/705,501", dated Jul. 29, 2016, pp. 1-3, Published in: MX.
Mexican Patent Office, "Office Action from MX Application No. MX/a/2015/016990", "from Foreign Counterpart to U.S. Appl. No. 12/705,501", dated Jan. 30, 2017, pp. 1-4, Published in: MX.
United States Patent and Trademark Office, "Advisory Action", "from U.S. Appl. No. 12/705,501", dated Jun. 16, 2014, pp. 1-3, Published in: US.
United States Patent and Trademark Office, "Final Office Action", "from U.S. Appl. No. 12/705,501", dated Apr. 10, 2014, pp. 1-24, Published in: US.
United States Patent and Trademark Office, "Notice of Allowance and Fee(s) Due", "from U.S. Appl. No. 12/705,501", dated Nov. 4, 2014, pp. 1-28, Published in: US.
United States Patent and Trademark Office, "Office Action", "U.S. Appl. No. 12/705,501", dated Apr. 5, 2013, pp. 1-39.
United States Patent and Trademark Office, "Office Action", "from U.S. Appl. No. 12/705,501", dated Sep. 24, 2013, pp. 1-18.
United States Patent and Trademark Office, "Restriction Requirement", "U.S. Appl. No. 12/705,501", dated Dec. 14, 2012, pp. 1-6.
United States Patent and Trademark Office, "Notice of Allowance", "from U.S. Appl. No. 14/614,032", dated Nov. 10, 2016, pp. 1-14, Published in: US.
United States Patent and Trademark Office, "Notice of Allowance", "From U.S. Appl. No. 14/614,032", dated Mar. 31, 2017, pp. 1-16, Published in: US.
United States Patent and Trademark Office, "Office Action", "For U.S. Appl. No. 14/614,032", dated Apr. 21, 2016, pp. 1-85, Published in: US.
Australian Government, "Notice of Acceptance from AU Application No. 2010213549 dated Nov. 19, 2014", "from Foreign Counterpart of U.S. Appl. No. 12/705,506", filed Nov. 19, 2014, pp. 1-2, Published in: AU.
Australian Government IP Australia, "Patent Examination Report No. 1 from AU Application No. 2010213549 dated May 5, 2014", "from Foreign Counterpart of U.S. Appl. No. 12/705,506", filed May 5, 2014, pp. 1-4, Published in: AU.

(56) References Cited

OTHER PUBLICATIONS

Australian Government, "Patent Examination Report No. 1 from AU Application No. 2010213549 dated May 5, 2014", "from Foreign Counterpart of U.S. Appl. No. 12/705,506", filed May 5, 2014, pp. 1-4.
State Intellectual Property Office, P.R. China, "First Office Action from CN Application No. 201080016474.5 dated Apr. 11, 2014", "from Foreign Counterpart of U.S. Appl. No. 12/705,506", filed Apr. 11, 2014, pp. 1-20, Published in: CN.
State Intellectual Property Office, P.R. China, "Second Office Action from CN Application No. 201080016474.5 dated Dec. 22, 2014", "from Foreign Counterpart of U.S. Appl. No. 14/614,039", filed Dec. 22, 2014, pp. 1-8, Published in: CN.
European Patent Office, "Extended European Search Report from EP Application No. 10741844.4 dated Oct. 11, 2012", "from Foreign Counterpart of U.S. Appl. No. 12/705,506", filed Oct. 11, 2012, pp. 1-9, Published in: EP.
European Patent Office, "Extended European Search Report for EP Application No. 10741844.4", "from Foreign Counterpart to U.S. Appl. No. 12/705,506", dated Oct. 11, 2012, pp. 1-9, Published in: EP.
Instituto Mexicano De La Propiedad Industrial, "Notice of Allowance from MX Application No. MX/a/2011/008517 dated Oct. 17, 2014", "from Foreign Counterpart of U.S. Appl. No. 12/705,506", filed Oct. 17, 2014, pp. 1-2, Published in: MX.
Mexican Patent Office, "Office Action from MX Application No. MX/a/2011/008517 dated Oct. 11, 2013", "from Foreign Counterpart of U.S. Appl. No. 12/705,506", filed Oct. 11, 2013, pp. 1-7, Published in: MX.
Instituto Mexicano De La Propiedad Industrial, "Second Office Action from MX Application No. MX/a/2011/008517 dated Mar. 20, 2014", "from Foreign Counterpart of U.S. Appl. No. 12/705,506", filed Mar. 20, 2014, pp. 1-9, Published in: MX.
Institute Mexicano De La Propiedad Industrial, "Office Action from MX Application No. MX/a/2011/008517 dated May 28, 2014", "from Foreign Counterpart of U.S. Appl. No. 12/705,506", filed May 28, 2014, pp. 1-11, Published in: MX.
Instituto Mexicano De La Proprided Industrial, "Final Office Action from MX Application No. MX/a/2011/008517 dated Sep. 15, 2014", "from Foreign Counterpart of U.S. Appl. No. 12/705,506", filed Sep. 15, 2014, pp. 1-7, Published in: MX.
Instituto Mexicano De La Propiedad Industrial, "Office Action from MX Application No. MX/a/2014/012183 dated Jan. 26, 2015", "from Foreign Counterpart of U.S. Appl. No. 14/614,039", filed Jan. 26, 2015, pp. 1-5, Published in: MX.
U.S. Patent and Trademark Office, "Final Office Action", "U.S. Appl. No. 12/705,506", dated Dec. 14, 2012, pp. 1-29.
U.S. Patent and Trademark Office, "Notice of Allowance and Fees Due", "U.S. Appl. No. 12/705,506", dated Nov. 4, 2014, pp. 1-20.
U.S. Patent Office, "Notice of Allowance", "from U.S. Appl. No. 12/705,506", dated Jul. 15, 2015, pp. 1-9, Published in: US.
European Patent Office, "Communication pursuant to Article 94(3) from EP Application No. 10741845.1 dated Mar. 7, 2018", from Foreign Counterpart to PCT Application No. PCT/US2010/024188, Mar. 7, 2018, pp. 1-4, Published: EP.
State Intellectual Property Office, P.R. China, "Office Action from CN Application No. 201410579849.9 dated Mar. 27, 2018", from Foreign Counterpart to PCT Application No. PCT/US2010/024188, Mar. 27, 2018, pp. 1-28, Published: CN.
State Intellectual Property Office, P.R. China, "Office Action from CN Application No. 2014105798499 dated Oct. 12, 2018", from Foreign Counterpart to PCT Application No. PCT/US2010/024188, Oct. 12, 2018, pp. 1-6, Published: CN.
U.S. Patent and Trademark Office, "Restriction Requirement", U.S. Appl. No. 14/614,039, dated Jul. 14, 2016, pp. 1-6, Published: US.
European Patent Office, "Communication pursuant to Article 94(3) from EP Application No. 10741842.8 dated Nov. 7, 2018", from Foreign Counterpart to PCT Application No. PCT/US10/24181, Nov. 7, 2018, pp. 1-4, Published: EP.
National Intellectual Property Office, P.R. China, "Notification to Grant Patent Right for Invention from CN Application No. 201410579849.9 dated Feb. 12, 2019", from Foreign Counterpart to U.S. Appl. No. 12/705,514, filed Feb. 12, 2019, pp. 1-4, Published: CN.
State Intellectual Property Office of PR China, "Notification to Grant Patent from CN Application No. 201080016490.4 dated Dec. 1, 2014", "from Foreign Counterpart of U.S. Appl. No. 12/705,501", dated Dec. 1, 2014, pp. 1-5, Published in: CN.
State Intellectual Property Office, P.R. China, "Fifth Office Action for CN Application No. 201080016472.6 dated May 6, 2014", Foreign Counterpart to U.S. Appl. No. 12/705,514, filed May 6, 2014, pp. 1-8, Published in: CN.
State Intellectual Property Office, P.R. China, "First Office Action for CN Application No. 201080016472.6 dated Sep. 4, 2012", "Foreign Counterpart to U.S. Appl. No. 12/705,514", filed Sep. 4, 2012, pp. 1-14, Published in: CN.
State Intellectual Property Office, P.R. China, "Fourth Office Action for CN Application No. 201080016472.6 dated Nov. 5, 2013", "Foreign Counterpart to U.S. Appl. No. 12/705,514", filed Nov. 5, 2013, pp. 1-20, Published in: CN.
State Intellectual Property Office, P.R. China, "Second Office Action for CN Application No. 201080016472.6 dated Mar. 5, 2013", "Foreign Counterpart to U.S. Appl. No. 12/705,514", filed Mar. 5, 2013, pp. 1-24, Published in: CN.
State Intellectual Property Office, P.R. China, "Third Office Action for CN Application No. 201080016472.6 dated Jun. 24, 2013", "Foreign Counterpart to U.S. Appl. No. 12/705,514", filed Jun. 24, 2013, pp. 1-18, Published in: CN.
State Intellectual Property Office, P.R. China, "Decision on Rejection from CN Application No. 201080016488.7 dated Feb. 25, 2014", "from Foreign Counterpart of U.S. Appl. No. 12/705,497", dated Feb. 25, 2014, pp. 1-41, Published in: CN.
State Intellectual Property Office, P.R. China, "First Office Action from CN Application No. 201080016474.5 dated Apr. 11, 2014", "from Foreign Counterpart of U.S. Appl. No. 12/705,506", dated Apr. 11, 2014, pp. 1-20, Published in: CN.
State Intellectual Property Office, P.R. China, "Notification to Grant Patent Right for Invention from CN Application No. 201080016472.6 dated Aug. 12, 2014", "from Foreign Counterpart of U.S. Appl. No. 12/705,514", dated Aug. 12, 2014, pp. 1-5, Published in: CN.
State Intellectual Property Office, P.R. China, "Second Office Action from CN Application No. 201080016474.5 dated Dec. 22, 2014", "from Foreign Counterpart of U.S. Appl. No. 14/614,039", dated Dec. 22, 2014, pp. 1-8, Published in: CN.
State Intellectual Property Office, P.R. China, "Sixth Office Action from CN Application No. 201080016490.4 dated Jul. 18, 2014", "from Foreign Counterpart of U.S. Appl. No. 12/705,501", dated Jul. 18, 2014, pp. 1-7, Published in: CN.
State Intellectual Property Office, P.R. China, "Third Office Action from CN Application No. 201080016488.7 dated Dec. 2, 2013", "from Foreign Counterpart of U.S. Appl. No. 12/705,497", dated Dec. 2, 2013, pp. 1-38, Published in: CN.
State Intellectual Property Office, P.R. China, "Third Office Action", "from Foreign Counterpart of U.S. Appl. No. 12/705,501", dated Jul. 31, 2013, pp. 1-7, Published in: CN.
State Intellectual Property Office, P.R. China, "Fourth Office Action from CN Application No. 201080016490.4 dated Dec. 4, 2013", "from Foreign Counterpart of U.S. Appl. No. 12/705,501", dated Dec. 4, 2013, pp. 1-7, Published in: CN.
U.S. Patent and Trademark Office, "Office Action for U.S. Appl. No. 12/705,514", dated Mar. 15, 2012, pp. 1-25, Published in: US.
U.S. "Advisory Action", "from U.S. Appl. No. 12/705,501", dated Jun. 16, 2014, pp. 1-3, Published in: US.
U.S. "Advisory Action", "from U.S. Appl. No. 12/705,514", dated Aug. 16, 2016, pp. 1-18, Published in: US.
U.S. "Advisory Action", "From U.S. Appl. No. 12/705,514", dated Jun. 6, 2017, pp. 1-4, Published in: US.
U.S. "Advisory Action", "from U.S. Appl. No. 12/705,514", dated Mar. 25, 2014, pp. 1-4, Published in: US.
U.S. "Advisory Action", "U.S. Appl. No. 12/705,514", dated Nov. 14, 2012, pp. 1-4, Published in: US.

(56) References Cited

OTHER PUBLICATIONS

U.S. "Final Office Action", "from U.S. Appl. No. 12/705,497", dated Dec. 24, 2015, pp. 1-35, Published in: US.
U.S. "Final Office Action", "from U.S. Appl. No. 12/705,501", dated Apr. 10, 2014, pp. 1-24, Published in: US.
U.S. "Final Office Action", "from U.S. Appl. No. 12/705,514", dated Apr. 25, 2016, pp. 1-25, Published in: US.
U.S. "Final Office Action", "from U.S. Appl. No. 12/705,514", dated Feb. 11, 2014, pp. 1-15, Published in: US.
U.S. "Final Office Action", "from U.S. Appl. No. 12/705,514", dated Mar. 23, 2017, pp. 1-27, Published in: US.
U.S. "Final Office Action", "U.S. Appl. No. 12/705,497", dated Dec. 10, 2014, pp. 1-29.
U.S. "Final Office Action", "U.S. Appl. No. 12/705,497", dated Oct. 16, 2012, pp. 1-29.
U.S. "Final Office Action", "U.S. Appl. No. 12/705,506", dated Dec. 14, 2012, pp. 1-29.
U.S. "Final Office Action", "U.S. Appl. No. 12/705,514", dated Aug. 23, 2012, pp. 1-20, Published in: US.
U.S. "Notice of Allowance and Fee(s) Due", dated Nov. 4, 2014, pp. 1-28.
U.S. "Notice of Allowance and Fees Due", "U.S. Appl. No. 12/705,506", dated Nov. 4, 2014, pp. 1-20.
U.S. "Notice of Allowance for U.S. Appl. No. 12/705,514", dated Apr. 1, 2015, pp. 1-9, Published in: US.
U.S. "Notice of Allowance", "from U.S. Appl. No. 12/705,497", dated Mar. 8, 2017, pp. 1-9, Published in: US.
U.S. "Notice of Allowance", "from U.S. Appl. No. 12/705,497", dated Nov. 18, 2016, pp. 1-13, Published in: US.
U.S. "Notice of Allowance", "from U.S. Appl. No. 12/705,506", dated Jul. 1, 2016, pp. 1-11, Published in: US.
U.S. "Notice of Allowance", "from U.S. Appl. No. 12/705,506", dated Jul. 15, 2015, pp. 1-9, Published in: US.
U.S. "Notice of Allowance", "from U.S. Appl. No. 12/705,506", dated Oct. 1, 2015, pp. 1-11, Published in: US.
U.S. "Notice of Allowance", "from U.S. Appl. No. 12/705,514", dated Jul. 28, 2015, pp. 1-11, Published in: US.
U.S. "Notice of Allowance", "From U.S. Appl. No. 14/614,032", dated Mar. 31, 2017, pp. 1-16, Published in: US.
U.S. "Notice of Allowance", "from U.S. Appl. No. 14/614,032", dated Nov. 10, 2016, pp. 1-14, Published in: US.
U.S. Patent and Trademark Office, "Notice of Allowance from U.S. Appl. No. 12/705,514 dated Jun. 27, 2018" pp. 1-21; Published: US.
European Patent Office, "Communication pursuant to Article 94(3) from EP Application No. 10741843.6 dated Nov. 13, 2018", from Foreign Counterpart to PCT Application No. PCT/US10/24184, Nov. 13, 2018, pp. 1-4, Published: EP.
European Patent Office, "Communication pursuant to Article 94(3) from EP Application No. 10741845.1 dated Nov. 21, 2018", from Foreign Counterpart to PCT Application No. PCT/US2010/024188, Nov. 21, 2018, pp. 1-4, Published: EP.

SYSTEM INCLUDING MANAGEMENT SYSTEM TO DETERMINE CONFIGURATION FOR INTER-NETWORKING DEVICE BASED ON PHYSICAL LAYER INFORMATION OF A NETWORK

CROSS-REFERENCE TO RELATED APPLICATIONS

This application is a continuation application of U.S. patent application Ser. No. 14/614,039, filed Feb. 4, 2015, which is a divisional application of U.S. patent application Ser. No. 12/705,506, filed Feb. 12, 2010, which issued as U.S. Pat. No. 9,491,119, and which claims the benefit of U.S. Provisional Patent Application Ser. No. 61/152,624, filed Feb. 13, 2009, all of which are hereby incorporated herein by reference.

BACKGROUND

Communication networks typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

A network or enterprise management system (generally referred to here as a "network management system" or "NMS") is typically aware of the logical communication links that exist in a network but typically does not have information about the specific physical layer media that are used to implement the logical communication links. Indeed, NMS systems typically do not have the ability to display or otherwise provide information about how logical communication links are implemented at the physical layer level.

Physical layer management (PLM) systems do exist. However, existing PLM systems are typically designed to facilitate the adding, changing, and removing of cross connections at a particular patch panel or a set of patch panels at a given location. Generally, such PLM systems include functionality to track what is connected to each port of a patch panel, trace connections that are made using a patch panel, and provide visual indications to a user at a patch panel. However, such PLM systems are typically "patch-panel" centric in that they are focused on helping a technician correctly add, change, or remove cross connections at a patch panel. Any "intelligence" included in or coupled to the patch panel is typically only designed to facilitate making accurate cross connections at the patch panel and trouble shooting related problems (for example, by detecting whether a patch cord is inserted into a given port and/or by determining which ports are coupled to one another using a patch cord).

Moreover, any information that such PLM systems collect is typically only used within the PLM systems. In other words, the collections of information that such PLM systems maintain are logical "islands" that are not used at the application-layer level by other systems. Though such PLM systems are sometimes connected to other networks (for example, connected to local area networks or the Internet), such network connections are typically only used to enable a user to remotely access the PLM systems. That is, a user remotely accesses the PLM-related application-layer functionality that resides in the PLM system itself using the external network connection but external systems or networks typically do not themselves include any application-layer functionality that makes use of any of the physical-layer-related information that resides in the PLM system.

SUMMARY

One exemplary embodiment is directed to a network management system (NMS) comprising an interface to communicatively couple the NMS to a network and a programmable processor configured to execute software. The software comprises physical layer information (PLI) functionality that receives physical layer information. The NMS uses at least a portion of the physical layer information in performing a network management function. At least a portion of the physical layer information was read from a storage device included in or on physical communication media.

Another exemplary embodiment is directed to a method that is performed when a channel has been certified as complying with at least one channel specification. The method includes receiving information about the compliance of components used to implement the channel with at least one component specification and receiving information about the compliance of a permanent link used to implement the channel with at least one permanent link specification. The method further includes receiving information about the compliance of the channel with the at least one channel specification and determining, using physical layer information associated with the components used to implement the channel at that time, if the basis for the channel being certified as being in compliance with the at least one channel specification has changed since when the channel was certified as being in compliance with the at least one channel. The physical layer information associated with the components used to implement the channel at that time includes information stored on or in the component that identifies the components.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
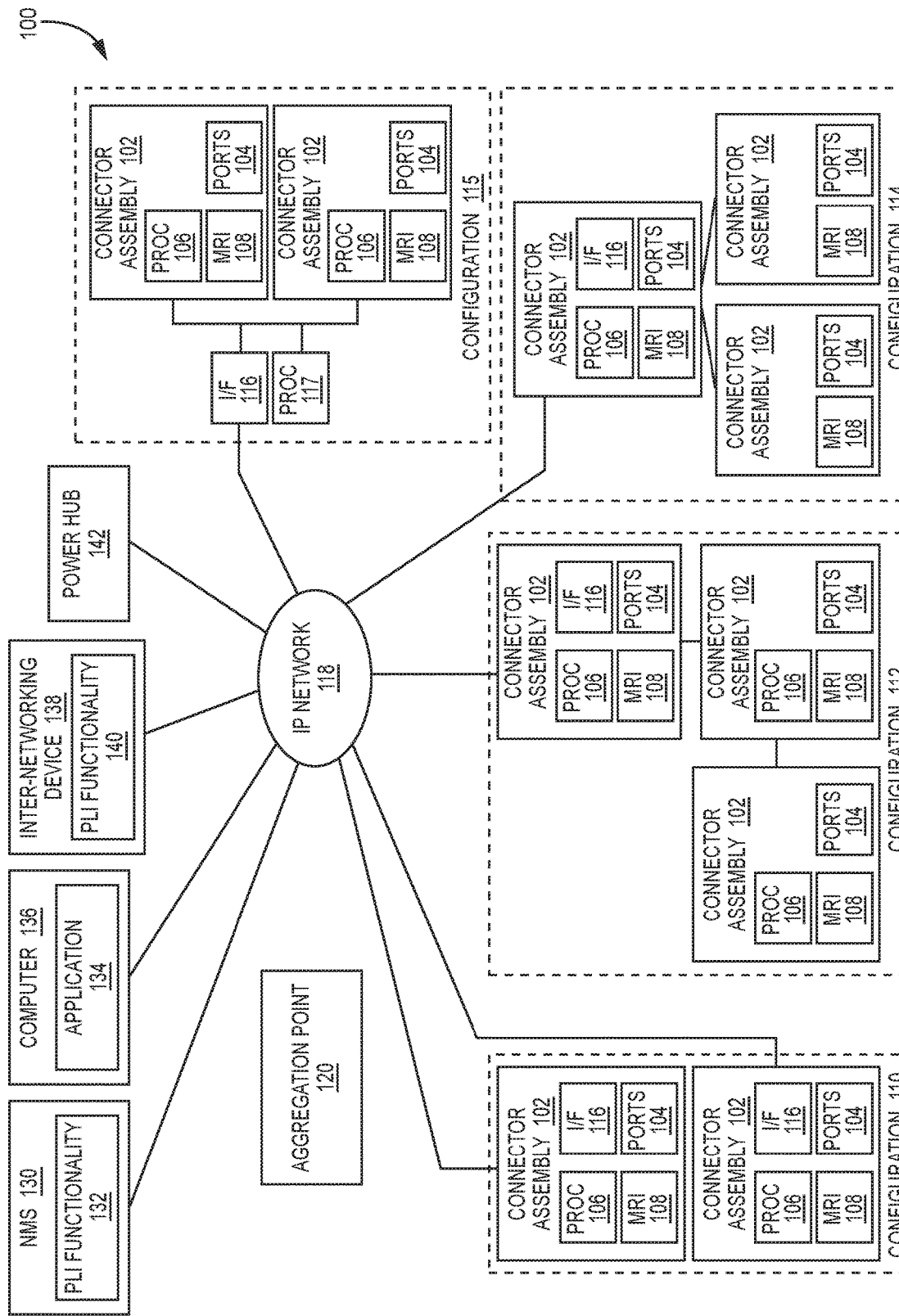
FIG. 1 is a block diagram of one exemplary embodiment of a system that includes physical layer information (PLI) functionality as well as physical layer management (PLM) functionality.

FIG. 1 is a block diagram of one embodiment of a system 100 that includes physical layer information (PLI) functionality as well as physical layer management (PLM) functionality. The system 100 comprises a plurality of connector assemblies 102, where each connector assembly 102 comprises one or more ports 104. In general, the connector assemblies 102 are used to attach segments of physical communication media to one another.

Each segment of physical communication media is attached to a respective port 104. Each port 104 is used to connect two or more segments of physical communication media to one another (for example, to implement a portion of a logical communication link). Examples of connector assemblies 102 include, for example, rack-mounted connector assemblies (such as patch panels, distribution units, and media converters for fiber and copper physical communication media), wall-mounted connector assemblies (such as boxes, jacks, outlets, and media converters for fiber and copper physical communication media), and inter-networking devices (such as switches, routers, hubs, repeaters, gateways, and access points).

At least some of the connector assemblies 102 are designed for use with segments of physical communication media that have identifier and attribute information stored in or on them. The identifier and attribute information is stored in or on the segment of physical communication media in a manner that enables the stored information, when the segment is attached to a port 104, to be read by a programmable processor 106 associated with the connector assembly 102. Examples of information that can be stored in or on a segment of physical communication media include, without limitation, an identifier that uniquely identifies that particular segment of physical communication media (similar to an ETHERNET Media Access Control (MAC) address but associated with the physical communication media and/or connector attached to the physical communication media), a part number, a plug or other connector type, a cable or fiber type and length, a serial number, a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in or on the media segments. For example, testing or media quality or performance information can be stored in or on the segment of physical communication media. The testing or media quality or performance information, for example, can be the results of testing that is performed when a particular segment of media is manufactured.

Also, as noted below, in some embodiments, the information stored in or on the segment of physical communication media can be updated. For example, the information stored in or on the segment of physical communication media can be updated to include the results of testing that is performed when a segment of physical media is installed or otherwise checked. In another example, such testing information is supplied to an aggregation point 120 and stored in a data store maintained by the aggregation point 120 (both of which are described below). In another example, the information stored in or on the segment of physical communication media includes a count of the number of times that a connector (not shown) attached to a segment of physical communication media has been inserted into port 104. In such an example, the count stored in or on the segment of physical communication media is updated each time the connector is inserted into port 104. This insertion count value can be used, for example, for warranty purposes (for example, to determine if the connector has been inserted more than the number of times specified in the warranty) or for security purposes (for example, to detect unauthorized insertions of the physical communication media).

In the particular embodiment shown in FIG. 1, each of the ports 104 of the connector assemblies 102 comprises a respective media reading interface 108 via which the respective programmable processor 106 is able to determine if a physical communication media segment is attached to that port 104 and, if one is, to read the identifier and attribute information stored in or on the attached segment (if such information is stored therein or thereon). The programmable processor 106 associated with each connector assembly 102 is communicatively coupled to each of the media reading interfaces 108 using a suitable bus or other interconnect (not shown).

In the particular embodiment shown in FIG. 1, four exemplary types of connector assembly configurations are shown. In the first connector assembly configuration 110 shown in FIG. 1, each connector assembly 102 includes its own respective programmable processor 106 and its own respective network interface 116 that is used to communicatively couple that connector assembly 102 to an Internet Protocol (IP) network 118.

In the second type of connector assembly configuration 112, a group of connector assemblies 102 are physically located near each other (for example, in a bay or equipment closet). Each of the connector assemblies 102 in the group includes its own respective programmable processor 106. However, in the second connector assembly configuration 112, some of the connector assemblies 102 (referred to here as "interfaced connector assemblies") include their own respective network interfaces 116 while some of the connector assemblies 102 (referred to here as "non-interfaced connector assemblies") do not. The non-interfaced connector assemblies 102 are communicatively coupled to one or more of the interfaced connector assemblies 102 in the group via local connections. In this way, the non-interfaced connector assemblies 102 are communicatively coupled to the IP network 118 via the network interface 116 included in one or more of the interfaced connector assemblies 102 in the group. In the second type of connector assembly configuration 112, the total number of network interfaces 116 used to couple the connector assemblies 102 to the IP network 118 can be reduced. Moreover, in the particular embodiment shown in FIG. 1, the non-interfaced connector assemblies 102 are connected to the interfaced connector assembly 102 using a daisy chain topology (though other topologies can be used in other implementations and embodiments).

In the third type of connector assembly configuration 114, a group of connector assemblies 102 are physically located near each other (for example, within a bay or equipment closet). Some of the connector assemblies 102 in the group (also referred to here as "master" connector assemblies 102) include both their own programmable processors 106 and network interfaces 116, while some of the connector assemblies 102 (also referred to here as "slave" connector assemblies 102) do not include their own programmable processors 106 or network interfaces 116. Each of the slave connector assemblies 102 is communicatively coupled to one or more of the master connector assemblies 102 in the group via one or more local connections. The programmable processor 106 in each of the master connector assemblies 102 is able to carry out the processing described below for both the master connector assembly 102 of which it is a part and any slave connector assemblies 102 to which the master connector assembly 102 is connected via the local connections. As a result, the cost associated with the slave connector assemblies 102 can be reduced. In the particular embodiment shown in FIG. 1, the slave connector assemblies 102 are connected to a master connector assembly 102 in a star topology (though other topologies can be used in other implementations and embodiments).

Each programmable processor 106 is configured to execute software or firmware that causes the programmable processor 106 to carry out various functions described below. Each programmable processor 106 also includes suitable memory (not shown) that is coupled to the programmable processor 106 for storing program instructions and data. In general, the programmable processor 106 determines if a physical communication media segment is attached to a port 104 with which that processor 106 is associated and, if one is, to read the identifier and attribute information stored in or on the attached physical communication media segment (if the segment includes such information stored therein or thereon) using the associated media reading interface 108.

In the first, second, and third configurations 110, 112, and 114, each programmable processor 106 is also configured to communicate physical layer information to devices that are coupled to the IP network 118. The physical layer information (PLI) includes information about the connector assemblies 102 associated with that programmable processor 106 (also referred to here as "device information") as well as information about any segments of physical media attached to the ports 104 of those connector assemblies 102 (also referred to here as "media information") The device information includes, for example, an identifier for each connector assembly, a type identifier that identifies the connector assembly's type, and port priority information that associates a priority level with each port. The media information includes identity and attribute information that the programmable processor 106 has read from attached physical media segments that have identifier and attribute information stored in or on it. The media information may also include information about physical communication media that does not have identifier or attribute information stored in or on it. This latter type of media information can be manually input at the time the associated physical media segments are attached to the connector assembly 102 (for example, using a management application executing on the programmable processor 106 that enables a user to configure and monitor the connector assembly 102).

In the fourth type of connector assembly configuration 115, a group of connector assemblies 102 are housed within a common chassis or other enclosure. Each of the connector assemblies 102 in the configuration 115 includes their own programmable processors 106. In the context of this configuration 115, the programmable processors 106 in each of the connector assemblies are "slave" processors 106. Each of the slave programmable processor 106 is also communicatively coupled to a common "master" programmable processor 117 (for example, over a backplane included in the chassis or enclosure). The master programmable processor 117 is coupled to a network interface 116 that is used to communicatively couple the master programmable processor 117 to the IP network 118. In this configuration 115, each slave programmable processor 106 is configured to determine if physical communication media segments are attached to its port 104 and to read the identifier and attribute information stored in or on the attached physical communication media segments (if the attached segments have such information stored therein or thereon) using the associated media reading interfaces 108. This information is communicated from the slave programmable processor 106 in each of the connector assemblies 102 in the chassis to the master processor 117. The master processor 117 is configured to handle the processing associated with communicating the physical layer information read from by the slave processors 106 to devices that are coupled to the IP network 118.

The system 100 includes functionality that enables the physical layer information that the connector assemblies 102 capture to be used by application-layer functionality outside of the traditional physical-layer management application domain. That is, the physical layer information is not retained in a PLM "island" used only for PLM purposes but is instead made available to other applications. In the particular embodiment shown in FIG. 1, the system 100 includes an aggregation point 120 that is communicatively coupled to the connector assemblies 102 via the IP network 118.

The aggregation point 120 includes functionality that obtains physical layer information from the connector assemblies 102 (and other devices) and stores the physical layer information in a data store.

The aggregation point 120 can be used to receive physical layer information from various types of connector assemblies 106 that have functionality for automatically reading information stored in or on the segment of physical communication media. Examples of such connector assemblies 106 are noted above. Also, the aggregation point 120 and aggregation functionality 124 can also be used to receive physical layer information from other types of devices that have functionality for automatically reading information stored in or on the segment of physical communication media. Examples of such devices include end-user devices—such as computers, peripherals (such as printers, copiers, storage devices, and scanners), and IP telephones—that include functionality for automatically reading information stored in or on the segment of physical communication media.

The aggregation point 120 can also be used to obtain other types of physical layer information. For example, in this embodiment, the aggregation point 120 also obtains information about physical communication media segments that is not otherwise automatically communicated to an aggregation point 120. One example of such information is information about non-connectorized physical communication media segments that do not otherwise have information stored in or on them that are attached to a connector assembly (including, for example, information indicating which ports of the devices are connected to which ports of other devices in the network as well as media information about the segment). Another example of such information is information about physical communication media segments that are connected to devices that are not be able to read media information that is stored in or on the media segments that are attached to their ports and/or that are not able to communicate such information to the aggregation point 120 (for example, because such devices do not include such functionality, because such devices are used with media segments that do not have media information stored in or on them, and/or because bandwidth is not available for communicating such information to the aggregation point 120). In this example, the information can include, for example, information about the devices themselves (such as the devices' MAC addresses and IP addresses if assigned to such devices), information indicating which ports of the devices are connected to which ports of other devices in the network (for example, other connector assemblies), and information about the physical media attached to the ports of the devices. This information can be provided to the aggregation point 120, for example, by manually entering such information into a file (such as a spreadsheet) and then uploading the file to the aggregation point 120 (for example, using a web browser) in connection with the initial installation of each of the various items. Such information can also, for example, be directly entered using a user interface provided by the aggregation point 120 (for example, using a web browser).

The aggregation point 120 can also obtain information about the layout of the building or buildings in which the network is deployed, as well as information indicating where each connector assembly 102, physical media segment, and inter-networking device is located within the building. This information can be, for example, manually entered and verified (for example, using a web browser) in connection with the initial installation of each of the various items. In one implementation, such location information includes an X, Y, and Z location for each port or other termination point for each physical communication media segment (for example, X, Y, and Z location information of the type specified in the ANSI/TIA/EIA 606-A Standard (Administration Standard For The Commercial Telecommunications Infrastructure)).

The aggregation point 120 can obtain and maintain testing, media quality, or performance information relating to the various segments of physical communication media that exist in the network. The testing, media quality, or performance information, for example, can be results of testing that is performed when a particular segment of media is manufactured and/or when testing is performed when a particular segment of media is installed or otherwise checked.

The aggregation point 120 also includes functionality that provides an interface for external devices or entities to access the physical layer information maintained by the aggregation point 120. This access can include retrieving information from the aggregation point 120 as well as supplying information to the aggregation point 120. In this embodiment, the aggregation point 120 is implemented as "middleware" that is able to provide such external devices and entities with transparent and convenient access to the PLI maintained by the access point 120. Because the aggregation point 120 aggregates PLI from the relevant devices on the IP network 118 and provides external devices and entities with access to such PLI, the external devices and entities do not need to individually interact with all of the devices in the IP network 118 that provide PLI, nor do such devices need to have the capacity to respond to requests from such external devices and entities.

The aggregation point 120, in the embodiment shown in FIG. 1, implements an application programming interface (API) by which application-layer functionality can gain access to the physical layer information maintained by the aggregation point 120 using a software development kit (SDK) that describes and documents the API.

For example, as shown in FIG. 1, a network management system (NMS) 130 includes physical layer information (PLI) functionality 132 that is configured to retrieve physical layer information from the aggregation point 120 and provide it to the other parts of the NMS 130 for use thereby. The NMS 130 uses the retrieved physical layer information to perform one or more network management functions (for example, as described below). In one implementation of the embodiment shown in FIG. 1, the PLI functionality 132 of the NMS 130 retrieves physical layer information from the aggregation point 120 using the API implemented by the aggregation point 120. The NMS 130 communicates with the aggregation point 120 over the IP network 118.

As shown in FIG. 1, an application 134 executing on a computer 136 can also use the API implemented by the aggregation point 120 to access the PLI information maintained by the aggregation point 120 (for example, to retrieve such information from the aggregation point 120 and/or to supply such information to the aggregation point 120). The computer 136 is coupled to the IP network 118 and accesses the aggregation point 120 over the IP network 118.

In the embodiment shown in FIG. 1, one or more inter-networking devices 138 used to implement the IP network 118 include physical layer information (PLI) functionality 140. The PLI functionality 140 of the inter-networking device 138 is configured to retrieve physical layer information from the aggregation point 120 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device. In one implementation of such an embodiment, the PLI functionality 140 uses the API implemented by the aggregation point 120 to communicate with the aggregation point 120.

The PLI functionality 140 included in the inter-networking device 138 can also be used to capture physical layer information associated with the inter-network device 138 and the physical communication media attached to it and communicate the captured physical layer information to the aggregation point 120. Such information can be provided to the aggregation point 120 using the API or by using the protocols that are used to communicate with the connector assemblies 102.

The aggregation point 120 can be implemented on a standalone network node (for example, a standalone computer running appropriate software) or can be integrated along with other network functionality (for example, integrated with an element management system or network management system or other network server or network element). Moreover, the functionality of the aggregation point 120 can be distribute across many nodes and devices in the network and/or implemented, for example, in a hierarchical manner (for example, with many levels of aggregation points).

Moreover, the aggregation point 120 and the connector assemblies 102 are configured so that the aggregation point 120 can automatically discover and connect with devices that provide PLI to an aggregation point 120 (such as the connector assemblies 102 and inter-network device 138) that are on the network 118. In this way, when devices that are able to provide PLI to an aggregation point 120 (such as a connector assembly 102 or an inter-networking device 138) are coupled to the IP network 118, an aggregation point 120 is able to automatically discover the connector assembly 102 and start aggregating physical layer information for that connector assembly 102 without requiring the person installing the connector assembly 102 to have knowledge of the aggregation points 120 that are on the IP network. Similarly, when an aggregation point 120 is coupled to the IP network 118, the aggregation point 120 is able to automatically discover and interact with devices that are capable of providing PLI to an aggregation point without requiring the person installing the aggregation point 120 to have knowledge of the devices that are on the IP network 118. Thus, the physical-layer information resources described here can be easily integrated into the IP network 118.

The IP network 118 can include one or more local area networks and/or wide area networks (including for example the Internet). As a result, the aggregation point 120, NMS 130, and computer 136 need not be located at the same site as each other or at the same site as the connector assemblies 102 or the inter-networking devices 138.

Various conventional IP networking techniques can be used in deploying the system 100 of FIG. 1. For example, conventional security protocols can be used to secure communications if they are communicated over a public or otherwise unsecure communication channel (such as the Internet or over a wireless communication link).

In one implementation of the embodiment shown in FIG. 1, each connector assembly 102, each port 104 of each connector assembly 102, and each media segment is individually addressable. Where IP addresses are used to individually address each connector assembly 102, a virtual private network (VPN) dedicated for use with the various connector assemblies 102 can be used to segregate the IP addresses used for the connector assemblies 102 from the main IP address space that is used in the IP network 118.

Also, power can be supplied to the connector assemblies 102 using conventional "Power over Ethernet" techniques specified in the IEEE 802.3af standard, which is hereby incorporated herein by reference. In such an implementation, a power hub 142 or other power supplying device (located near or incorporated into an inter-networking device that is coupled to each connector assembly 102) injects DC power onto one or more of the wires (also referred to here as the "power wires") included in the copper twisted-pair cable used to connect each connector assembly 102 to the associated inter-networking device. The interface 116 in the connector assembly 102 picks the injected DC power off of the power wires and uses the picked-off power to power the active components of that connector assembly 102. In the second and third connector assembly configurations 112 and 114, some of the connector assemblies 102 are not directly connected to the IP network 118 and, therefore, are unable to receive power directly from the power wires. These connector assemblies 102 receive power from the connector assemblies 102 that are directly connected to the IP network 118 via the local connections that communicatively such connector assemblies 102 to one another. In the fourth configuration 115, the interface 116 picks the injected DC power off of the power wires and supplies power to the master processor 117 and each of the slave processors 106 over the backplane.

In the particular embodiment shown in FIG. 1, the system 100 also supports conventional physical layer management (PLM) operations such as the tracking of moves, adds, and changes of the segments of physical media that are attached to the ports 104 of the connector assemblies 102 and providing assistance with carrying out moves, adds, and changes. PLI provided by the aggregation point 120 can be used to improve upon conventional "guided MAC" processes. For example, information about the location of the port 104 and the visual appearance (for example, the color or shape) of the relevant physical media segment (or connector attached thereto) can be communicated to a technician to assist the technician in carrying out a move, add, or change. This information can be communicated to a computer or smartphone used by the technician. Moreover, the PLI functionality that resides in the system 100 can also be used to verify that a particular MAC was properly carried out by checking that the expected physical media segment is located in the expected port 104. If that is not the case, an alert can be sent to the technician so that the technician can correct the issue.

The PLM functionality included in the system 100 can also support conventional techniques for guiding the technician in carrying out a MAC (for example, by illuminating one or more light emitting diodes (LEDs) to direct a technician to a particular connector assembly 102 and/or to a particular port 104 or by displaying messages on a liquid crystal display (LCD) included on or near the connector assemblies 102.

Other PLM functions include keeping historical logs about the media connected to the connector assembly. In the embodiment shown in FIG. 1, the aggregation point 120 includes PLM functionality 144 that implements such PLM functions. The PLM functionality 144 does this using the physical layer information that is maintained at the aggregation point 120.

The IP network 118 is typically implemented using one or more inter-networking devices. As noted above, an inter-networking device is a type of connector assembly (and a particular implementation of an inter-networking device 138 is referenced separately in FIG. 1 for ease of explanation only). Generally, an inter-networking device can be configured to read media information that is stored in or on the segments of physical media that are attached to its ports and to communicate the media information it reads from the attached segments of media (as well as information about the inter-networking device itself) to an aggregation point 120 like any other connector assembly described here.

In addition to connector assemblies 102, the techniques described here for reading media information stored in or on a segment of physical communication media can be used in one or more end nodes of the network. For example, computers (such as, laptops, servers, desktop computers, or special-purpose computing devices such as IP telephones, IP multi-media appliances, and storage devices) can be configured to read media information that is stored in or on the segments of physical communication media that are attached to their ports and to communicate the media information the read from the attached segments of media (as well as information about the devices themselves) to an aggregation point 120 as described here.

Figure 2:
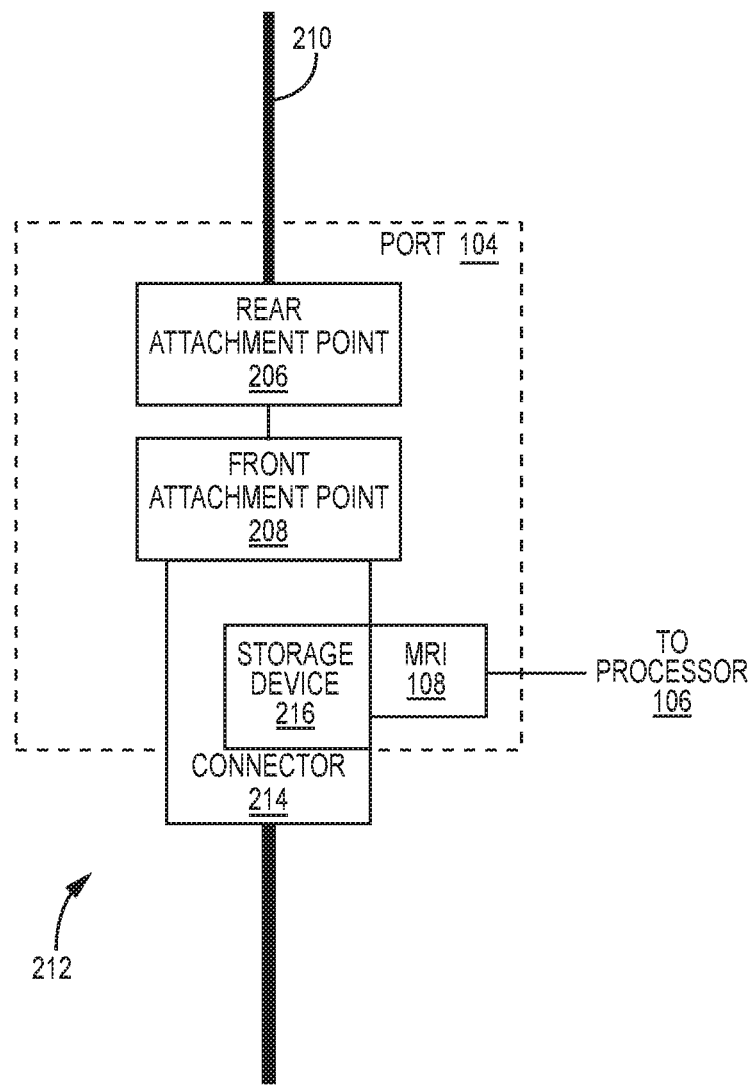
FIG. 2 is a block diagram of one high-level embodiment of a port and media reading interface that are suitable for use in the system of FIG. 1.

FIG. 2 is a block diagram of one high-level embodiment of a port 104 and media reading interface 106 that are suitable for use in the system 100 of FIG. 1.

Each port 104 comprises a first attachment point 206 and a second attachment point 208. The first attachment point 206 is used to attach a first segment of physical communication media 210 to the port 104, and the second attachment point 208 is used to attach a second segment of physical communication media 212 to the port 104.

In the particular embodiment shown in FIG. 2, the first attachment point 206 is located near the rear of the connector assembly. As a consequence, the first attachment point 206 and the first segment of physical media 210 attached thereto are also referred to here as the "rear attachment point" 206 and the "rear media segment" 210, respectively. Also, in this embodiment, the rear attachment point 206 is configured to attach the rear media segment 210 to the port 104 in a semi-permanent manner. As used herein, a semi-permanent attachment is one that is designed to be changed relatively infrequently, if ever. This is also referred to sometimes as a "one-time" connection. Examples of suitable rear connectors 206 include punch-down blocks (in the case of copper physical media) and fiber adapters, fiber splice points, and fiber termination points (in the case of optical physical media).

In the embodiment shown in FIG. 2, the second attachment point 208 is located near the front of the connector assembly 102. As a consequence, the second attachment point 208 and the second segment of physical media 212 are also referred to here as the "front attachment point" 208 and the "front media segment" 212, respectively. In the embodiment shown in FIG. 2, the front attachment point 208 for each port 104 is designed for use with "connectorized" front media segments 212 that have identifier and attribute information stored in or on them. As used herein, a "connectorized" media segment is a segment of physical communication media that includes a connector 214 at least one end of the segment. The front attachment point 208 is implemented using a suitable connector or adapter that mates with the corresponding connector 214 on the end of the front media segment 212. The connector 214 is used to facilitate the easy and repeated attachment and unattachment of the front media segment 212 to the port 104. Examples of connectorized media segments include CAT-5, 6, and 7 twisted-pair cables having modular connectors or plugs attached to both ends (in which case, the front connectors are implemented using compatible modular jacks) or optical cables having SC, LC, FC, LX.5, MTP, or MPO connectors (in which case, the front connectors are implemented using compatible SC, LC, FC, LX.5, MTP, or MPO connectors or adapters). The techniques described here can be used with other types of connectors including, for example, BNC connectors, F connectors, DSX jacks and plugs, bantam jacks and plugs, and MPO and MTP multi-fiber connectors and adapters.

Each port 104 communicatively couples the respective rear attachment point 206 to the respective front attachment point 208. As a result, a rear media segment 210 attached to the respective rear attachment point 206 is communicatively coupled to any front media segment 212 attached to the respective front attachment point 208. In one implementation, each port 104 is designed for use with a rear media segment 210 and a front media segment 212 that comprise the same type of physical communication media, in which case each port 104 communicatively couples any rear media segment 210 attached to the respective rear attachment point 206 to any front media segment 212 attached to the respective front attachment point 208 at the physical layer level without any media conversion. In other implementations, each port 104 communicatively couples any rear media segment 210 attached to the respective rear attachment point 206 to any front media segment 212 attached to the respective front attachment point 208 in other ways (for example, using a media converter if the rear media segment 210 and the front media segment 212 comprise different types of physical communication media).

As shown in FIG. 2, the port 104 is configured for use with front media segments 212 that include a storage device 216 in which the media information for that media segment 212 is stored. The storage device 216 includes a storage device interface that, when the corresponding connector 214 is inserted into (or otherwise attached to) a front attachment point 208 of the port 104, communicatively couples the storage device 216 to a corresponding media reading interface 108 so that the associated programmable processor 106 can read the information stored in the storage device 216. In one implementation of the embodiment shown in FIG. 2, each connector 214 itself houses the storage device 216. In another implementation of such an embodiment, the storage device 216 is housed within a housing that is separate from the connector 214. In such an implementation, the housing is configured so that it can be snapped onto the media segment 212 or the connector 214, with the storage device interface positioned relative to the connector 214 so that the storage device interface will properly mate with the media reading interface 108 when the connector 214 is inserted into (or otherwise attached to) the front attachment point 208.

In some implementations, at least some of the information stored in the storage device 216 can be updated in the field (for example, by having an associated programmable processor 106 cause additional information to be written to the storage device 216 or changing or deleting information that was previously stored in the storage device 216). For example, in some implementations, some of the information stored in the storage device 216 cannot be changed in the field (for example, identifier information or manufacturing information) while some of the other information stored in the storage device 216 can be changed in the field (for example, testing, media quality, or performance information). In other implementations, none of the information stored in the storage device 216 can be updated in the field.

Also, the storage device 216 may also include a processor or micro-controller, in addition to storage for the media information. In which case, the micro-controller included in the storage device 216 can be used to execute software or firmware that, for example, controls one or more LEDs attached to the storage device 216. In another example, the micro-controller executes software or firmware that performs an integrity test on the front media segment 212 (for example, by performing a capacitance or impedance test on the sheathing or insulator that surrounds the front physical communication media segment 212, (which may include a metallic foil or metallic filler for such purposes)). In the event that a problem with the integrity of the front media segment 212 is detected, the micro-controller can communicate that fact to the programmable processor 106 associated with the port 104 using the storage device interface (for example, by raising an interrupt). The micro-controller can also be used for other functions.

Figure 3:
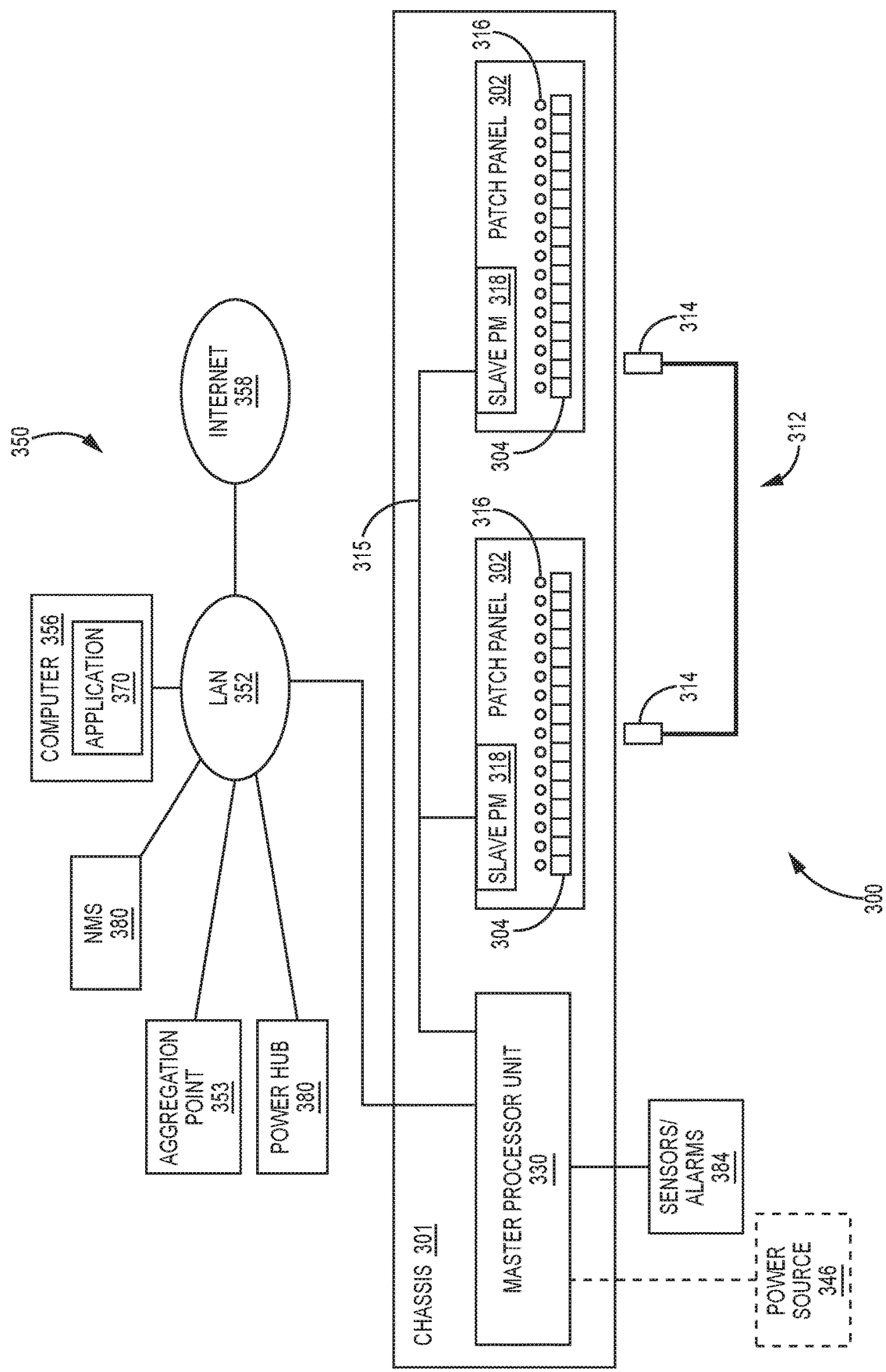
FIG. 3 illustrates one exemplary embodiment of a system that includes physical layer information (PLI) functionality as well as physical layer management (PLM) functionality.

FIG. 3 illustrates one embodiment of a system 300 that includes physical layer information (PLI) functionality as well as physical layer management (PLM) functionality. The system 300 comprises a plurality of patch panels 302 that are housed within a common chassis 301. For example, in one common configuration, the chassis 301 is installed in a communications closet or room and is mounted in a rack. In some larger installations, there are several racks of chassis 301 and patch panels 302 (arranged, for example, in several bays). The patch panels 302 can be packaged as blades that are slid into the chassis 301.

Each patch panel 302 comprises a set of ports 304 (for example, 16, 32, 48, or 512 ports 304). The number of ports 304 can vary from patch panel 302 to patch panel 302.

Each of the ports 304 is implemented as shown in FIG. 2. In general, in the context of the embodiment shown in FIG. 3, each front media segment 312 comprises a "patch cord" 312 that is used to selectively cross-connect two ports 304 from the same or different patch panels 302. In this embodiment, each patch cord 312 has a modular plug 314 attached to each end that can be inserted into a front media connector of one of the ports 304 of the patch panels 302.

In this way, respective rear media segments (not shown in FIG. 3) coupled to the two cross-connected ports 304 can be communicatively coupled to one another in order to implement a logical communication link between the equipment that is coupled to the respective rear media segments. For example, in one exemplary application, a wall-mounted jack is communicatively coupled to a rear connector of a port 304 using a suitable rear media segment such as a copper or fiber cable. The cable is typically routed through a building (for example, over, under, around, and/or through walls, ceilings, floors, and the like) and is not easily or frequently moved. If a first piece of equipment that is connected to one such wall-mounted jack needs to be communicatively coupled to a second piece of equipment that is connected to another such wall-mounted jack, a patch cord 312 can be used to establish the connection.

Figure 4:
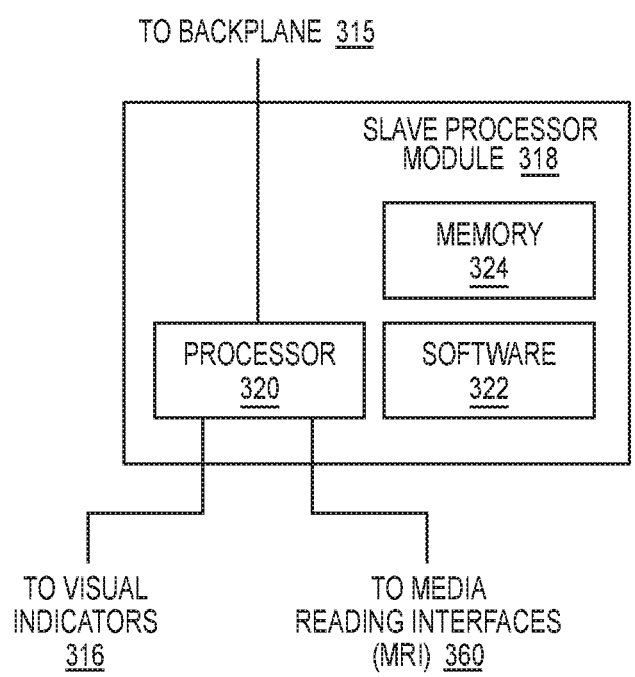
FIG. 4 is a block diagram of one exemplary embodiment of each slave processor module shown in FIG. 3.

As shown in FIG. 3, a master processor unit (MPU) 330 is also housed within the chassis 301. The master processor unit (MPU) 330 communicates with slave processor modules 318 included in each of the patch panels 304 over a backplane 315. FIG. 4 is a block diagram of one embodiment of each slave processor module 318 shown in FIG. 3. Each slave processor module 318 comprises a slave programmable processor 320 that executes software 322. The execution of the software 322 causes the slave processor 320 to carry out various functions described below. Each slave processor module 318 also includes memory 324 that is coupled to the slave processor 320 for storing program instructions and data. The slave processor 320 in each slave processor module 318 is coupled to the backplane 315 using a suitable interface.

The system 300 is designed to be used with patch cords 312 (or other front media segments) that have identifier and attribute information of the type described above in connection with FIG. 2 stored in or on them. Each of the ports 304 of each patch panel 302 comprises a respective media reading interface (not shown in FIG. 3). The slave programmable processor 320 in each patch panel 302 is communicatively coupled to each of the media reading interfaces in that patch panel 302 using a bus or other interconnect (not shown). The slave programmable processor 320 is configured to determine if the state of a port 304 changes. The state of a port 304 changes, for example, when a patch cord is inserted into a previously empty front connector or when a patch cord 312 is removed from a front connector, or when a different patch cord is inserted into a previously occupied front connector.

In one implementation of such an embodiment, each media reading interface is configured so that the slave programmable processor 320 can detect changes in the state of each port 304. For example, the electrical contact structure of the media reading interface can be configured so that an electrical signal changes state when a patch cord is inserted into or removed from a port 304 (for example, by closing or opening an electrical circuit). The slave processor 320 detects such state changes to detect when a patch cord has been inserted into or removed from the front connector of each port 304. Examples of such contact structures are U.S. Provisional Patent Application Ser. No. 61/252,395, filed on Oct. 16, 2009, titled "MANAGED CONNECTIVITY IN ELECTRICAL SYSTEMS AND METHODS THEREOF" (also referred to here as the "'395 application"), U.S. Provisional Patent Application Ser. No. 61/253,208, filed on Oct. 20, 2009, titled "ELECTRICAL PLUG FOR MANAGED CONNECTIVITY SYSTEMS" (also referred to here as the "'208 application"), and U.S. Provisional Patent Application Ser. No. 61/252,964, filed on Oct. 19, 2009, titled "ELECTRICAL PLUG FOR MANAGED CONNECTIVITY SYSTEMS" (also referred to here as the "'964 application"). The '395 application, the '208 application, and the '964 application are hereby incorporated herein by reference.

Alternatively, the slave processor 320 can be configured to periodically scan all of the media reading interfaces included in that patch panel 302 to determine if the state of any of the associated ports 304 has changed.

Also, when the software 322 executing on the slave programmable processor 320 in each patch panel 302 determines that a patch cord has been inserted into a previously empty front connector or that a different patch cord has been inserted into a previously connected front connector, the software 322 reads the information stored in or on the inserted patch cord.

Any changes in the state of the patch panel ports 304 and the information that is read from the patch cords are communicated to the MPU 330 over the backplane 315. The port state information and the information read from the patch cords are collectively referred to here as "port information."

The software 322 executing on the slave programmable processor 320 in each patch panel 302 also communicates information about the respective patch panel 302 to the MPU 330 over the backplane 115 (such information is also referred to here as "patch panel information"). The patch panel software 322 communicates the patch panel information to the MPU 330, for example, in the following situations: in response to a request from the MPU 330, or when the patch panel 302 first powers up, or when any of patch panel's information changes, or after a predetermined amount of time has elapsed since last communicating the patch panel information to the MPU 330.

As shown in FIG. 3, each of the ports 304 of each patch panel 302 includes a respective visual indicator 316 (such as a light emitting diode (LED)) that is coupled to the slave programmable processor 318 over an internal bus or other interconnect (not shown). The visual indicator 316 is located near the port 304 with which the visual indicator 316 is associated. The slave programmable processor 332 can actuate each of the visual indicators 316 (for example, by illuminating an LED) in order to identify the associated port 304.

Figure 5:
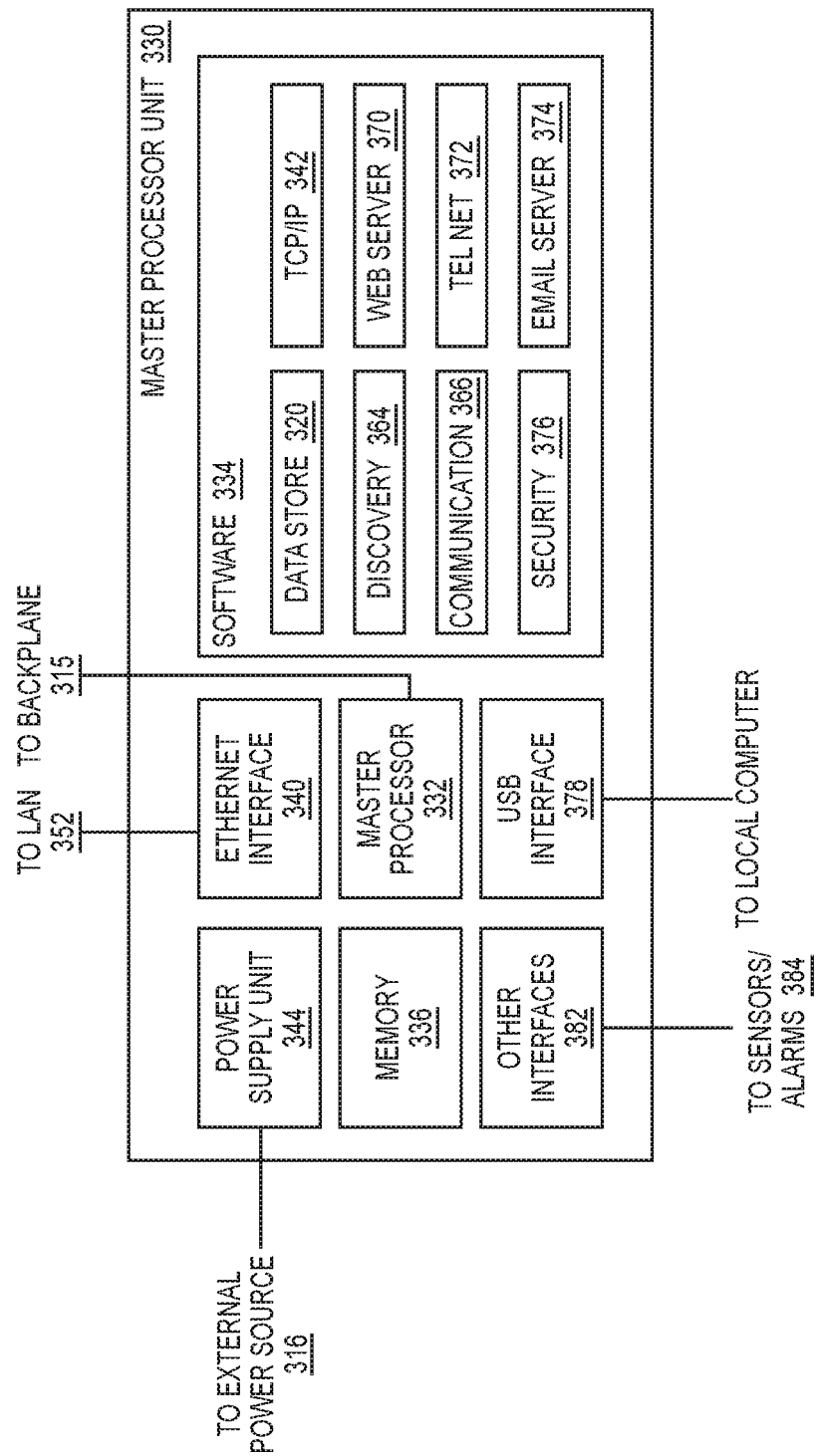
FIG. 5 is a block diagram of one embodiment of the master processor unit of FIG. 3.

As shown in FIG. 3, the MPU 330 is configured to communicate with and control the slave processor modules 318. Also, the MPU 330 is configured to communicate with other devices over an IP network 350 (such as LAN 352). More specifically, the MPU 330 is configured to communicate with an aggregation point 353 over the LAN 352. FIG. 5 is a block diagram of one embodiment of the master processor unit 330 of FIG. 3. The MPU 330 includes a master programmable processor 332 that executes software 334. The execution of the software 334 causes the master programmable processor 332 of the MPU 330 to carry out various functions described below. The MPU 330 also includes memory 336 that is coupled to the master processor 332 for storing program instructions and data. The master processor 332 is coupled to the backplane 315 of the chassis 301. The slave processor 320 in each of the patch panels 302 communicates with the master programmable processor 332 in the MPU 330 over the backplane 315. In the particular embodiment shown in FIG. 3, most of the processing that is performed in the system 300 is performed by the master programmable processor 332 in the MPU 330. As a result, a relatively low power slave programmable processor 318 can be used in each of the patch panels 302, such as an 8-bit or 16-bit microcontroller. The master programmable processor 332 in the MPU 330, in such an embodiment, is implemented using a 16-bit or 32-bit microcontroller or microprocessor.

The MPU 330 further comprises an ETHERNET interface 340 that is used to communicatively couple the MPU 330 (and the master programmable processor 332 included therein) to one or more Internet Protocol (IP) networks 350 (shown in FIG. 3). In the particular embodiment shown in FIG. 3, the ETHERNET interface 340 is coupled to a local area network (LAN) 352. This connection to the LAN 352 can be implemented, for example, by using a cable to connect the ETHERNET interface 340 of the MPU 330 to one port 304 of a patch panel 302 (by attaching the cable to the rear attachment point 306 of that port 304). Each of multiple ports of an inter-networking device (such as a hub, router, or switch) (not shown in FIG. 3) is also connected to respective ports 304 of a patch panel 302 (by connecting respective cables to the respective rear attachment points 306 of the ports 304). The ETHERNET interface 340 of the MPU 330 is cross-connected to a port of the inter-networking device by inserting one end 314 of a patch cord 312 into the front connector 308 of the port 304 that is connected to the ETHERNET interface 340 and by inserting the other end 314 of the patch cord 312 into the front connector 308 of the port 306 that is connected to one of the ports of the inter-networking device. The other ports of the inter-networking device are connected (via the patch panels 302) to other items of end user equipment 356 (shown in FIG. 3) (such as computers) and other inter-networking devices (such as gateways or network interface devices that connect the LAN 352 to a wide area network such the Internet 358 (shown in FIG. 3)).

As shown in FIG. 5, in this particular embodiment, the MPU software 334 includes a TCP/IP stack 342 that enables the MPU processor 332 to communicate with other devices over the one or more IP networks 350.

In the embodiment shown in FIG. 3, power is supplied to the MPU 330 and the slave processor modules 318 over the twisted-pair copper wiring that is used to connect the MPU 330 to the LAN 352. Power is supplied using Power over Ethernet techniques specified in the IEEE 802.3af standard. In such an embodiment, the inter-working device to which the MPU 330 is coupled includes a power hub 354 or other power supplying device (located near or incorporated into it) that injects DC power onto one or more of the wires (also referred to here as the "power wires") included in the copper twisted-pair cable used to connect the MPU 330 to the inter-networking device. The ETHERNET interface 340 in MPU 330 picks the injected DC power off of the power wires and uses the picked-off power to power the active components in the MPU 330. Also, power is supplied from the MPU 330 to the patch panels 302 over the backplane 315 in order to power the active components in the patch panels 302.

In the particular embodiment shown in FIG. 4, the MPU 330 also comprises a power supply unit (PSU) 344 for situations where the devices in the chassis 301 are not powered using Power over Ethernet. The PSU 344 can be connected to one or more external power sources 346 (shown in FIG. 3) (such as the alternating current (AC) power grid and/or a telco/data center direct current (DC) power source) and converts the external power received from the external power source 346 to power that is suitable for use by the active components of the MPU 330 and the patch panels 302.

The MPU software 334 executing on the MPU programmable processor 332 receives the port and patch panel information from all of the patch panels 302 and maintains a data store 362 (shown in FIG. 5) in which the information is stored and organized. The MPU software 334 executing on the MPU programmable processor 332 is also configured to communicate with one or more aggregation points 353. In the particular embodiment shown in FIG. 5, the MPU software 334 includes discovery protocol software 364 that is used by the MPU 330 and the aggregation point 353 to discover and connect with one another. The MPU software 334 also includes communication protocol software 366 that is used to communicate port and patch panel information (and other PLI) to and from the aggregation port 353.

The MPU software 334 also includes functionality that enables users, systems, and devices to directly interact with the MPU 330 over the IP networks 350. In the particular embodiment shown in FIGS. 3-11, the MPU software 334 is configured to interact with users using a web browser. In this embodiment, the MPU software 334 includes a web server 370 (shown in FIG. 5) that enables the MPU 330 to interact with a user's web browser over the IP networks 350 using the HyperText Markup Language (HTML) protocol (and related protocols such as the Asynchronous JavaScript and XML (AJAX) protocols). In the particular embodiment shown in FIGS. 3-11, the MPU software 334 is also configured to directly interact with users, systems, and devices in other ways. For example, the MPU software 334 includes TELNET software 372 that enables other users, systems, and devices to telnet into the MPU 330 and an email server 374 (implementing, for example, the Simple Mail Transfer Protocol (SMTP)) that enables the MPU software 334 to send email messages to other users, systems, and devices. The MPU software 334 also includes security and encryption software 376 to enable the MPU software 334 to communicate in a secure manner (for example, using Secure Sockets Layer (SSL) sessions or virtual private networks (VPNs)).

In the embodiment shown in FIGS. 3-11, the system 300 is configured to have a user manually enter, for each port 304 that has a respective rear media segment 310 attached to its rear attachment point, information about the physical media that is used to implement that rear media segment. In this embodiment, the rear media segments are connected to the rear attachment points in a semi-permanent manner, and typically these connections do not change often, if ever. As a result, information about the physical media used to implement the rear media segments can be manually entered and verified in connection with the initial installation of the media and will typically remain valid thereafter. This information can include information similar to the port information stored in or on a patch cord and is also referred to here as "rear media information." In the event that a change is made to the media that is attached to a rear attachment point of a port 304, the corresponding physical media information for that port 304 would need to be manually updated. This read media information, for example, can be entered into a spreadsheet or other file. The spreadsheet is then uploaded to the aggregation point 353. The aggregation point 353 associates the read media information included in the spreadsheet with information about the patch panels 302 and the ports 304 that it obtains from the MPU 330.

Also, when an inter-networking device (such as a switch or router) is connected to the rear attachment points of the ports 304 of a patch panel 302, information about the inter-networking device (such as the device's MAC address and an assigned IP address) and information indicating which port of the inter-networking device is connected to which port 304 of the patch panel 302 can be manually entered and provided to the aggregation point 353 in connection with the initial installation of the inter-networking device. This information is also referred to here as "inter-networking device information." Also, as noted above, if the inter-networking device includes PLI functionality, such inter-networking device information can be automatically captured by the inter-networking device and communicated to the aggregation point 353.

In addition, in the embodiment shown in FIGS. 3-11, the system 300 is configured to have a user enter information about the layout of the building or buildings in which the network is deployed, as well as information indicating where each patch panel 302, rear media segment, inter-networking device, and wall outlet is located within the building. This information is also referred to here as "location information". For example, this location information can be entered into a spreadsheet and uploaded to the aggregation point 353, which associates the location information with the other PLI it has obtained about the system 300.

In the embodiment shown in FIGS. 3-11, the aggregation point 353 has access to many types of physical layer information including, for example, device information (that is, the port information, patch panel information, inter-networking device information and information any wall outlets and end user devices), media information (that is, front media information—including the media information stored on the patch cords—and rear media information), and location information.

In the embodiment shown in FIG. 3, the MPU 330 also includes additional interfaces 382 for communicatively coupling the MPU 330 (and the MPU programmable processor 332) to one or more external sensors (for example, external temperature sensors) and alarms 384 (shown in FIG. 1). The MPU 330 can be communicatively coupled to such external sensors and alarms 384 using wired and/or wireless communication links. In one application, a thermal map of the network can be produced from temperature readings, which may be useful for HVAC purposes.

Also, as shown in FIG. 5, the MPU 330 includes an interface 378 by which a technician can directly connect a device such as a computer, personal digital assistant (PDA), or smartphone to the MPU 330 and interact with the software 334 executing the master processor 332.

In one implementation of the embodiment shown in FIGS. 3-11, the MPU 330 and the slave processor module 318, media reading interfaces and associated visual indicators 316 are integrated into the patch panel 302 along with the other components. In another implementation, the MPU 330 and the slave processor module 318, media reading interfaces and associated visual indicators 316 are housed within one or more modules that are separate from the respective patch panel 302. In such an implementation, the separate modules are attached to the front of the respective patch panel 302 so that each visual indicator 316 and media reading interface is positioned near its corresponding port 304.

In some embodiments, a display (such as a liquid crystal display) is incorporated into the MPU 330, the slave processor modules 318, or the patch panel 302 to display messages at the patch panel 302. Also, in some embodiments, a user input mechanism (such as one or more buttons) is incorporated into the MPU 330, the slave processor modules 318, or the patch panel 302 to receive input from a user that is located near the patch panels 302.

Figure 6:
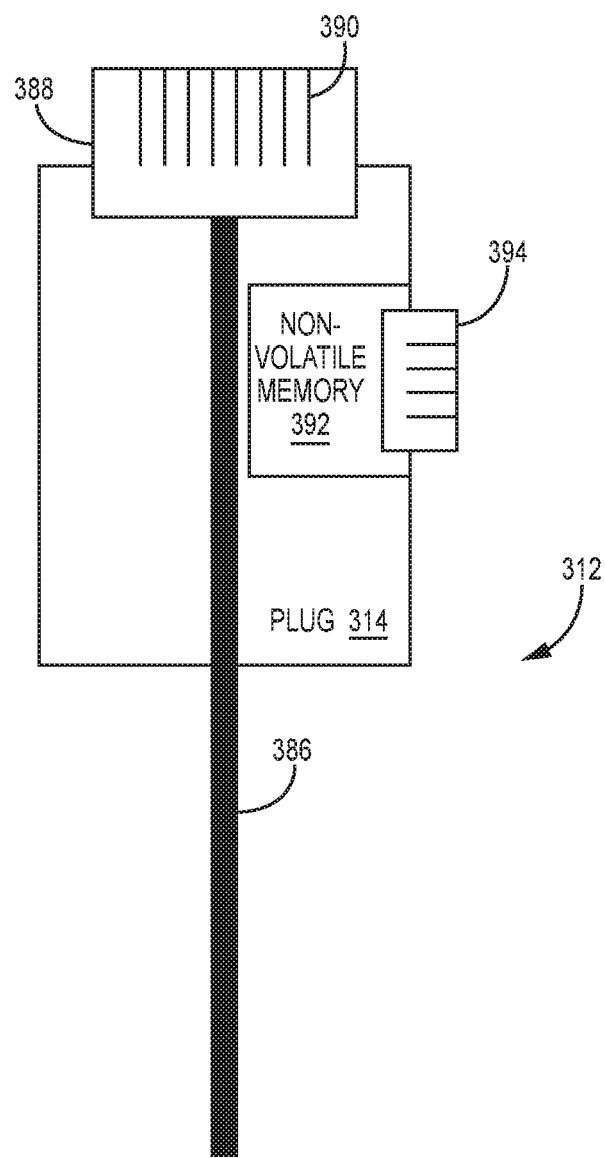
FIG. 6 is a diagram illustrating one embodiment of a patch cord that is suitable for use in the system of FIG. 3.

FIG. 6 is a diagram illustrating one embodiment of a patch cord 312 that is suitable for use in the system 300 of FIG. 3. The patch cord 312 shown in FIG. 6 is suitable for use with an implementation of the patch panel 302 of FIG. 3 where the front connectors of the ports 304 are implemented using modular RJ-45 jacks. The patch cord 312 shown in FIG. 6 comprises a copper unshielded twisted-pair (UTP) cable 386. The UTP cable 386 includes eight conductors arranged in four conductor pairs. The patch cord 312 also comprises two RJ-45 plugs 314, one at each end of the cable 386 (only one of which is shown in FIG. 6). The RJ-45 plugs 314 are designed to be inserted into the RJ-45 modular jacks used as the front connectors. Each RJ-45 plug 314 comprises a contact portion 388 in which eight, generally parallel electrical contacts 390 are positioned. Each of the eight electrical contacts 390 are electrically connected to one of the eight conductors in the UTP cable 386.

Each plug 314 also comprises (or is attached to) a storage device 392 (for example, an Electrically Erasable Programmable Read-Only Memory (EEPROM) or other non-volatile memory device). The media information described above for the patch cord 312 is stored in the storage device 392. The storage device 392 includes sufficient storage capacity to store such information. Each storage device 392 also includes a storage device interface 394 that, when the corresponding plug 314 is inserted into a front connector of a port 304, communicatively couples the storage device 392 to the corresponding media reading interface so that the programmable processor 320 in the corresponding patch panel 302 can read the information stored in the storage device 392.

Examples of such a patch cord 312 and plug 314 are described in the '395 application, the '208 application, and the '964 application.

Figure 7:
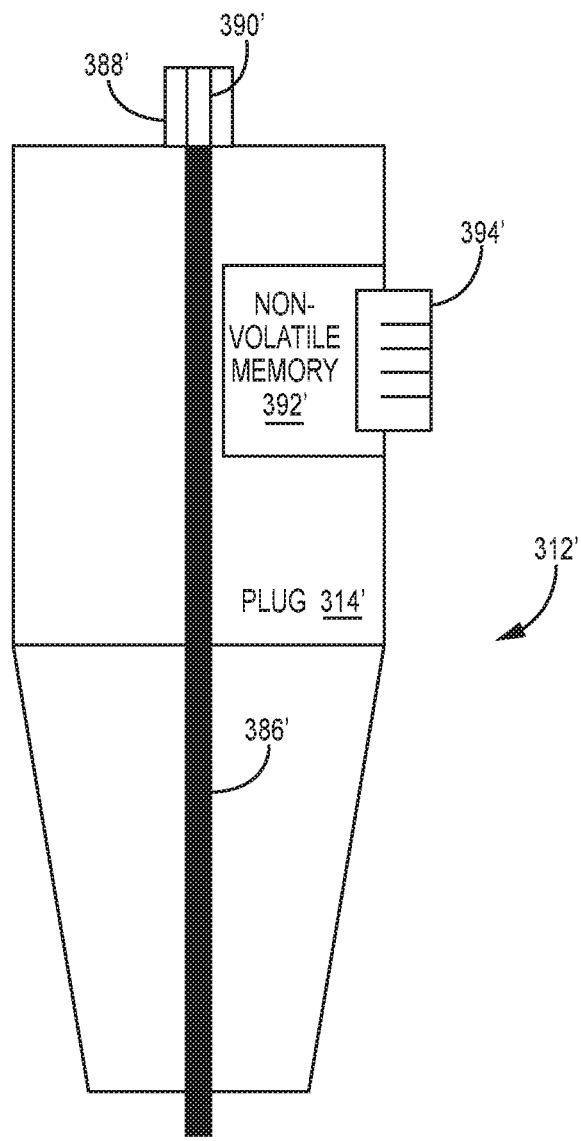
FIG. 7 is a diagram illustrating another exemplary embodiment of a patch cord that is suitable for use in the system of FIG. 3.

The embodiment shown in FIGS. 3-11 is generally described here as being implemented using the patch cord 312 shown in FIG. 6. However, other types of patch cords can be used, one of which is shown in FIG. 7.

FIG. 7 is a diagram illustrating another embodiment of a patch cord 312' that is suitable for use in the system 300 of FIG. 3. The patch cord 312' shown in FIG. 7 is suitable for use with an implementation of the patch panel 302 of FIG. 3 where the front connectors of the ports 304 are implemented using fiber LC adapters or connectors. The patch cord 312' shown in FIG. 7 comprises an optical cable 386'. The optical cable 386' includes an optical fiber enclosed within a suitable sheathing. The patch cord 312' also comprises two LC connectors 314', on at each of the cable 386'. Each LC connector 314' is designed to be inserted into an LC adapter used as the front connector of a port 304. Each LC connector 314' comprises an end portion 388' at which an optical connection with the optical fiber in the cable 386' can be established when the LC connector 314' is inserted in an LC adapter of a port 304.

Each LC connector 314' also comprises (or is attached to) a storage device 392' (for example, an Electrically Erasable Programmable Read-Only Memory (EEPROM) or other non-volatile memory device). The media information described above for the patch cord 312 is stored in the storage device 392'. The storage device 392' includes sufficient storage capacity to store such information. Each storage device 392' also includes a storage device interface 394' that, when the corresponding LC connector 314' is inserted into a front connector of a port 304, communicatively couples the storage device 392' to the corresponding media reading interface so that the slave programmable processor 320 in the corresponding patch panel 302 can read the information stored in the storage device 392'.

In some implementations of the patch cords 312 and 312', the storage devices 392 and 392' are implemented using a surface-mount EEPROM or other non-volatile memory device. In such implementations, the storage device interfaces and media reading interfaces each comprise four leads—a power lead, a ground lead, a data lead, and an extra lead that is reserved for future use. The four leads of the storage device interfaces come into electrical contact with four corresponding leads of the media reading interface when the corresponding plug or connector is inserted in the corresponding front connector of a port 304. Each storage device interface and media reading interface are arranged and configured so that they do not interfere with data communicated over the patch cord. In other embodiments, other types of interfaces are used. For example, in one such alternative embodiment, a two-line interface is used with a simple charge pump. In other embodiments, additional lines are provided (for example, for potential future applications).

Examples of such fiber patch cords 312' and connectors 314' are described in U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 application"), U.S. Provisional Patent Application Ser. No. 61/303,961, filed on Feb. 12, 2010, titled "FIBER PLUGS AND ADAPTERS FOR MANAGED CONNECTIVITY" (the "'961 application"), and U.S. Provisional Patent Application Ser. No. 61/303,948, filed on Feb. 12, 2010, titled "BLADED COMMUNICATIONS SYSTEM" (the "'948 application"). The '386 application, the '961 application, and the '948 application are hereby incorporated herein by reference.

In some implementations of the patch cords 312 and 312', each plug 314 or connector 314' itself houses the respective storage device and storage device interface. In implementations, each storage device and corresponding storage device interface are housed within a housing that is separate from the corresponding plug or connector. In such implementations, the housing is configured so that it can be snapped onto (or otherwise attached to) the cable or the plug or connector, with the storage device interface positioned relative to the plug or connector so that the storage device interface will properly mate with the relevant media reading interface when the plug or connector is inserted into the front connector of the corresponding port 304.

A hand-held test set can be provided that includes a port into which the plug 314 or connector 314' of a patch cord 312 or 312' can be inserted in order to read the media information stored in the storage device. The hand-held test set also includes a display of some type to display the media information that was read from the storage device.

In other embodiments, the storage device also includes an optical or infrared interface for reading the media information stored in the storage device while the corresponding patch cord 312 or 312' is connected to one or more patch panels 302. This enables a technician to read the media information stored in the storage device without having to remove the patch cord 312 or 312' in order to use the hand-held tester described above.

The remainder of the description of the embodiment shown in FIGS. 3-11 generally refers to the patch cord 312 shown in FIG. 6. However, it is to be understood that other patch cords can be used (such as the patch cord 312' shown in FIG. 7).

Figure 8:
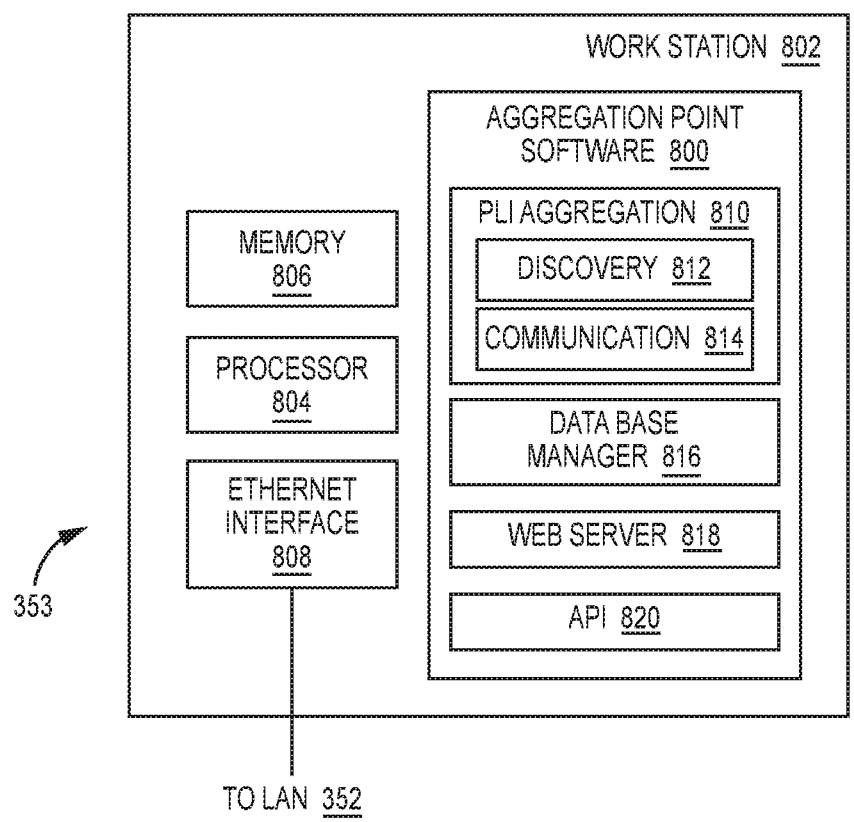
FIG. 8 is a block diagram of one embodiment of an aggregation point.

FIG. 8 is a block diagram of one embodiment of an aggregation point 353. The particular embodiment of an aggregation point 353 shown in FIG. 8 is described here as being implemented for use in the system 300 of FIG. 3, though other embodiments can be implemented in other ways.

The aggregation point 353 is typically implemented as software 800 that executes on a workstation or other computer 802. The workstation 802 comprises at least one programmable processor 804 on which the software 800 executes. The software 800 comprises program instructions that are stored (or otherwise embodied) on an appropriate storage medium or media from which at least a portion of the program instructions are read by the programmable processor 804 for execution thereby. The workstation 802 also comprises memory 806 for storing the program instructions and any related data during execution of the software 800.

The workstation 802 on which the aggregation point software 800 executes also includes one or more interfaces 808 that communicatively couple the aggregation point 353 to devices or entities with which it communicates. More specifically, the one or more interfaces 808 communicatively couple the aggregation point 353 to these devices or entities over the one or more IP networks 350. In one implementation of such an embodiment, at least one of the interfaces 808 comprises an ETHERNET network interface for coupling the aggregation point 353 to the one or more IP networks 350.

The aggregation point software 800 comprises PLI aggregation software 810 that enables the aggregation point 353 to automatically discover and connect with devices that are able provide PLI and other information to the aggregation point 353 (such as the patch panels 302). The aggregation point 353 and the PLI aggregation software 810 can be used to receive physical layer information from various types of connector assemblies that have functionality for automatically reading information stored in or on a segment of physical communication media. Examples of such devices are noted above and include, for example, patch panels 302 and inter-networking devices. Also, the aggregation point 353 and PLI aggregation software 810 can also be used to receive physical layer information from other types of devices that have functionality for automatically reading information stored in or on the segment of physical communication media. Examples of such devices include end-user devices—such as computers, peripherals (for example, printers, copiers, storage devices, and scanners), and IP telephones—that include functionality for automatically reading information stored in or on the segment of physical communication media.

In the particular embodiment shown in FIG. 8, the PLI aggregation software 810 comprises software 812 that uses one or more discovery protocols to discover and connect with devices that are able to provide PLI information to the aggregation point 353 (assuming those devices also support those discovery protocols). Examples of discovery protocols include, without limitation, Multicast DNS (mDNS), DNS based Service Discovery (DNS-SD), Universal Plug and Play (UPnP), Simple Device Discovery Protocol (SDDP), and Service Location Protocol (SLP) as well as proprietary protocols, and extensions of other protocols (such as Dynamic Host Configuration Protocol (DHCP)). In this embodiment, when a patch panel 302 (or other device that is able to provide PLI information to the aggregation point 353) is first coupled to the LAN 352, the MPU 330 of the patch panel 302 first obtains an IP address (typically from a DHCP server for the LAN 352). The MPU 330 in the patch panel 302 then uses the discovery protocol to broadcast an informational message to the other nodes on the LAN 353. The informational message includes information about the services that the patch panel 302 provides, which in this case includes services related to providing PLI information for the patch panel 302 and patch cords 312 coupled to the patch panels 302. The aggregation point 353 listens for such informational messages. When the aggregation point 353 receives an informational message from a patch panel 302 that it can manage, the aggregation point 353 uses the discovery protocols to send a corresponding message to the patch panel 302 (using the address information included in the received informational message) requesting more information about the patch panel 302. In response to this request, MPU 330 in the patch panel 302 provides the requested information. At this point, the aggregation point 353 is able to control and receive notifications from the MPU 330 in the patch panel 302. Similar processing can be performed when other devices that provide PLI to an aggregation point 353 (such as the inter-network device) join the LAN 352.

Likewise, when an aggregation point 353 is connected to the LAN 352, the discovery protocol software 812 uses the discovery protocols to broadcast an informational message to all the nodes on the LAN 352. This message indicates that the aggregation point 353 is searching for devices and/or services that include the PLI functionality described here. Devices that are able to provide PLI to an aggregation point (devices such as patch panels 320 and inter-network devices) listen for such messages. If those devices meet the search criteria set forth in the message, the devices respond with an appropriate message advertising the services they provide. When the aggregation point 353 receives such a message from a device that it can manage, the software 812 sends a message to that device (using the address information included in the received message) requesting more information about that device. In response to this request, the device provides the requested information to the aggregation point 353. At this point, the aggregation point 353 is able to control and receive notifications from the device.

In this way, when devices that are able to provide PLI to an aggregation point are coupled to the LAN 352, the aggregation points 353 is able to automatically discover the device and start aggregating physical layer information for that device without requiring a technician installing the device to know about the aggregation points that are on the LAN 352. Similarly, when the aggregation point 353 is coupled to the LAN 352, the aggregation point 353 is able to automatically discover and interact with devices that are capable of providing PLI to the aggregation point 353 without requiring the technician installing the aggregation point 353 to know about such devices that are on the LAN 352. Thus, the physical-layer information resources described here can be easily integrated into the LAN 352.

In the embodiment shown in FIG. 8, the PLI aggregation software 810 also includes software 814 that is configured to obtain physical layer information from the devices it has discovered and connected to using the discovery protocol software 812 (for example, devices such as the patch panels 302 and inter-network devices). A database manager 816 is used to store the PLI information that the aggregation software 810 obtains in a database. In the particular embodiment shown in FIG. 8, the software 814 uses one or more appropriate protocols to communicate physical layer information to and from such devices. Examples of protocols that can be used include, without limitation, the File Transfer Protocol (FTP), the Trivial File Transfer Protocol (TFTP), the Hypertext Transfer Protocol (HTTP), the Simple Network Management Protocol (SNMP), the Common Gateway Interface (CGI) protocol, the Representational State Transfer (REST) protocol, and the Simple Object Access Protocol (SOAP). The devices that the aggregation point 353 receives information from also implement at least some of the protocols implemented by the aggregation point 353 to organize, track, store, and communicate physical layer information.

The aggregation point 353 and aggregation software 810 can also be used to obtain other types of physical layer information. For example, in this embodiment, the aggregation software 810 also obtains information about physical communication media segments that is not otherwise automatically communicated to an aggregation point. One example of such information is information about non-connectorized cables that do not otherwise have information stored in or on them that are attached to a patch panel 302 (including, for example, information indicating which ports of the patch panel 302 are connected to which ports of other devices in the network 350 by that cable as well as media information about the cable).

Another example of such information is information about patch cords that are connected to devices that are not be able to read media information that is stored in or on the patch cords that are attached to their ports and/or that are not able to communicate such information to the aggregation point 353 (for example, because such devices do not include such functionality, because such devices are used with patch cords that do not have media information stored in or on them, and/or because bandwidth is not available for communicating such information to the aggregation point 353). In this example, this information can include, for example, information about the devices themselves (such as the devices' MAC addresses and IP addresses if assigned to such devices), information indicating which ports of the devices are connected to which ports of other devices in the network, and information about the physical media attached to the ports of the devices. This information can be provided to the aggregation point 353, for example, by manually entering such information into a file (such as a spreadsheet) and then uploading the file to the aggregation point 353 in connection with the initial installation of each of the various items. Such information can also, for example, be directly entered using a user interface provided by the aggregation point 353 (for example, using a web browser). In the embodiment shown in FIG. 8, the aggregation point software 810 includes a web server 818 to facilitate the upload of files and/or the direct entry of such manually entered information.

The aggregation software 810 can also obtain information about the layout of the building or buildings in which the network 350 is deployed, as well as information indicating where each patch panel 302 device, patch cord (or other item of physical communication media), and inter-networking device is located within the building. This information can be, for example, manually entered and uploaded to the aggregation point 353 in connection with the initial installation of each of the various items. In one implementation, such location information includes an X, Y, and Z location for each port or other termination point for each physical communication media segment that is terminated in the network 350 (for example, X, Y, and Z location information of the type specified in ANSI/TIA/EIA 606-A Standard—Administration Standard For The Commercial Telecommunications Infrastructure).

The aggregation software 810 can also obtain and maintain testing, media quality, or performance information relating to the various items of physical communication media that exist in the network. The testing, media quality, or performance information, for example, can be results of testing that is performed when a particular segment of media is manufactured and/or when testing is performed when a particular segment of media is installed or otherwise checked.

The aggregation software 810 also provides an interface for external devices or entities to access the physical layer information maintained by the aggregation point 353. This access can include retrieving information from the aggregation point 353 as well as supplying information to the aggregation point 353. In this embodiment, the aggregation point 353 is implemented as "middleware" that is able to provide such external devices and entities with transparent and convenient access to the PLI maintained by the access point 353. Because the aggregation point 353 aggregates PLI from the relevant devices on the IP network 350 and provides external devices and entities with access to such PLI, the external devices and entities do not need to individually interact with all of the devices in the IP network 350 that provide PLI, nor do such devices need to have the capacity to respond to requests from such external devices and entities.

The aggregation point software 810, in the embodiment shown in FIG. 8, implements an application programming interface (API) 820 by which application-layer functionality in such other devices can gain access to the physical layer information maintained by the aggregation point 353 using a software development kit (SDK) that describes and documents the API 820. In one implementation of such an embodiment, the API 820 is configured to use the Simple Object Access Protocol (SOAP) protocol for communications between the aggregation point 353 and such external devices or entities. In other implementations, other protocols can be used (for example, the SNMP or CGI protocols).

For example, an application 370 (shown in FIG. 3) executing on a computer 356 can use the API 820 provided by the aggregation point 353 to access the PLI information maintained by the aggregation point 353 (for example, to retrieve such information from the aggregation point 353 and/or to supply information to the aggregation point 353). The computer 356 is coupled to the LAN 352 and accesses the aggregation point 353 over the LAN 352.

Figure 9:
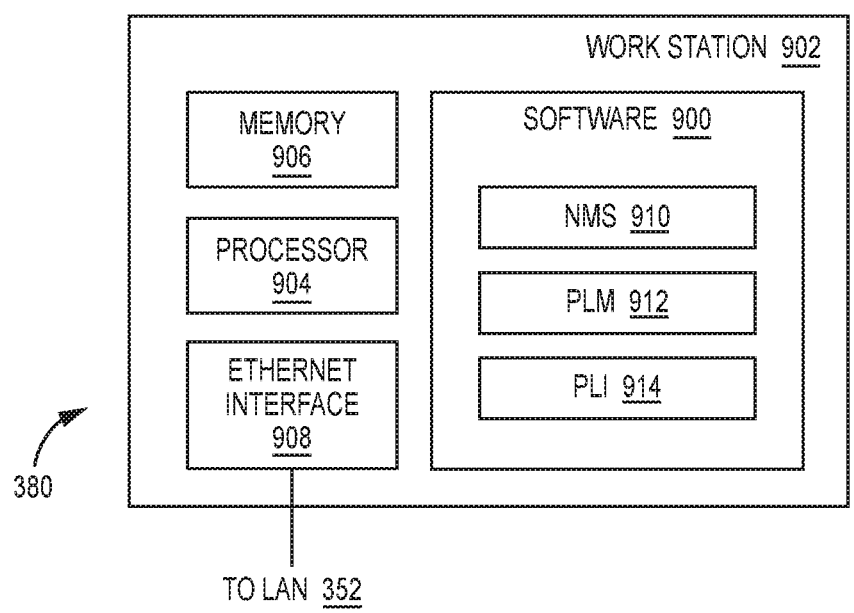
FIG. 9 is a block diagram of one embodiment of a network management system (NMS) that is specially configured to use the physical layer information that is captured and aggregated using the techniques described here.

FIG. 9 is a block diagram of one embodiment of a network management system (NMS) 380 that is specially configured to use the physical layer information that is made available by the system 300 of FIG. 3. The particular embodiment of an NMS 380 shown in FIG. 9 is described here as being implemented for use in the system 300 of FIG. 3, though other embodiments can be implemented in other ways.

The NMS 380 is typically implemented as software 900 that executes on a workstation or other computer 902. The workstation 902 comprises at least one programmable processor 904 on which the software 900 executes. The software 900 comprises program instructions that are stored (or otherwise embodied) on an appropriate storage medium or media from which at least a portion of the program instructions are read by the programmable processor 904 for execution thereby. The workstation 902 also comprises memory 906 for storing the program instructions and any related data during execution of the software 900.

The workstation 902 on which the NMS software 900 executes also includes one or more interfaces 908 that communicatively couple the NMS 380 to the network elements that the NMS 380 manages and otherwise interacts with. More specifically, the one or more interfaces 908 communicatively couple the NMS 380 to these network elements over the one or more IP networks 350. In one implementation of such an embodiment, at least one of the interfaces 908 comprises an ETHERNET network interface for coupling the NMS 380 to the one or more IP networks 350.

The NMS software 900 comprises network management functionality 910 that implements various conventional NMS functions, such as displaying status and alarm information about the various elements in the managed network. In the particular embodiment described here, the NMS functionality 910 includes functionality for displaying a user interface for the NMS 380 and data management functionality for organizing, tracking and storing the information it receives from the managed network elements.

The NMS software 900 also includes physical layer information (PLI) functionality 914. The PLI functionality 914 is configured to retrieve physical layer information from the aggregation point 353 and provide it to the NMS functionality 910 for use thereby. The NMS functionality 910 uses the retrieved physical layer information to perform one or more network management functions. In the embodiment shown in FIG. 9, the PLI functionality 914 retrieves physical layer information from the aggregation point 353 using the API 820 (shown in FIG. 8) implemented by the aggregation point 353. To do this, the PLI functionality 914 supports the protocol used by the API 820. The NMS software 900 communicates with the aggregation point 353 over the IP networks 350. The aggregation point software 800 executing on the aggregation point 353 processes and responds to API calls from the NMS 380.

The retrieved physical layer information can be used by the NMS 380 to provide Layer 1 (of the OSI model) resolution in the information it displays. For example, in one implementation of the embodiment shown in FIG. 9, the NMS software 900 displays a graphical representation of the managed network that shows the logical communication links between various network elements. When a user clicks on one of the logical communication links, the NMS software 900 uses the PLI functionality 914 to display the various physical layer items (for example, physical communication media, patch panels, and wall outlets) that implement that logical communication link, as well as information about those physical layer items (for example, their location, product name, type, color, length, temperature, etc.) that was retrieved from the aggregation point 353.

In the particular embodiment shown in FIG. 9, the NMS software 900 also includes physical layer management functionality 912 that uses the physical layer information received from the aggregation point 353 to carry out various PLM functions. For example, the PLM functionality 912 enables the NMS 380 to manage patch cord moves, adds, or changes (MAC) for the patch panels 302. This can be done by having the PLM functionality 912 communicate information about the MAC to a computer or other device used by the technician using the network 350. This information can include physical layer information received from an aggregation point 353 (for example, information identifying particular ports 304, patch panels 302, and patch cords 312 involved in the MAC and the locations thereof as well as information about the visual attributes of the items involved in the MAC). Also, the PLM functionality 912 enables the NMS 380 to receive alarms and warning messages from the aggregation point 353 that are related to moves, adds, or changes (for example, when an unrequested move, add, or change has been made or where a requested move, add, or change was made incorrectly). In other words, the PLM functionality 912 in the NMS 380 can be used to verify that a particular requested MAC was properly implemented and, if it was not, inform the technician of that fact. In addition, the PLM functionality 912 in the NMS 380 can be configured to perform a "guided" MAC in which the PLM functionality 912 causes appropriate LEDS 316 on the patch panels 302 to be illuminated or flashed in order to help the technician identify the ports 304 involved in a MAC. The PLM functionality 912 can do this by using an appropriate API call to request that the LEDs 316 be illuminated. The aggregation point 353, in response to such an API call, sends a request to the appropriate MPU 330 to have the appropriate slave processor modules 318 cause the LEDs 316 to be illuminated.

This MAC functionality can be implemented as a stand-alone application that is not a part of a NMS 380.

Other examples of functions that the NMS 380 can perform using the physical layer information include raising an alarm or warning if a predetermined specific patch cord (or a particular type of patch cord) is not used to implement a particular cross connection, enforcing other policies, and/or using the location information included in the physical layer information to assist in E911 or location based services (LBS) processing that the NMS 380 supports (for example, to determine where an IP phone is located).

Figure 10:
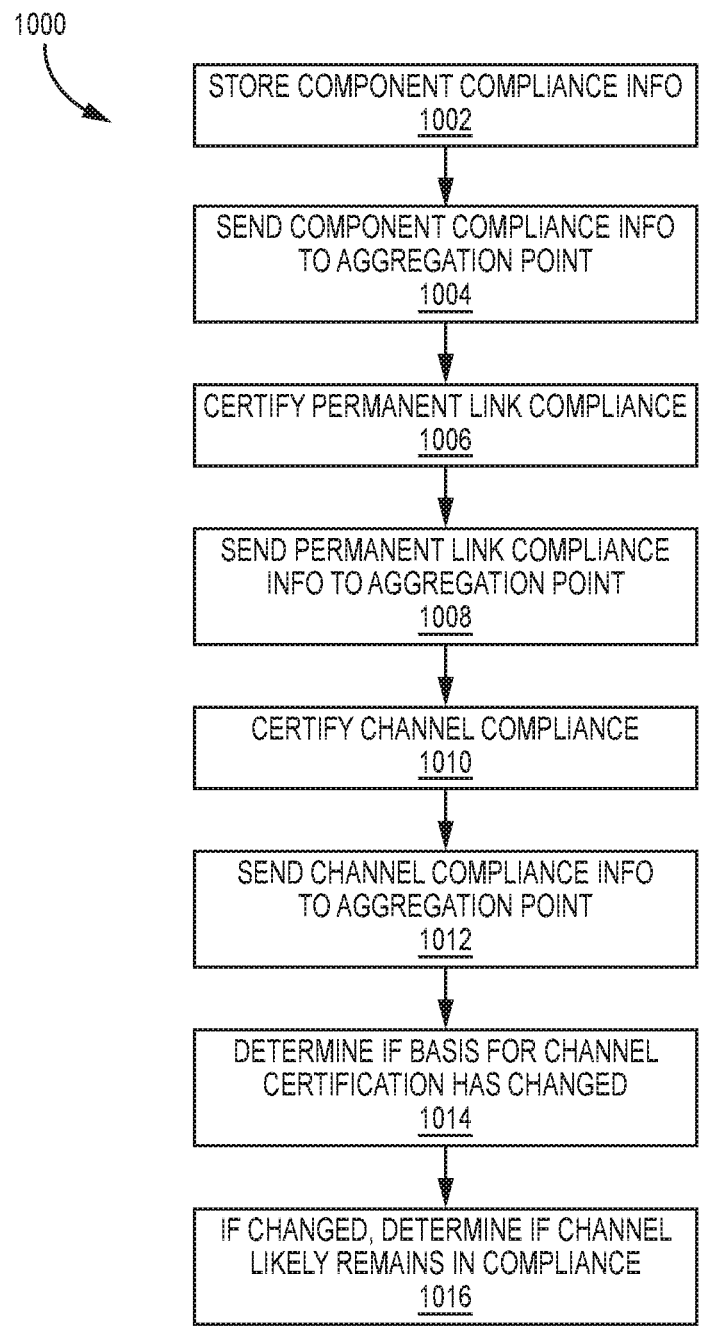
FIG. 10 is a flow diagram of one exemplary embodiment of a method of compliance tracking in a network that includes the physical layer information functionality.

Another example of PLI-enabled functionality that can be added to an NMS 380 is shown in FIG. 10. FIG. 10 is a flow diagram of one exemplary embodiment of a method of compliance tracking in a network that includes the PLI functionality described here. The particular exemplary embodiment of method 1000 shown in FIG. 10 is described here as being implemented as a part of the PLI functionality 914 of the NMS 380 shown in FIG. 9 for use in the system 300 shown in FIG. 3 (though other embodiments can be implemented in other ways).

In such an exemplary embodiment, the physical layer information that is tracked and aggregated at the aggregation point 353 includes information about the compliance of various parts of the system 300 with various standards. Standards such as the TIA/EIA-568-B family of standards define performance requirements for various physical layer cabling components that are used to implement networks, performance requirements for "permanent links" included within a give channel, and performance requirements for the overall channel.

For each channel that is being installed, information about the compliance of each patch cord 312 and plug 314 used in the channel with the requirements of the relevant standards is stored in the relevant non-volatile memory 392 (block 1002). This information can be determined by tests performed by the manufacture and/or an installer. This information can include an indication of whether or not each component associated with that patch cord 312 complies with the relevant performance specifications as well as the underlying performance information that was used to determine compliance. In other words, the performance margin or envelope for each such component can be stored in the relevant EEPROM 392. This component compliance data is automatically read when the patch cord 312 is connected to a port 304 of the patch panel 302 and communicated to the relevant aggregation point 352 (block 1004).

When a particular permanent link is installed (for example, a link between a wall outlet and a punch down block of a patch panel 302), the installer tests the performance of the permanent link and certifies its compliance with the requirements of the relevant standards (block 1006). Information about the compliance of the permanent link with the requirements of the relevant standards is communicated to the aggregation point 353 (for example, by uploading such information as described above) (block 1008). This information can include an indication of whether or not the permanent link complies with the relevant performance requirements as well as the underlying performance information that was used to determine compliance. In other words, the performance margin or envelope for the permanent link can be provided to the aggregation point 353 in addition to an indication of compliance.

In the embodiment shown in FIG. 10, the installer also tests the overall channel and certifies the compliance of the overall channel with the requirements of the relevant standards (block 1010). Information related to the compliance of the overall channel is communicated to the aggregation point 353 (for example, by uploading such information as described above). The aggregation point 353 then identifies the particular components that were used in the channel when the channel was certified (block 1012). For example, the aggregation point 353 knows which patch cords 312 and patch panel ports 304 were used in the channel when it was certified. If in the future one of those patch cords 312 were to be replaced, the aggregation point 353 is able to automatically determine that the original basis for the certification of channel compliance no longer exists (block 1014). When such a patch cord 312 is replaced, the aggregation point 353 can also automatically determine if the overall channel likely remains compliant with the relevant standards by checking if the replacement path cord has been certified to meet the component specifications needed for channel compliance and verifying that the permalink link for the channel remains undisturbed and that the patch cord is connected to the same ports as before (block 1016). Such information can be used in troubleshooting performance problems in the network.

Method 1000 is one example of how such compliance information can be used. Also, the embodiment of method 1000 shown in FIG. 10 is described here as being implemented in the NMS 380 of FIG. 8, though it is to be understood that similar functionality can be implemented in other parts of the system 300 (for example, in the aggregation point 353 or as a standalone application). Moreover, other types of compliance information can be received and stored by an aggregation point and used in compliance tracking. Examples of such compliance information include, without limitation, information about compliance with communications, regulatory, or military rules, regulations, laws, specifications, or standards.

Figure 11:
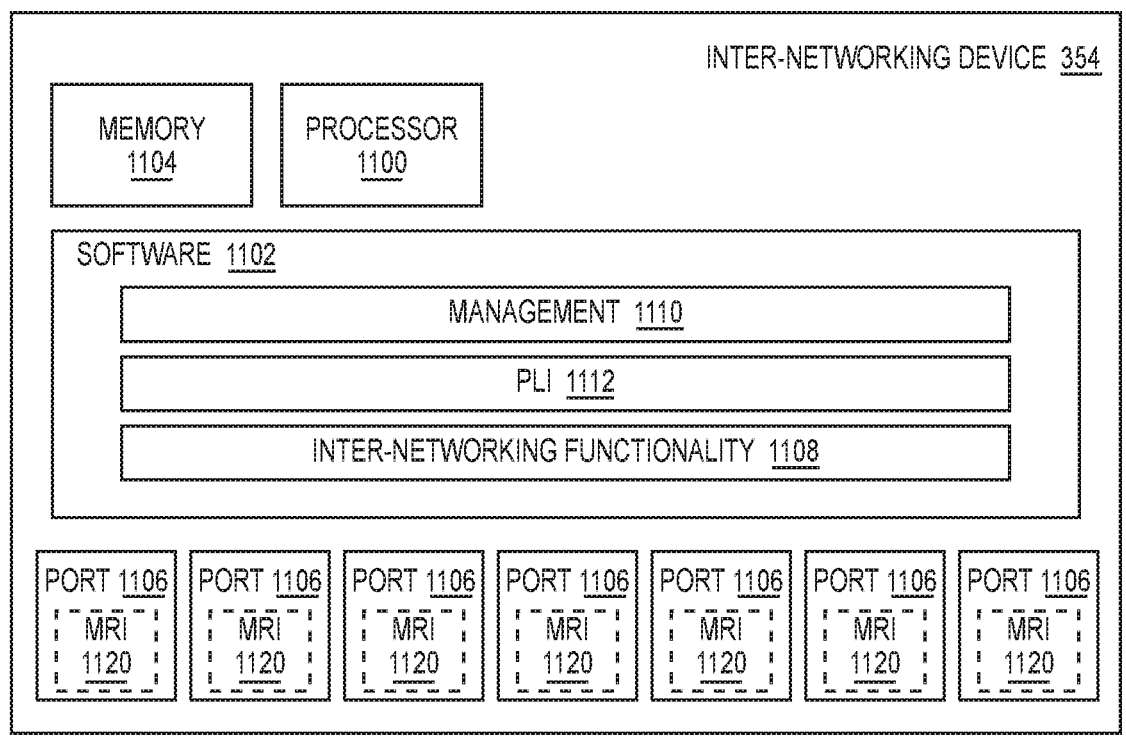
FIG. 11 is a block diagram of one embodiment of an inter-networking device that is specially configured to use physical layer information that is captured and aggregated using the techniques described here.

FIG. 11 is a block diagram of one embodiment of an inter-networking device 354 that is specially configured to use the physical layer information that is made available by the system 300 of FIG. 3. The particular embodiment of an inter-networking device 354 shown in FIG. 11 is described here as being implemented for use in the system 300 of FIG. 3, though other embodiments can be implemented in other ways.

In the embodiment shown in FIG. 11, the inter-networking device 354 comprises at least one programmable processor 1100 that executes software 1102 (referred to as "firmware" in some embodiments) that causes the inter-networking device 354 to carry out various functions described below. The software 1102 comprises program instructions that are stored (or otherwise embodied) on an appropriate storage medium or media (for example, flash memory) from which at least a portion of the program instructions are read by the programmable processor 1100 for execution thereby. The inter-networking device 354 also includes memory 1104 that is coupled to the programmable processor 1100 for storing program instructions and data.

The inter-networking device 354 includes a plurality of ports 1106. Each port 1106 includes a suitable interface for coupling physical communication media to the inter-networking device 1106. Each such interface includes, for example, a mechanical structure for attaching the physical communication media to the inter-networking device 354 and a physical layer device (PHY) to send and receive signals over the attached communication media. In one such embodiment, the ports 1106 are ETHERNET ports.

The software 1102 comprises inter-networking functionality 1108 that causes the inter-networking device 354 to perform one or more inter-networking functions for which it was designed. Examples of inter-networking functions include Layer 1, Layer 2, and Layer 3 (of the OSI model) inter-networking functions such as the routing, switching, repeating, bridging, and grooming of communication traffic that is received at the inter-networking device 354 via the plurality of ports 1106.

The software 1102 also comprises management functionality 1110 that enables the inter-networking device 354 to be configured and managed. In the particular embodiment shown in FIG. 11, the management functionality 1110 includes a web server (and related web content and applications) that enables a user to directly interact with the inter-networking device 354 using a web browser. In this embodiment, the management functionality 1110 also includes SNMP functionality for interacting with an NMS (such as NMS 380) using the SNMP protocol. SNMP commands and responses are communicated over the one or more IP networks 350 via one or more of the ports 1106 of the inter-networking device 354.

The software 1102 also includes physical layer information (PLI) functionality 1112. The PLI functionality 1112 is configured to retrieve physical layer information from the aggregation point 353 and provide it to the inter-networking functionality 1108. The inter-networking functionality 1108 uses the retrieved physical layer information to perform one or more inter-networking functions. In the embodiment shown in FIG. 11, the PLI functionality 1112 retrieves physical layer information from the aggregation point 353 using the API 820 (shown in FIG. 8) implemented by the aggregation point 353. To do this, the PLI functionality 1112 supports the protocol used by the API 820. The software 1102 in the inter-networking device 354 communicates with the aggregation point 353 over the IP networks 350. The aggregation point software 800 executing on the aggregation point 353 processes and responds to API calls from the inter-networking device 354. The inter-networking device 354 can also retrieve at least some of the physical layer information from an NMS or other network element.

Some communication protocols (for example, the IEEE 802.3 family of ETHERNET standards) include functionality for automatically determining a suitable communication rate for a given communication link (for example, the IEEE 802.3 auto-negotiation, auto-sensing, and auto-fallback features). This type of functionality performs tests to make such determinations. In other words, the physical communication media is still, from the perspective of such an inter-networking device, a "black box." The physical layer information provided to the inter-networking functionality 1108 by the PLI functionality 1112 enables the inter-networking functionality 1108 to treat the physical layer as a "white box" for which it has accurate information to use in carrying out its inter-networking functions (for example, to use in making bridging, routing, or switching decisions). In one implementation of such an embodiment, the physical layer information received from the aggregation point 353 is provided to the inter-networking functionality 1108 to assist it in performing such auto-rate selection procedures.

Moreover, where such conventional rate-determination functionality is used in making inter-networking decisions (such as, decisions as to which port to route data on), such conventional functionality is typically only able to characterize communication links that are directly connected to the inter-networking device. This means that if there is a segment of physical communication media that is one or more "hops" away from the inter-networking device that is of a lower quality (for example, because it supports lower communication rates) than the physical communication media used to implement the link that is directly attached to the inter-networking device, the inter-networking device would be unaware of that fact and would not take that fact into account in make routing or other inter-networking policy decisions. In the embodiment shown in FIG. 11, the physical layer information received from the aggregation point 353 (and from other sources such as the NMS 380) can be used to identify such situations and respond accordingly.

The physical layer information received from the aggregation point 353 can be used in other ways. For example, the inter-networking functionality 1108 can be configured to constrain the routing of communication traffic by a policy that dictates that traffic received on some ports 1106 can only be communicated through certain areas of a building or buildings (for example, only through "secure" areas of the building). In order for such a policy to be enforced, the inter-networking functionality 1108 needs to know where traffic that is output on each of its ports 1106 will pass. The physical layer information received from the aggregation point 353 can be used to make such determinations.

In another example, the inter-networking functionality 1108 is configured to enforce a policy that requires only certain types of physical communication media to be use with it (for example, requiring the use of certain brands or types or lengths of patch cords). The physical layer information received from the aggregation point 353 can be used by the inter-networking functionality 1108 to enforce such a policy (for example, by not forwarding data received on ports 1106 that have non-compliant media connected to them and/or by raising alarms or warnings when non-compliant media is connected to a port 1106). In other words, the inter-networking functionality 1108 can be configured to act as a "bus guardian" that enforces a "virtual keying" scheme in which at least some of the media information stored in or on a patch cord 312 is used to "key" the patch cord 312.

As noted above in connection with FIG. 1, inter-networking devices can also include media reading interfaces to read media information that is stored in or on the segments of physical media that are attached to its ports and to communicate the media information it reads from the attached segments of media (as well as information about the inter-networking device itself) to an aggregation point. For example, as shown in FIG. 11, each port 1106 has an associated media reading interface 1120 that the programmable processor 1100 uses to read media information that is stored in or on the segments of physical media that are attached to its ports 1106. The programmable processor 1100 in this example communicates the media information that it has read to a suitable aggregation point using one or more of the communication links that are established via one of its ports 1106.

In other implementations, the inter-networking device 354 does not include media reading interfaces, and the physical layer information related to the physical media attached to its ports is provided to an aggregation point in other ways (for example, by manually entering and uploading the information).

Figure 12:
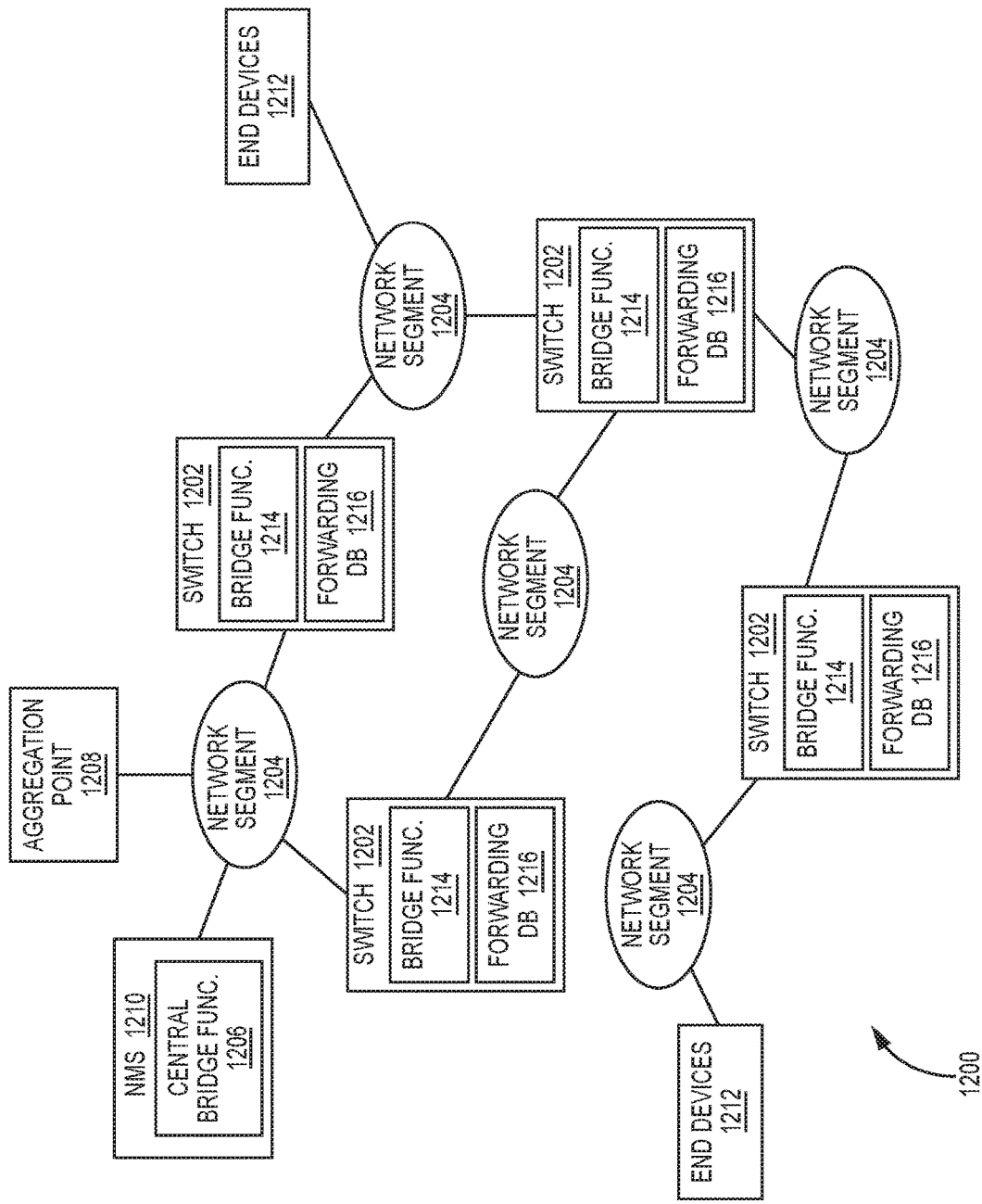
FIG. 12 illustrates an example of how physical layer information that is captured and aggregated using the techniques described here can be used to improve the efficiency of the inter-networking devices used in a network.

FIG. 12 illustrates another example of how physical layer information that is captured and aggregated using the techniques described here can be used to improve the efficiency of the inter-networking devices used in a network. In the example shown in FIG. 12, the network 1200 is implemented as a mesh network of Layer 2 devices 1202 (typically ETHERNET switches) that bridge various ETHERNET LAN segments 1204 together. In such an ETHERNET network 1200, a minimum spanning tree is constructed and those links that are not part of the spanning tree are disabled by disabling the corresponding ports of the switches 1202. As a result, a single active path exists between any two nodes in the network 1200. One or more redundant links can also be defined to provide backup paths that can be used if a link in the active path fails. The spanning tree is constructed in order to avoid loops.

In conventional ETHERNET networks, a spanning tree protocol that complies with the IEEE 802.1D MAC Bridges standard is used to construct a spanning tree for the network. However, the spanning tree algorithm used in conventional ETHERNET networks is a "distributed" algorithm, in which the relevant switch must learn what devices are connected to it, exchange messages with the other switches, take part in electing a root bridge, and maintain a forwarding database. Also, when a new switch is added to the network, all the switches in the network must be informed by the root bridge of any topology changes that result from adding the new switch, in which case the other bridge devices must update the forwarding databases they maintain.

Because a distributed spanning tree protocol is used in conventional ETHERNET networks, each switch must include sufficient processing power to implement the spanning tree protocol and to perform database look-ups when making decisions regarding how to forward packets it receives. In addition, changes to the spanning tree topology can take a significant amount of time to propagate through the network, which may lead to degraded network performance or, in some cases, loops. Also, the degree to which a conventional switch can learn about the network is limited, which can also lead to degraded network performance.

Moreover, each such conventional switch typically uses transparent bridging to forward packets using the forwarding database. The forwarding database is initially empty and entries are added to the database as the switch receives packets. When a switch receives a packet, it inspects the source MAC address of the packet and adds an entry to the forwarding database for that source MAC address (if one does not already exist) that associates that MAC address with the port on which the packet was received. The switch also inspects the destination MAC address of the packet and searches for an entry in the forwarding database for that destination MAC address. If an entry is not found in the forwarding database for that destination MAC address, the packet is flooded to all other ports of the switch. In the future, when the switch receives a packet from the device that has that MAC address as its source MAC address, the switch adds an entry to its forwarding database that associates that MAC address with the port on which the packet was received. In this way, the switch is able to build up a forwarding database over time. The forwarding database needs to be updated as the topology of the network changes (for example, due to a patch cord being moved or removed, failure of links, the addition or deletion of a switch, or the movement of an end-user device).

Because the forwarding database is maintained separately in each switch in a conventional ETHERNET network, each such switch must have sufficient processing power to perform such processing. Also, when the network topology changes occur, the performance of the network can be degraded, as the switches flood the network in order to learn the new topology of the network.

In the example shown in FIG. 12, centralized bridge functionality 1206 is deployed in the network 1200 to alleviate some of the problems noted above. The centralized bridge functionality 1206 interacts with the one or more aggregation points 1208 that aggregate physical layer information for the network 1200. In the particular example shown in FIG. 12, the central bridge functionality 1206 is deployed in an NMS 1210. The aggregation point 1208 collects the MAC addresses of the end devices 1212 that are on the network 1200 as well as information about the switches 1202.

In the example shown in FIG. 12, for some of the end devices 1212, media information for each segment of physical media that connects each such end device 1212 to a switch 1202 is automatically read and communicated to an aggregation point 1208. That is, the end devices 1212 include an appropriate media reading interfaces and driver software to read media information that is stored on an ETHERNET cable connected to that end device 1212 and provide the media information for the ETHERNET cable, as well the MAC address for the end device 1212 and its current IP address, to an aggregation point 1208. If the end device 1212 is connected to a switch 1202 via one or more intermediary devices (such as a wall outlet and one or more patch panels), each such intermediary device would include appropriate media reading interface functionality to read the media information and provide to the aggregation point 1208. In this way, the aggregation point 1208 would be able to associate the MAC address of each such end device 1212 with a port of the switch 1202.

Also, in the example shown in FIG. 12, for some of the end devices 1212, media information for at least one segment of physical communication media that connects each such end device 1212 to a switch 1202 is not automatically read and communicated to an aggregation point 1208. For these end devices 1212, physical layer information for each segment of physical communication media that connects the end devices 1212 to ports of the switch 1202 and the MAC addresses for the end devices 1212 can be manually entered and uploaded to the aggregation point 1208 (as described above). Alternatively, the central bridge functionality 1206 and/or the aggregations point 1208 can obtain such information in other ways. For example, the associations between the MAC addresses of the end devices 1212 and the ports of the switch 1202 can be learned from the NMS 1210.

The central bridge functionality 1206 uses the physical layer information and MAC address information it has received to associate the MAC address for each end device 1212 with the port of the particular switch 1202 to which the end device 1212 is connected. Then, the central bridge functionality 1206 determines a minimum spanning tree for the network 1200 using that information and determines a corresponding STP state (typically, "blocking", "forwarding", or "disabled") for each port of each switch 1202. The central bridge functionality 1206 then determines how the forwarding database for each of the switches 1202 should be configured based on the spanning tree and the MAC address information the central bridge functionality 1206 has. The port state information and forwarding database information is then communicated to each of the switches 1202.

Each of the switches 1202 includes corresponding bridge functionality 1214 to receive the port state information and forwarding database information from the central bridge functionality 1206. The bridge functionality 1214 in each switch 1202 configures the switch 1202 so that each port is in the particular STP state specified by the central bridge functionality 1206 for it. Also, the bridge functionality 1214 in each switch 1202 uses the forwarding database information it receives from the central bridge functionality 1206 to configure its forwarding database 1216.

When changes occur to the network 1200, the aggregation point 1208 (and/or the other source of MAC address information such as the NMS 1210) will see the changes and provide updated information to the central bridge functionality 1206. The central bridge functionality 1206 can modify the spanning tree topology, if needed, and determine what (if any) changes to each switch's port states and forwarding databases 1216 need to be made in response to the changes in the network 1200.

By having the central bridge functionality 1206 determine the spanning tree for the network 1200 and configure the forwarding databases 1216 in the switches 1202, the switches 1202 need not perform such processing and, instead, the resources in the switch 1202 can be dedicated to forwarding packets. Also, the central bridge functionality 1206 is able to directly learn of changes in the network 1200 from the aggregation point 1208 and quickly respond to such changes and communicate any needed changes to the switches 1202. All of this should improve the performance of the network 1200. Moreover, the central bridge functionality 1206, because it has access to more information about the network 1200, can more effectively create the spanning tree (for example, by assembling the spanning tree based on the type, number, location, length, etc. of physical communication media used to implement the various logical communication links in the network 1200).

Figure 13:
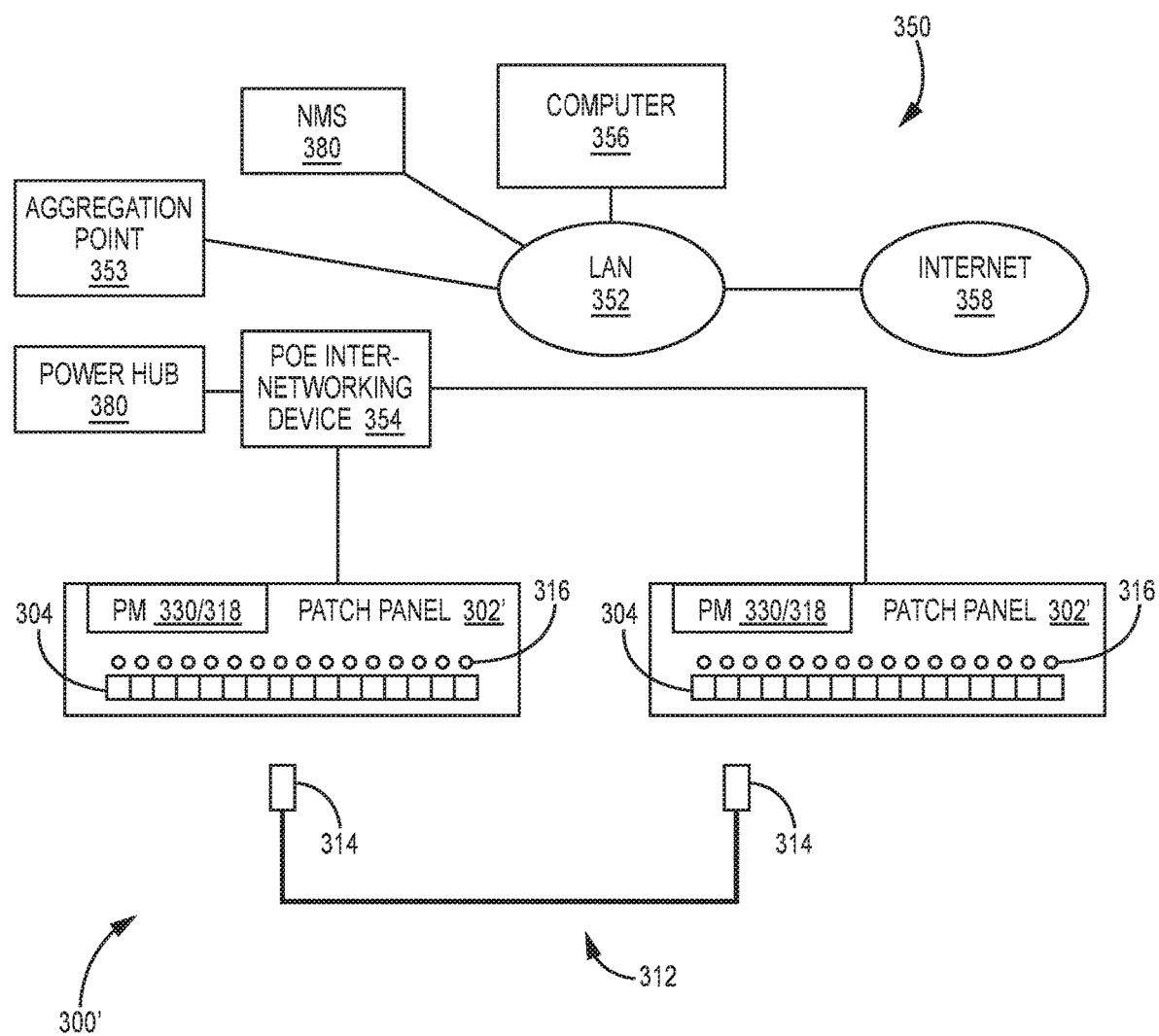
FIG. 13 illustrates another exemplary embodiment of a system that includes physical layer information functionality as well as physical layer management functionality.

FIG. 13 illustrates an alternative embodiment of a system 300' that includes physical layer information functionality as well as physical layer management functionality. The system 300' is similar to the system 300 of FIG. 3 except as described below. Those elements of the system 300' that are same as the corresponding elements of system 300 are referenced in FIG. 13 using the same reference numerals, and the description of such elements is not repeated below in connection FIG. 13.

The main difference between the system 300 of FIG. 3 and the system 300' of FIG. 13 is that, in the system 300' of FIG. 13, the master processor unit and slave processor unit are combined together into a single combined master/slave processor unit 330/318 that is included in each patch panel 302'. That is, each patch panel 302' includes the master processor unit 330 unit functionality shown in FIG. 6 (for example, each patent panel 302' includes master processor 332 and ETHERNET interface 340). Also, each patch panel 302' directly communicates with an appropriate aggregation point 353. As a result, a backplane is not needed to communicate between the master processor unit functionality and the slave processor unit functionality.

Figure 14:
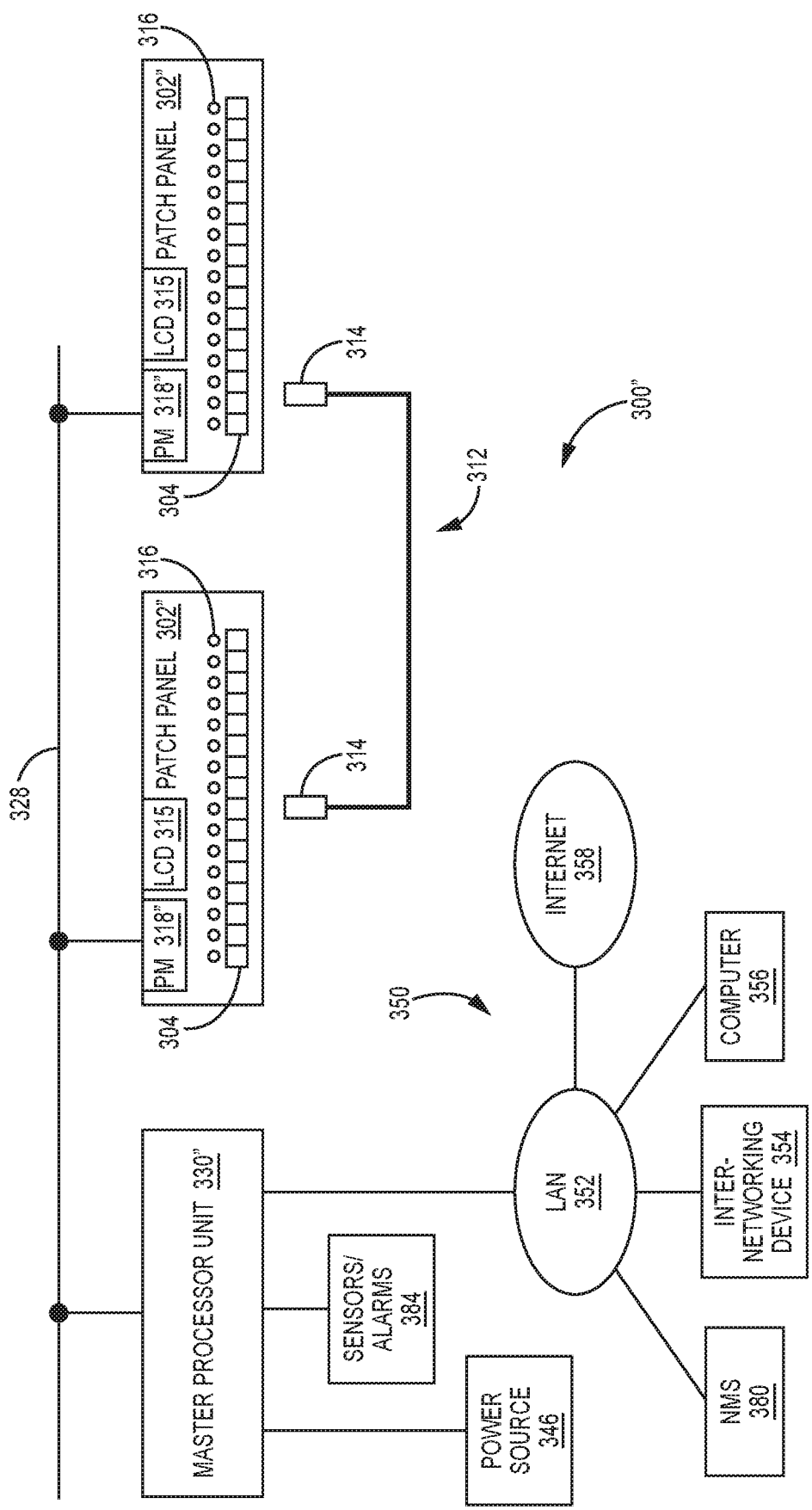
FIGS. 14-16 illustrate another exemplary embodiment of a system that includes physical layer information functionality as well as physical layer management functionality.
Figure 15:
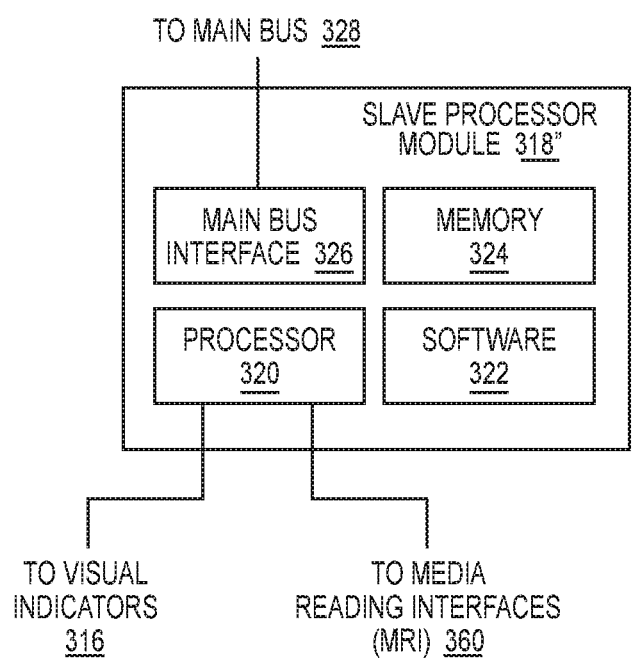
Figure 16:
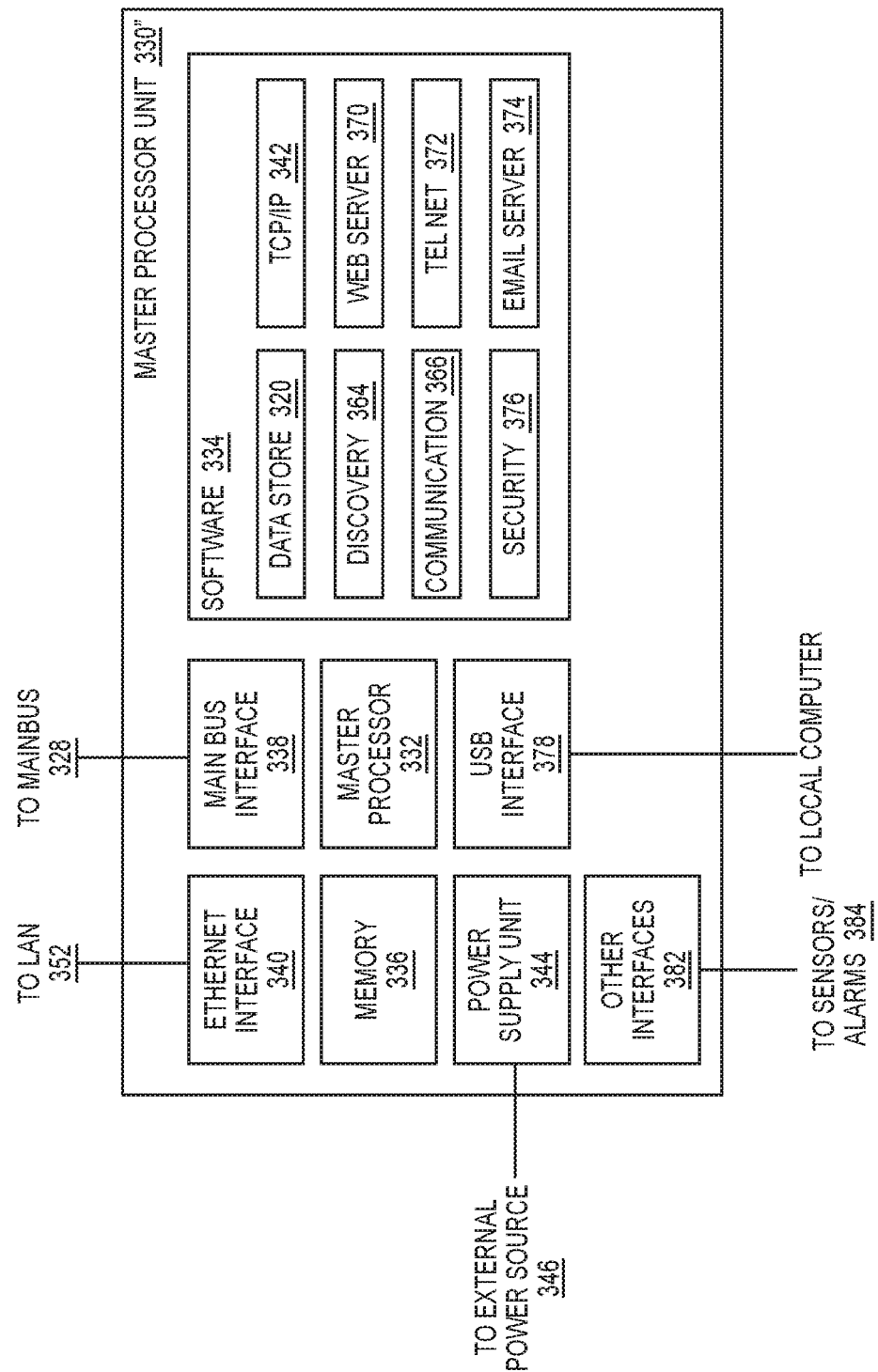

FIGS. 14-16 illustrate yet another alternative embodiment of a system 300" that includes physical layer information functionality as well as physical layer management functionality. The system 300" is similar to the system 300 of FIG. 3 except as described below. Those elements of the system 300" that are same as the corresponding elements of system 300 are referenced in FIGS. 14-16 using the same reference numerals, and the description of such elements is not repeated below in connection FIGS. 14-16.

The main difference between the system 300 of FIG. 3 and the system 300" of FIGS. 14-16 is that the patch panels 302" and the MPU 330" communicate over a main bus 328 using protocols specified in the Institute of Electrical and Electronics Engineers (IEEE) 802.14.5 standard. Although the IEEE 802.14.5 protocols are typically used for wireless communications, in the embodiment shown in FIGS. 14-16, the patch panels 302" and MPU 330" use the IEEE 802.14.5 protocols to communicate over one or more CATV coaxial cables.

In such an embodiment, the main bus 328 is physically implemented using one or more coaxial cables, where the data communications are communicated along the coaxial cables in a suitable radio frequency band and where the MPU 330" supplies DC power over the coaxial cables for use by the active components of each patch panel 302". The slave processor module 318" in each patch panel 302" includes a suitable bus interface 326 (shown in FIG. 15) to couple the slave processor 320 to the master processor module 330", and the master processor unit 330" includes a suitable bus interface 338 (shown in FIG. 16).

In such an embodiment, the patch panel software 322 and the main bus interfaces 326 of each patch panel" 302 and the MPU software 334 and the main bus interface 338 of the MPU 330" comprises suitable functionality to enable the programmable processor 320 in each patch panel 302" and the programmable processor 332 in the MPU 330" to send and receive data using the IEEE 802.14.5 protocol as well as connectors (such as "F" connectors) to connect each patch panel 302" and the MPU 330" to the coaxial cables used to implement the main bus 328 (via for example, a tap or splitter). The addressing scheme of the IEEE 802.14.5 protocols supports up to 127 patch panels (each patch panel 302' supporting up to 48 ports, for a total of 6096 ports) and one MPU 330". The IEEE 802.14.5 protocols are designed for low-power applications, which is especially well-suited for use in the embodiment shown in FIGS. 14-16.

Also, in the embodiment shown in FIG. 14-16, power is supplied to each patch panel 302" (more specifically, to the active components of each patch panel 302") over the main bus 328. The PSU 344 in the MPU 330" converts the external power received from the external power source 346 to power that is suitable for use by the components of the MPU 330" and for supply to the patch panels 302".

Figure 17:
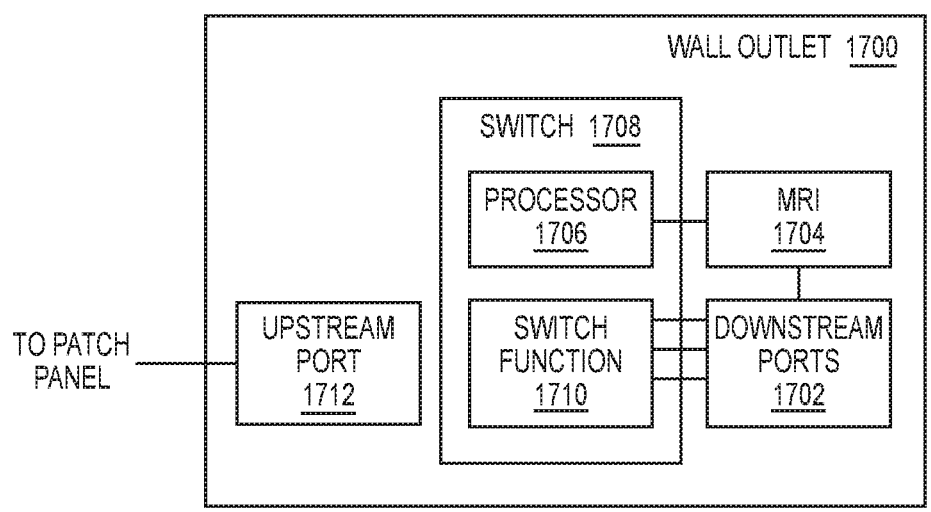
FIG. 17 is a block diagram of one embodiment of a wall outlet that includes functionality to obtain physical layer information.

FIG. 17 is a block diagram of one embodiment of a wall outlet 1700 that includes functionality to obtain physical layer information. The embodiment of a wall outlet 1700 shown in FIG. 17 is described here as being implemented for use with the system 100 of FIG. 1, though other embodiments can be implemented in other ways.

The wall outlet 1700 is configured to be installed in or on a wall or similar structure. The wall outlet 1700 includes a set of ports 1702 similar to the ports described above in connection with FIGS. 1-16. The ports 1702 are also referred to here as "downstream" ports 1702. In general, each downstream port 1702 includes a respective front connector (or other attachment point) in which a connectorized cable (or other segment of physical media) can be attached. An example of such a connectorized cable is a twisted-pair cable having RJ-45 plugs at each end. Each downstream port 1702 also includes a rear attachment point that is connected to a corresponding port of a switch 1708. The switch 1708 is used to communicatively couple each of the downstream ports 1702 to a patch panel (not shown in FIG. 17) over a single cable, which is attached to the wall outlet 1700 via an upstream port 1712. In one implementation of such an embodiment, the upstream port 1712 is configured to be used with a non-connectorized cable. This cable is typically routed through a building (for example, over, under, around, and/or through walls, ceilings, floors, and the like) and is typically not easily or frequently moved.

The switch 1708 includes a switching function 1710 that switches data packets among the downstream ports 1702 and the upstream port 1712. The switching function 1710 is implemented, for example, in software, hardware, or combinations thereof.

The downstream ports 1702 of the wall outlet 1700 are configured to be used with connectorized cables that have media information stored in or on them (for example, as described above in connection with FIGS. 1-16). The wall outlet 1700 includes a media reading interface 1704 for each downstream port 1702. In this embodiment, the media read interfaces 1704 are implemented in the same manner as the media reading interfaces described above in connection with FIGS. 1-16. Each media reading interface 1704 is used to read the media information stored in or on the connectorized cable that is inserted into the corresponding downstream port 1702. The media information that is read from the connectorized cables that are inserted into the downstream ports 1702 is communicated from the media reading interfaces 1704 to a programmable processor 1706. In the embodiment shown in FIG. 17, the programmable processor 1706 is a part of the switch 1708.

The programmable processor 1706 executes software that is similar to the software that is executed by the programmable processors described above in connection with FIGS. 1-16 (including, for example, a web server or other software that enables a user to interact with the processor 1706). The main difference is that the programmable processor 1706, in the embodiment shown in FIG. 17, communicates with a suitable aggregation point using the logical communication link that is provided using the upstream port 1712. The wall outlet 1700 can be used to capture, and communicate to a suitable aggregation point, physical layer information related to the wall outlet 1700 itself, the connectorized cables inserted into the downstream ports 1702, and the non-connectorized cable attached to the upstream port 1712.

Figure 18:
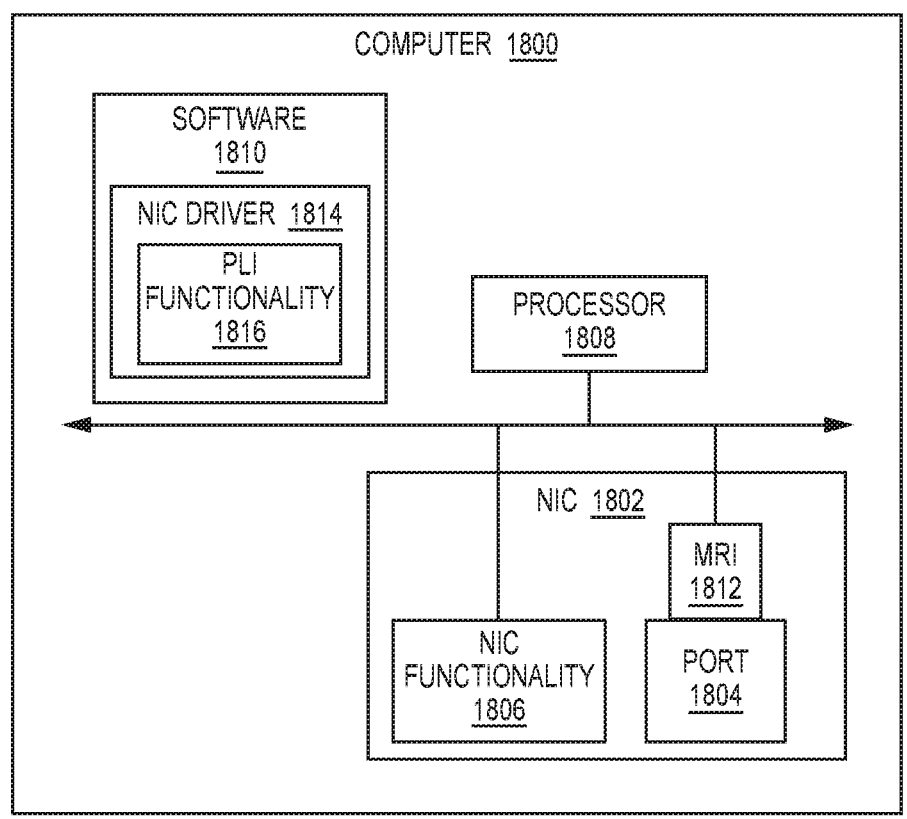
FIG. 18 is one embodiment of a computer that includes functionality to obtain physical layer information.

As noted above, the techniques described here for reading media information stored in or on a segment of physical communication media can be used in one or more end nodes of the network. For example, computers (such as, laptops, servers, desktop computers, or special-purpose computing devices such as IP telephones, IP multi-media appliances, and storage devices) can be configured to read media information that is stored in or on the segments of physical communication media that are attached to its ports and to communicate the media information it reads from the attached segments of media (as well as information about the device itself) to an aggregation point. FIG. 18 is one embodiment of such a computer 1800. The computer 1800 includes a network interface card (NIC) 1802 that is used to connect the computer 1800 to an IP network (for example, an ETHERNET local area network). The NIC 1802 includes a port 1804 that is used to physically attach a suitable cable (for example, a CAT-5/6/7 cable) to the NIC 1802. The NIC 1804 also includes standard NIC functionality 1806 for communicating over the IP network (for example, a suitable physical layer device (PHY) and media access control (MAC) device). The NIC 1802 enables one or more processors 1808 (and the software 1810 executing thereon) included in the computer 1800 to communicate with the IP network. In this embodiment, the NIC 1802 includes a media reading interface 1812 that the one or more processors 1808 use to read media information stored on or in the cable that is attached to the computer 1800. The media information that is read from the cable, as well as information about the NIC 1802 and the computer 1800 (for example, any assigned MAC address or IP addresses) can be communicated to a suitable aggregation point as described above. In one implementation of such an embodiment, a NIC software driver 1814 used with the NIC 1802 includes physical layer information (PLI) functionality 1816 that causes the processor 1808 to read and communicate such physical layer information. The NIC 1802 and MRI 1812 are coupled to the processor 1808 using a suitable bus or other interconnect (not shown). In this way, information about the computer 1800 can be automatically obtained and used in the various applications described.

Functionality for reading media information stored in or on physical communication media can be integrated into one or more of the integrated circuits (or other circuits or devices) that communicate over the communication media. For example, functionality for reading such media information can be integrated into an ETHERNET physical layer device used in a switch. One such example is shown in FIG. 19.

Figure 19:
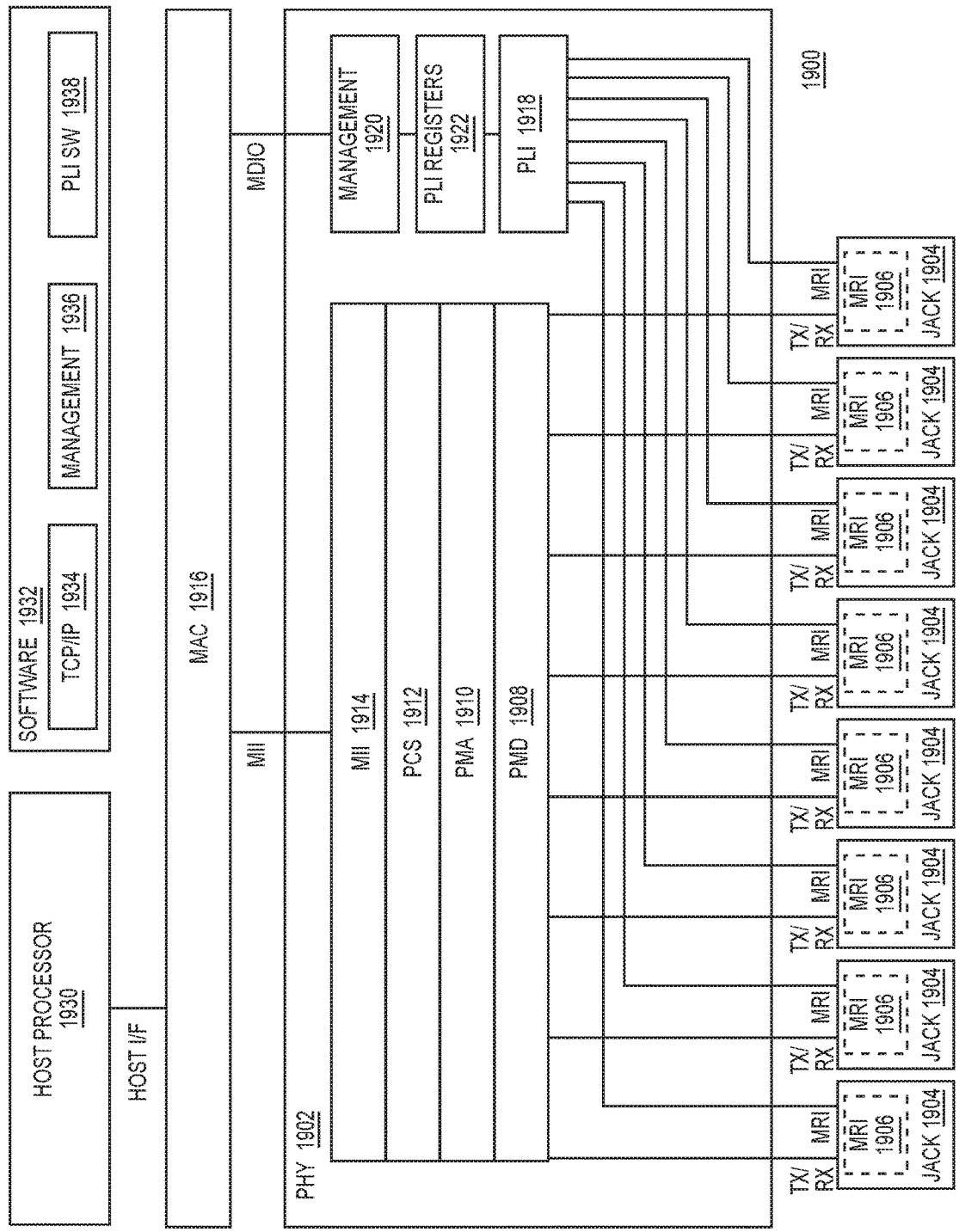
FIG. 19 is a block diagram of one exemplary embodiment of a switch that uses a physical layer device that includes integrated functionality for reading media information.

FIG. 19 is a block diagram of one exemplary embodiment of an ETHERNET switch 1900 that uses a physical layer device (PHY) 1902 that includes integrated functionality for reading media information. In the particular exemplary embodiment shown in FIG. 19, the PHY 1902 is in an octal ETHERNET PHY that includes ETHERNET physical layer functionality for eight ETHERNET ports (though it is to be understood that the techniques described here in connection with FIG. 19 can be used with physical layer devices having a different number of ports). In this embodiment, eight RJ-45 jacks 1904 are coupled to the PHY 1902. Each of the RJ-45 jacks 1904 is configured to receive an RJ-45 plug attached to a CAT-5, 6, or 7 twisted-pair cable. For each RJ-45 jack 1904, the transmit conductors (TX+ and TX−) and receive conductors (RX+ and RX−) of that RJ-45 jack 1904 are coupled to transmit pins (TX+ and TX−) and receive pins (RX+ and RX−), respectively, of the PHY 1902 using appropriate isolation transformers (not shown) that are either integrated into the jack 1904 itself or that are external to it.

The PHY 1902 includes the required ETHERNET physical sublayers—including a Physical Medium Dependent (PMD) sublayer 1908 (which includes an appropriate transceiver for the physical communication media that are used with the switch 1900), a Physical Medium Attachment (PMA) sublayer 1910 (which performs PMA framing, octet synchronization/detection, and scrambling/descrambling), and a Physical Coding Sublayer (PCS) 1912 (which performs auto-negotiation and encoding/decoding). The PHY 1902 also includes an appropriate Medium Independent Interface (MII) 1914 (for example, a Medium Independent Interface, a Reduced Media Independent Interface (RMII), a Gigabit Media Independent Interface (GMII), and/or a Serial Media Independent Interface (SMII)) to connect the PHY 1902 to an ETHERNET media access control (MAC) device 1916. As noted above, in the particular exemplary embodiment shown in FIG. 19, the PHY 1902 is designed for use in an ETHERNET switch 1900 and, as a result, the MAC 1916 is a switch MAC device that includes appropriate functionality to implement an ETHERNET switch.

The PHY 1902 typically also includes other standard ETHERNET physical layer functionality. For example, the PHY 1902 includes management functionality 1920 for controlling and managing the PHY 1902 and a management data input/output (MDIO) interface for communicating management information between the PHY 1902 and the MAC 1916. Other standard ETHERNT physical functionality includes, Medium Dependent Interface Cross-Over (MDIX) functionality and clock functionality (both of which are not shown in FIG. 19).

In the exemplary embodiment shown in FIG. 19, each RJ-45 jack 1904 includes a media reading interface 1906 that can be used to determine if an RJ-45 plug is inserted into that RJ-45 jack 1904 and, if one is, to read the media information stored in an EEPROM attached to the RJ-45 plug (if there is one). Example configurations of such a media interface 1906 and a suitable RJ-45 plug are described above and in the '395 application, the '208 application, and the '964 application.

In this embodiment, a four line media reading interface 1906 is used. One line is used for communicating data (using a serial data protocol), one line is used for power, and one line is used for ground. In this particular embodiment, a fourth line is also provided for potential future possible uses or upgrades.

The PHY 1902 includes appropriate pins (or other inputs) for connecting to each of the eight media reading interfaces 1906. The PHY 1902 also includes physical layer information (PLI) functionality 1918 that is coupled to the eight media reading interfaces 1906.

In the particular exemplary embodiment shown in FIG. 19, the PLI functionality 1918 is configured to provide the power and ground signals on the power and ground lines of each of the media reading interfaces 1906. For example, the PLI functionality 1918, in one implementation, is connected to the main power input of the PHY 1902 in order to provide a suitable power signal on the power lines of each of the media reading interfaces 1906. Also, the PLI functionality 1918 is connected to the main ground input of the PHY 1902 in order to provide a connection to ground for each of the ground lines of the media reading interfaces 1906.

In the particular exemplary embodiment shown in FIG. 19, the PLI functionality 1918 is configured to monitor the eight media reading interfaces 1906 and determine when an RJ-45 plug has been inserted into each of the RJ-45 jacks 1904. This can be done using the schemes described in the '395 application, the '208 application, and the '964 application. The PHY device 1902 includes one or more registers 1922 (also referred to here as "PLI registers" 1922) in which the PLI functionality 1918 stores PLI-related information. One byte of the PLI register 1922 (also referred to here as the "state byte") is used to store information about the state of each of the eight jacks 1904, where each bit of the state byte represents the state of a respective one of the jacks 1904. When the state of a particular jack 1904 changes (that is, when a plug is inserted into a previously empty jack 1904 or a plug is removed from a jack 1904), the PLI functionality 1918 is able to detect such change and change the state of the corresponding bit in the state byte stored the PLI registers 1922.

The PLI functionality 1918 in the PHY device 1902 is also configured to, when instructed to do so, read the media information stored in an EEPROM (if there is one) attached to an RJ-45 plug that is inserted into a jack 1904. Data that is read from the EEPROM is stored in the PLI registers 1922 of the PHY device 1902. Also, the PLI functionality 1918 is configured to, when instructed to do so, write data stored in the PLI registers 1922 to an EEPROM attached to an RJ-45 plug that is inserted into a jack 1904.

In the particular exemplary embodiment shown in FIG. 19, a host processor 1930 is coupled to the MAC device 1916 via an appropriate host interface. The host processor 1930 executes software 1932 (also referred to here as the "host software"). The host software 1932 comprises program instructions that are stored (or otherwise embodied) on an appropriate storage medium or media from which at least a portion of the program instructions are read by the host processor 1930 for execution thereby.

In this exemplary embodiment, the host processor 1930 includes a TCP/IP stack 1934 and management software 1936 that implements various management and configuration related functionality (for example, a Simple Network Management Protocol (SNMP) agent and a web and/or TELNET server by which a user can interact with the management software 1936 running on the switch 1900).

In the exemplary embodiment shown in FIG. 19, the host software 1932 also includes PLI software 1938 that is configured to communicate physical layer information associated with the switch 1900 and the cables connected to it to an aggregation point over the network to which the switch 1900 is connected. In one implementation of the switch 1900, the PLI software 1938 implements the protocols described above to participate in the discovery processing supported by the aggregation point and to send PLI to the aggregation point. Also, in other implementations, the PLI software 1938 interacts with an aggregation point solely using the API (or other external interface technology) that the aggregation point provides for application-layer functionality to interact with it. In yet other implementations, the PLI software 1938 interacts with the aggregation point via a NMS or other intermediary device or system (for example, using a protocol supported by the NMS such as SNMP).

The PLI software 1938 executing on the host processor 1930 periodically reads the state byte stored in the PLI registers 1922 in the PHY 1902 by instructing the MAC device 1916 (via the host interface between the host processor 1930 and the MAC device 1916) to read the contents of the state byte (via the MDIO interface between the MAC device 1916 and the PHY device 1902).

When an RJ-45 plug is inserted into a jack 1904, the PLI software 1938 executing on the host processor 1930 will learn of that fact when it reads the state byte stored in the PLI registers 1922 of the PHY device 1902. Then, the PLI software 1938 causes (via the host interface between the host processor 1930 and the MAC device 1916) the MAC device 1916 to instruct (via the MDIO interface between the MAC device 1916 and the PHY device 1902) the PLI functionality 1918 in the PHY device 1902 to read the media information stored in the EEPROM (if any) attached to the newly inserted RJ-45 plug. The PLI functionality 1918 in the PHY device 1902 stores the media information it reads from the EEPROM in the PLI registers 1922. Once this is complete, the PLI software 1938 can obtain that media information by causing (via the host interface between the host processor 1930 and the MAC device 1916) the MAC device 1916 to read (via the MDIO interface between the MAC device 1916 and the PHY device 1902) the corresponding PLI registers 1922 in the PHY device 1902. The media information read by the MAC device 1916 is then provided to the PLI software 1938 via the host interface. The PLI software 1938 can then communicate that information to an aggregation point as described above.

In addition to communicating PLI about the switch 1900 and any cables connected to the jacks 1904 of the switch 1900, the switch 1900 can also implement one or more of the inter-networking features described above in connection with FIGS. 11-12.

Figure 20:
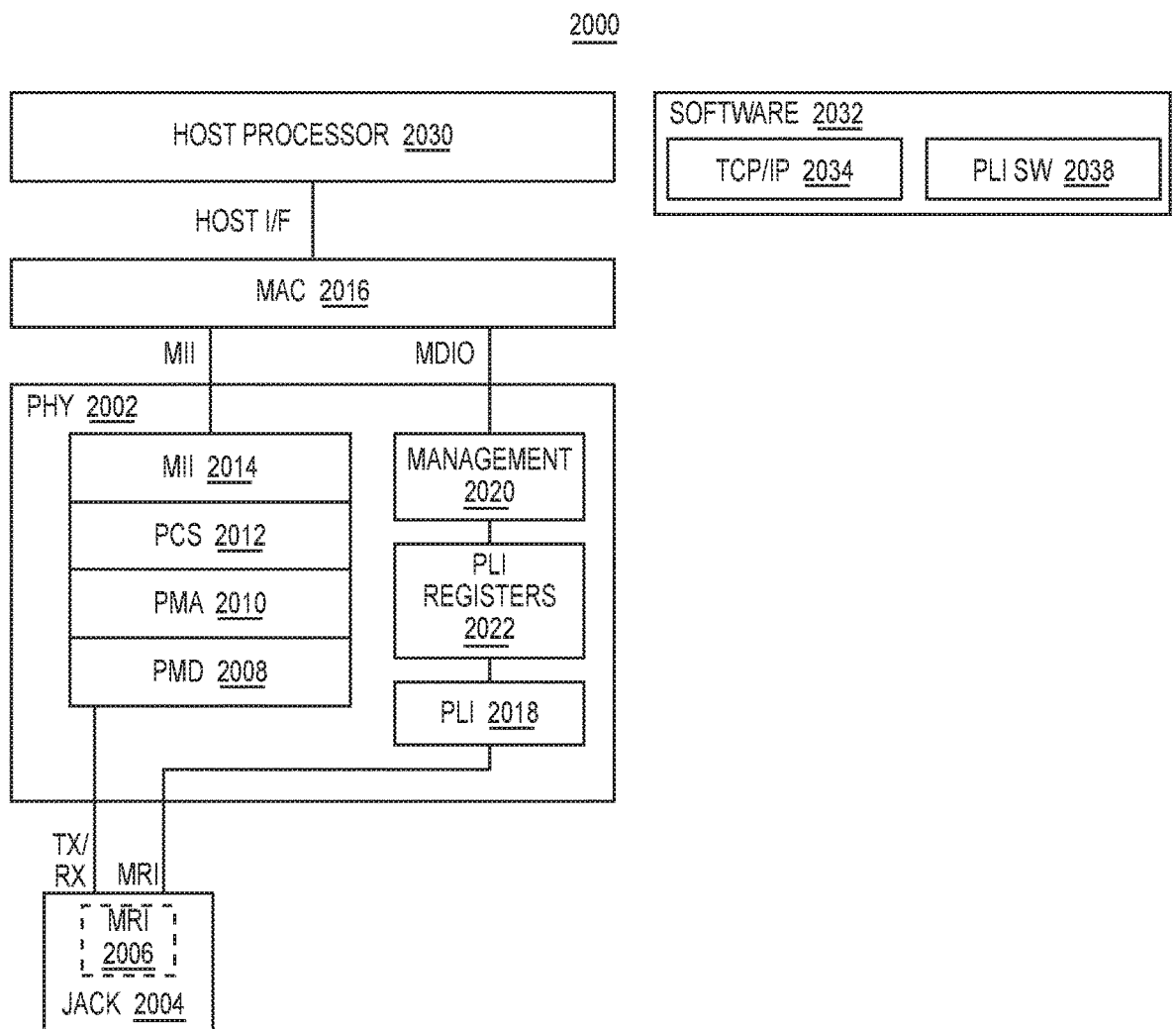
FIG. 20 is a block diagram of one exemplary embodiment of a computer that uses a physical layer device that includes integrated functionality for reading media information.

Another example of an ETHERNET physical layer device having integrated functionality for reading media information stored in or on physical communication media is shown in FIG. 20. FIG. 20 is a block diagram of one exemplary embodiment of a computer 2000 that uses a physical layer device (PHY) 2002 that includes integrated functionality for reading media information. The functionality for reading media information stored in or on CAT 5, 6, or 7 cables is integrated into the PHY 2002 in the same manner as described above in connection with FIG. 19. Accordingly, elements of the computer 2000 that are substantially similar to corresponding elements described above in connection with FIG. 19 are referenced in FIG. 20 using the same text labels as used in FIG. 19 and reference numerals with the same last two digits as those used in FIG. 19.

One difference between the PHY 2002 of FIG. 20 and the PHY 1902 of FIG. 19 is in the number ETHERNET ports supported. The PHY 2002 of FIG. 20 supports a single ETHERNET port. Also, the MAC device 2016 of FIG. 20 is a MAC device suitable for use in an end node device such as a computer 2000. Likewise, the software 2032 executing on the host processor 2030 is software that is typically executed by an end-user computer 2000.

Although FIGS. 19 and 20 illustrate particular examples of how functionality for reading media information stored on or in physical communication medium can be integrated into one or more of the integrated circuits (or other circuits or devices) that communicate over the communication media, it is to be understood that such media reading functionality can be integrated in other ways.

In other embodiments, media information is stored in or on unconnectorized cables or other physical communication media. For example, in one such embodiment, storage devices are attached near each end of the unconnecterized cable so that when each end of the cable is attached to a respective attachment point, an interface for a respective one of the storage devices mates with a corresponding media reading interface located on or near the attachment point so the information stored in the storage device can be read from the storage device in a similar manner as is described above. Such embodiments can include punch down connections for connecting copper twisted pair cables to the rear sides of RJ jacks or to Krone-type blocks that include Insulation Displacement Connectors (IDC's).

Figure 21:
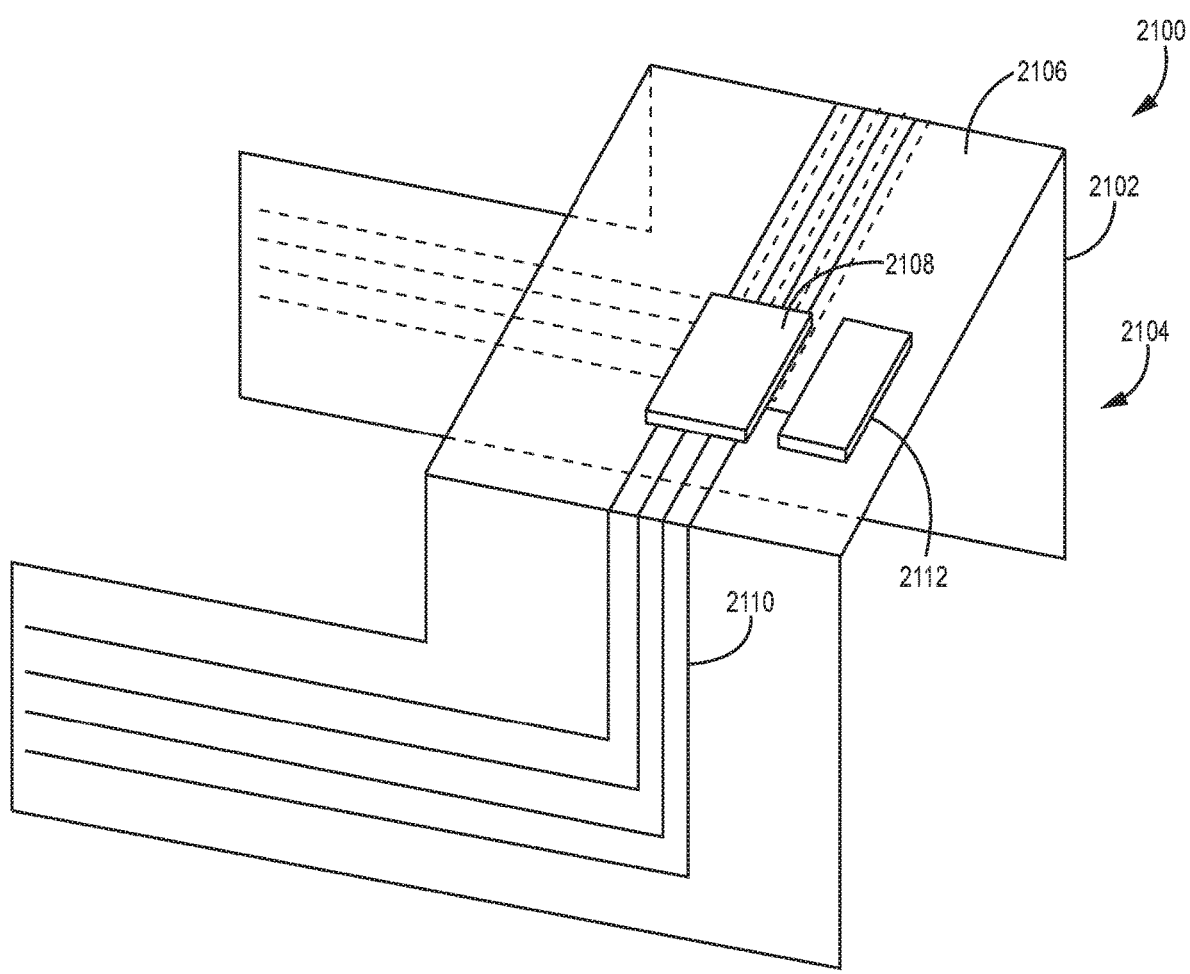
FIG. 21 is a diagram of one embodiment of a jacket that can be fitted around an RJ-45 plug in order to attach a storage device to the RJ-45 plug.

FIG. 21 is a diagram of one embodiment of a jacket 2100 that can be fitted around an RJ-45 plug in order to attach a storage device to the RJ-45 plug. The jacket 2100 is formed as a molded, flexible circuit 2102 that has two side walls 2104 and a top wall 2106. The flexible circuit 2102 is formed from one or more flexible films (for example, one or more polymer films) and is configured to fit snuggly around an RJ-45 plug so that the jacket 2100, once placed around the plug, will remain securely affixed to the RJ-45 plug.

In the embodiment shown in FIG. 21, a storage device 2108 (for example, an EEPROM or other non-volatile memory device) is mounted on the outer surface of the top wall 2106 of the molded, flexible circuit 2102. The storage device interface for mating with a media reading interface comprises a set of conductive leads 2110 that are formed on the outer surface of the top wall 2106 and extend down the outer surface of both side walls 2104. At least a portion of the leads 2110 are exposed (that is, do not have an insulator formed over them) so that corresponding contacts from a media reading interface can come into contact with the leads 2110 when the plug around which the jacket 2100 is attached is inserted into a port. In such an embodiment, the contacts of the media reading interface can be spring-loaded into order to press against the leads 2110 in order to form a good electrical contact. The media reading interface can then be used to read the information stored in the storage device 1508 in the manner described above.

Also, in this embodiment, an infra-red emitter 2112 is mounted on the outer surface of the top wall 2106. The infra-red emitter 2112 is configured to emit an infra-red signal on which at least a portion of the information stored in the storage device 2108 is encoded. In one implementation, the infra-red emitter 2112 is configured to output this infra-red signal with the information encoded thereon whenever the storage device 2108 is read using the media reading interface. The jacket 2100 is configured so that a technician can position an infra-red detector near the infra-read emitter 2112 in order to receive the infra-red signal that is emitted.

The infra-red detector can be coupled to, for example, a hand held unit that decodes the received infra-red signal and displays the information that was encoded on the infra-red signal. In this way, a technician can view the information that is stored in the storage device 2108 without requiring the RJ-45 plug to be removed from a port. This embodiment can be adapted for other connector types, including fiber optic connectors The PLI information that is captured, maintained, and made available using the techniques described here can be used for many different types of applications. For example, the PLI information can be used in managing the amount of slack that is associated with each media segment in the system. When a new patch cord (or other media segment) is needed to be installed in the network, the physical layer information that has been captured can be used to determine a precise and appropriate length for the patch cord based on the PLI and the particular slack-management policies that are used by the enterprise or carrier. Also, such PLI can be used to assist with public safety applications (for example, to help to locate devices that are used in a voice-over-Internet Protocol (VOIP) telephony system).

Examples of how such physical layer information can be used include the following. For example, a NMS (or other user interface associated with the aggregation point 120 or any connector assembly 102 such as patch panel 302 or 302'), when displaying information about a particular segment of physical media, can also be configured to automatically send the user to a web site via which the user can order a replacement for that particular media segment. For example, a Web-browser based user interface can be configured to display a button (or other user interface element) that a user can click on in order to automatically bring up a web site via which a replacement segment can be ordered. Similar functionality can be included in the user interfaces that are displayed by the aggregation points 120 and connector assemblies 104 (for example, by the web servers that execute on the aggregation points 102 and the connector assemblies 104 (for example, patch panels 302 or 302')).

In another example, when a particular lot of physical communication media segments is recalled (for example, due to safety or performance concerns), the physical layer information that is obtained in the manner described here can be used to determine if and where any of the recalled segments of physical media are deployed in the network. This information can be used in determining whether to replace the segment and/or can be used in actually replacing the segment.

In another example, the physical layer information described here is used for intrusion detection. For example, for particular secure resources on a network (for example, a particular server or service), a security policy can be established that specifies that the secure resources should only be accessed by specific computers that are coupled to the secure resource using particular ports of particular inter-networking devices or other connector assemblies and particular segments of physical communication media. If someone attempts to access the secure resources in a manner that does not comply with the security policy, he or she is not granted access to the secure resources. For example, if an intruder were able to spoof the identify of an authorized computer but accessed the secure resource using an unauthorized logical communication link, the intruder would still be denied access to the secure resource unless the intruder is able to spoof the identities of all of the other elements identified in the policy (for example, the identities of all the physical communication media that implement the logical communication link between the computer and the secure resource).

In another example, the aggregation point receives and store information about certain conditions that exist in various locations in which the physical communication media is deployed. For example, the aggregation point can be configured to receive and store information that is unique to each location (such as, local requirements concerning the use of battery backups, environmental conditions obtained from external sensors and external systems (such as external temperature sensors, HVAC systems, or computer servers that provide weather related information)). Routing decisions within the network can then be made, at least in part, based on such locally unique conditions.

In another example, a technician near a particular patch panel 302 may want to swap out a particular patch cord (for example, because a visual inspection of the patch cord identified some potential issue with the patch cord). A request for clearance to disconnect the patch cord from the associated port 304 would be routed to an aggregation point or a NMS. The aggregation point or NMS would send messages to one or more relevant inter-networking devices 354 indicating that a patch cord used to implement a particular logical communication link is going to be disconnected in the near future. The inter-networking devices 354, in response to such a signal, would route certain classes of traffic (for example, real-time traffic such as telephony or multimedia traffic) away from that logical communication link. Also, the inter-networking devices 354 can be configured to communicate an "all clear" signal back to the aggregation point or NMS, which indicates that it is okay, from the perspective of each such device, to disconnect the relevant patch cord. When the aggregation point or NMS receives all-clear signals from all the notified inter-networking devices, the aggregation point or NMS informs the technician (using the display 315) that it is okay to disconnect that patch cord.

In another example, the physical layer information obtained using the techniques described here is used to check if a particular type of physical communication media has been installed. For example, where an enterprise or carrier wishes to deploy a particular type of physical communication media for a given logical communication link (for example, CAT-6 compatible physical communication media to implement GIGABIT ETHERNET communication links), the physical layer information that is obtained as described above can be used to confirm that each physical communication media segment of the logical communication link has been implemented using the appropriate type of physical communication media. Another example is to confirm that multi-mode fiber or shielded twisted-pair cabling has been deployed instead of single-mode fiber or unshielded twisted-pair cabling, respectively, which may not be readily apparent from a visual inspection of the communication media when installed.

In another example, the physical layer information obtained using the techniques described here is used for theft monitoring. For example, in the case of IP telephony, the IP telephony server can be configured to deliver telephony service to each IP phone only if that IP phone is used with particular logical communication links implemented using particular physical layer elements (for example, segments deployed within a given building). If the IP phone is stolen or moved outside of any authorized area, the IP telephony server does not provide service to the IP phone, even if it is able to access the IP telephony server.

The techniques described here can be used in a variety of applications, including enterprise applications and carrier applications.

Figure 22:
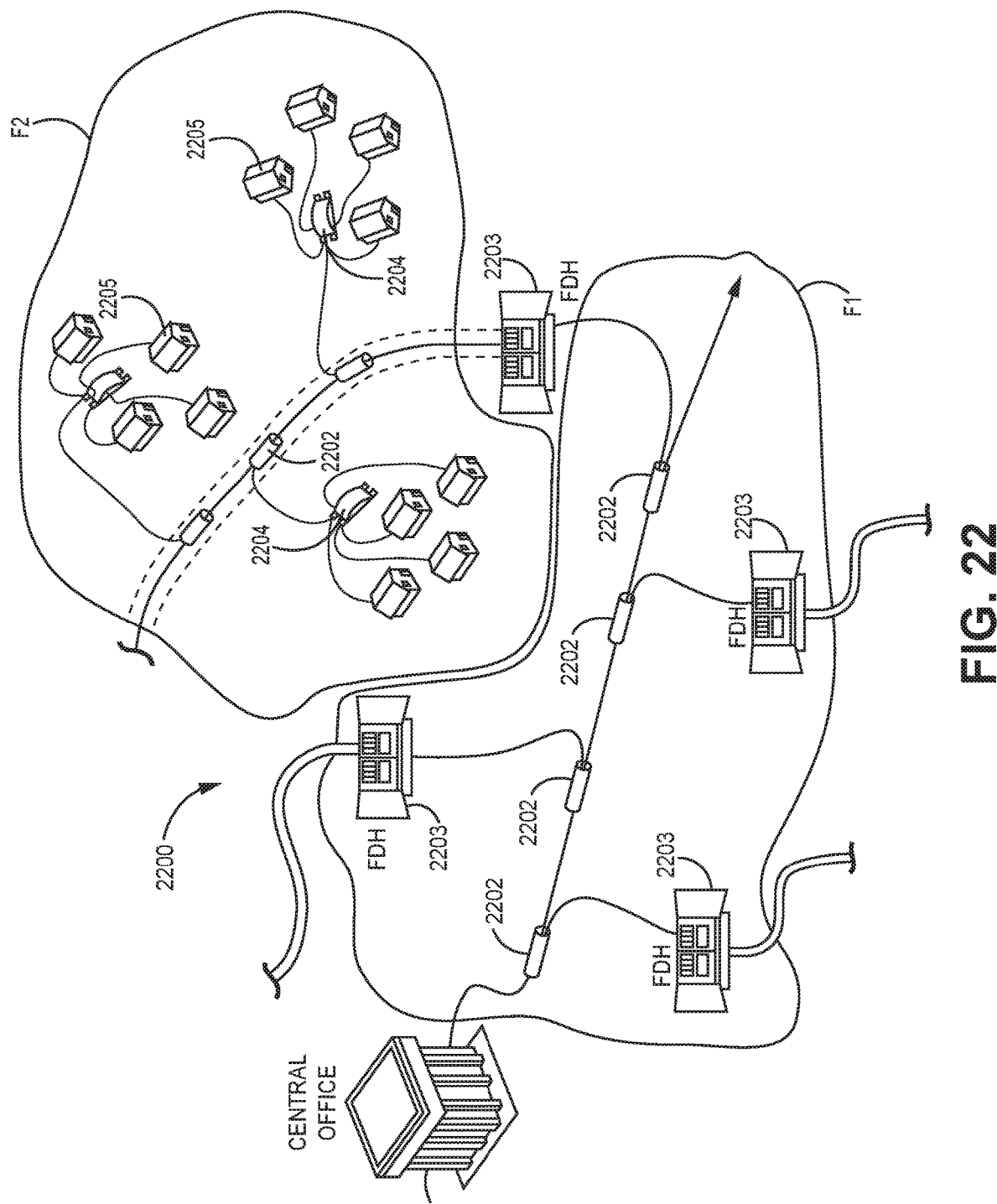
FIG. 22 illustrates a network deploying passive fiber optic lines.
Figure 23:
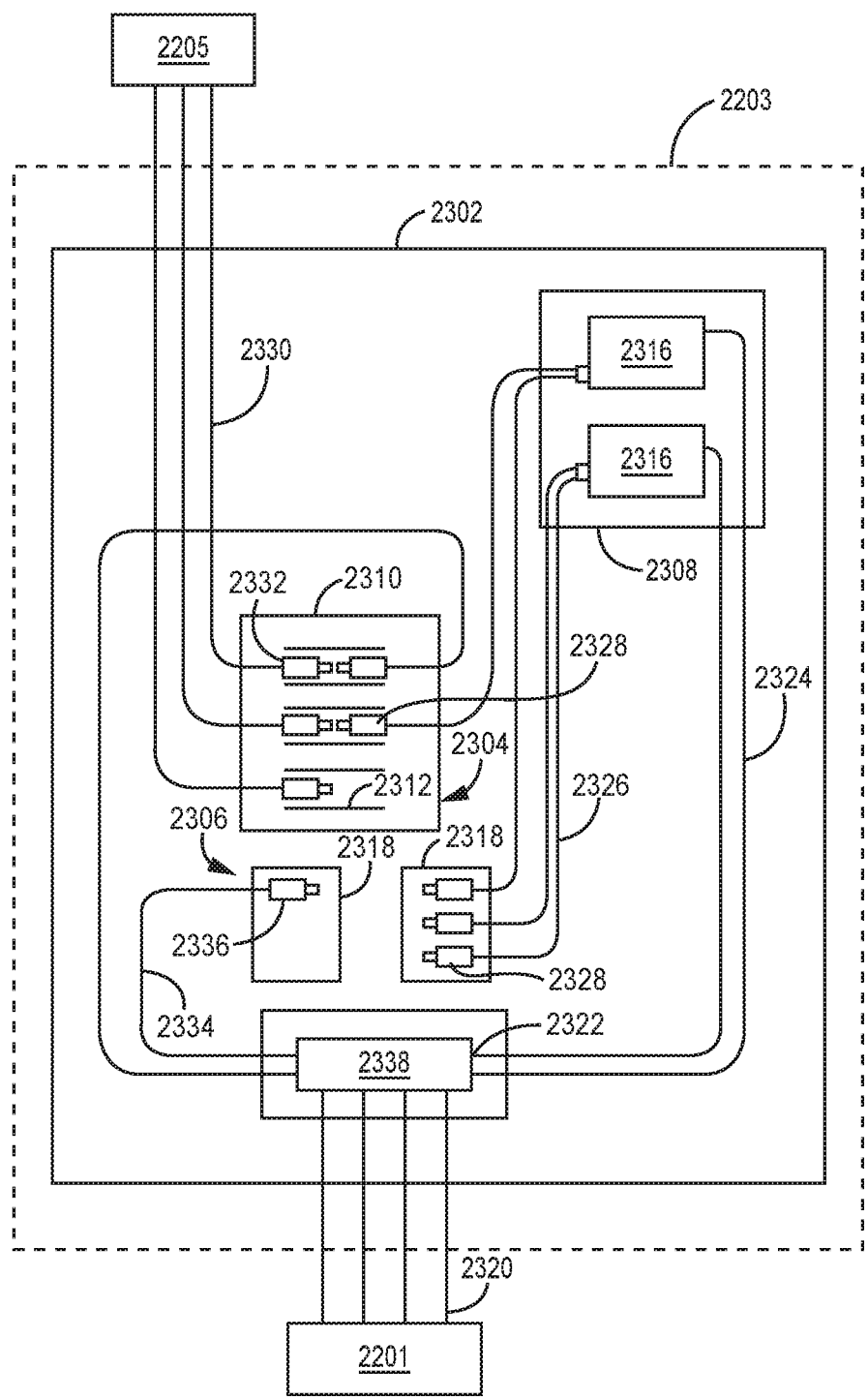
FIG. 23 is a schematic diagram showing an example cable routing scheme for the fiber distribution hubs of FIG. 23.

FIGS. 22 and 23 illustrate one example of a carrier application.

FIG. 22 illustrates a network 2200 deploying passive fiber optic lines. As shown, the network 2200 can include a central office 2201 that connects a number of end subscribers 2205 (also called end users 2205 herein) in a network. The central office 2201 can additionally connect to a larger network such as the Internet (not shown) and a public switched telephone network (PSTN). The network 2200 can also include fiber distribution hubs (FDHs) 2203 having one or more optical splitters (for example, 1-to-8 splitters, 1-to-16 splitters, or 1-to-32 splitters) that generate a number of individual fibers that may lead to the premises of an end user 2205. The various lines of the network 2200 can be aerial or housed within underground conduits.

The portion of the network 2200 that is closest to central office 2201 is generally referred to as the F1 region, where F1 is the "feeder fiber" from the central office 2201. The portion of the network 2200 closest to the end users 2205 can be referred to as an F2 portion of network 2200. The network 2200 includes a plurality of break-out locations 2202 at which branch cables are separated out from the main cable lines. Branch cables are often connected to drop terminals 2204 that include connector interfaces for facilitating coupling of the fibers of the branch cables to a plurality of different subscriber locations 2205.

Splitters used in an FDH 2203 can accept a feeder cable F1 having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 2203 as required.

FIG. 23 is a schematic diagram showing an example cable routing scheme for the FDH 2203.

The FDH 2203 generally administers connections at a termination panel between incoming fiber and outgoing fiber in an Outside Plant (OSP) environment. As the term is used herein, "a connection" between fibers includes both direct and indirect connections. Examples of incoming fibers include the feeder cable fibers that enter the cabinet and intermediate fibers (for example, connectorized pigtails extending from splitters and patching fibers/jumpers) that connect the feeder cable fiber to the termination panel. Examples of outgoing fibers include the subscriber cable fibers that exit the cabinet and any intermediate fibers that connect the subscriber cable fibers to the termination panel. The FDH 2203 provides an interconnect interface for optical transmission signals at a location in the network where operational access and reconfiguration are desired. For example, as noted above, the FDH 2203 can be used to split the feeder cables and terminate the split feeder cables to distribution cables routed to subscriber locations. In addition, the FDH 2203 is designed to accommodate a range of alternative sizes and fiber counts and support factory installation of pigtails, fanouts and splitters.

As shown at FIG. 23, a feeder cable 2320 is initially routed into the FDH 2203 through a cabinet 2302. In certain embodiments, the fibers of the feeder cable 2320 can include ribbon fibers. An example feeder cable 2320 may include twelve to forty-eight individual fibers connected to a service provider central office 2201. In some embodiments, after entering the cabinet 2302, the fibers of the feeder cable 2320 are routed to a feeder cable interface 2338 (for example, fiber optic adapter modules, a splice tray, etc.). At the feeder cable interface 2338, one or more of the fibers of the feeder cable 2320 are individually connected to separate splitter input fibers 2324. The splitter input fibers 2324 are routed from the feeder cable interface 2338 to the splitter module housing 2308. At the splitter module housing 2308, the splitter input fibers 2324 are connected to separate splitter modules 2316, wherein the input fibers 2324 are each split into multiple pigtails 2326, each having connectorized ends 2328. In other embodiments, however, the fibers of the feeder cable 2320 can be connectorized and can be routed directly to the splitter modules 2316 thereby bypassing or eliminating the need for an intermediate feeder cable interface 2338.

When the pigtails 2326 are not in service, the connectorized ends 2328 can be temporarily stored on a storage module 2318 that is mounted at the storage region 2306 of the cabinet 2302. When the pigtails 2326 are needed for service, the pigtails 2326 are routed from the splitter modules 2316 to a termination module 2310 that is provided at the termination region 2304 of the cabinet 2302. At the termination module 2310, the pigtails 2326 are connected to the fibers of a distribution cable 2330. The termination panel is the dividing line between the incoming fibers and the outgoing fibers. A typical distribution cable 2330 forms the F2 portion of a network (see FIG. 22) and typically includes a plurality of fibers (for example, 144, 216 or 432 fibers) that are routed from the FDH 2203 to subscriber locations 2205. Cables 2330 with connectorized ends 2332 connect to the connectorized ends 2328 of the pigtails 2326 at fiber optic adapters 2312.

In some embodiments, one or more of the fibers of the feeder cable 2320 are not connected to any of the splitter modules 2316. Rather, these fibers of the feeder cable 2320 are connected to pass-through fibers 2334 having connectorized ends 2336. The pass-through fibers 2334 are connected to the termination modules 2310, without first connecting to the splitter modules 2316. By refraining from splitting a fiber 2334, a stronger signal can be sent to one of the subscribers. The connectorized ends 2336 of the pass-through fibers 2334 can be stored at the storage region 2306 when not in use. Cables 2330 with connectorized ends 2332 connect to the connectorized ends 2336 of the pass-through fibers 2334 at the fiber optic adapters 2312. The feeder interface device 2338 includes connections 2322 for connecting the various cables, such as with splices or connectorized ends and adapters like connectorized ends 2328 and 2336 and adapters 2312 noted above.

The various segments of physical communication media that are used in the network 2200 of FIGS. 22-23 can have identifier and attribute information stored in or on them. For example, the various connectorized fibers described above in connection with FIGS. 22-23 can be outfitted with storage devices and the corresponding termination modules (and other attachment points) can include corresponding media reading interfaces to read at least a portion of the identifier and attribute information stored in each of the storage devices. The identifier and attribute information that is read from the storage devices can be communicated to an aggregation point for use as described herein (using a suitable communication link such as a wireless or wired communication link). Other physical layer information (for example, information about the termination modules, spliters, cabinets, and other devices in the network and information about the locations in which they are deployed) can also be provided to such an aggregation point for use thereby.

In another example, the physical layer information obtained using the techniques described here is used by a telecommunications carrier to assist fulfilling service level agreements. For example, as noted above, the physical layer information can be used to determine if a given logical communication link has been implemented using appropriate physical communication media (for example, CAT-6 cabling in ETHERNET in the First Mile (EFM) applications or the appropriate type of fiber). This may be especially important at the demarcation point between the telecommunication carrier's equipment and the customer's equipment. Also, physical layer information can be used to determine if unauthorized changes have been made at the demarcation point.

In another example, the physical layer information obtained using the techniques described here is used by a telecommunications carrier to implement differentiated service levels. For example, where certain customers require their communications traffic to travel through certain geographic regions (for example, to comply with export control laws), a carrier can use the physical layer information obtained using the techniques described here to route the customers' traffic in compliance with the customers' requirements. In another example, each routing point, site, building, etc. is assigned a security score, and certain communication traffic is routed only through routing points, sites, buildings, etc. that have a security score at or above a certain level.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system comprising:
   a switch used in a network;
   a central function configured to receive physical layer information related to the network, the physical layer information including information associating media access control (MAC) addresses of devices on the network with ports of the switch;
   wherein the central function is configured to determine a spanning tree for the network; and
   wherein the central function is configured to communicate information about the spanning tree to the switch;
   wherein the switch is configured to use the information about the spanning tree determined by the central function to configure the switch to carry out a switching function performed by the switch;
   wherein the central function is configured to receive at least some of the physical layer information about the network from an aggregation point;
   wherein the aggregation point obtains physical layer information about patching equipment in the network and end devices in the network; and
   wherein the central function is configured to use at least some of the physical layer information about the patching equipment in the network and the end devices in the network in associating MAC addresses of devices on the network with the ports of the switch.

2. The system of claim 1, wherein the central function is implemented in a network management system for the network.

3. The system of claim 1, wherein the switch uses a forwarding database to carry out the switching function at the switch;
   wherein the central function is further configured to determine how the forwarding database in the switch should be configured;
   wherein the central function is configured to communicate, to the switch, information indicating how the forwarding database in the respective switch should be configured; and
   wherein the switch configures the forwarding database for the respective switch as indicated by the information communicated to the switch by the central function.

4. The system of claim 1, wherein the switch comprises at least one of a LAYER 1 device, a LAYER 2 device, and a LAYER 3 device.

5. The system of claim 1, wherein the central function is configured to obtain information about the MAC addresses of devices on the network from a network management system.

6. The system of claim 1, wherein at least some of the physical layer information comprises information read from storage devices associated with connectors attached to at least some of cables used in the network; and
   wherein the central function is configured to determine the spanning tree for the network using the information read from at least some of said storage devices.

7. A system comprising:
   a switch used to implement a network;
   a central function configured to receive physical layer information related to the network, the physical layer information including information associating media access control (MAC) addresses of devices on the network with ports of the switch;
   wherein the central function is configured to determine a spanning tree for the network; and
   wherein the central function is configured to communicate information about the spanning tree to the switch;
   wherein the switch is configured to use the information about the spanning tree determined by the central function to configure the switch to carry out a switching function performed by the switch;
   wherein the central function is configured to receive at least some of the physical layer information about the network from an aggregation point;
   wherein the aggregation point obtains physical layer information about patching equipment in the network and cables in the network; and
   wherein the central function is configured to use at least some of the physical layer information about the patching equipment in the network and the cables in the network in associating MAC addresses of devices on the network with the ports of the switch.

8. The system of claim 7, wherein the central function is implemented in a network management system for the network.

9. The system of claim 7, wherein the switch uses a respective forwarding database to carry out the switching function;
   wherein the central function is further configured to determine how the forwarding database in the switch should be configured;

wherein the central function is configured to communicate, to the switch, information indicating how the forwarding database in the switch should be configured; and wherein the switch configures the forwarding database as indicated by the information communicated to the switch by the central function.

10. The system of claim 7, wherein the switch comprises at least one of a LAYER 1 device, a LAYER 2 device, and a LAYER 3 device.

11. The system of claim 7, wherein the central function is configured to obtain information about the MAC addresses of devices on the network from a network management system.

12. The system of claim 7, wherein at least some of the physical layer information comprises information read from storage devices associated with connectors attached to at least some of the cables used in the network; and
wherein the central function is configured to determine the spanning tree for the network using the information read from at least some of said the storage devices.

13. A system comprising:
an internetworking device used to implement a network, the internetworking device comprising a plurality of ports;
patching equipment used to implement the network;
a management system configured to receive physical layer information related to the network, the physical layer information including information associating media access control (MAC) addresses of devices on the network with the ports of the internetworking device;
wherein the management system is configured to determine a configuration for the internetworking device; and
wherein the management system is configured to communicate information about the configuration to the internetworking device;
wherein the internetworking device is configured to use the configuration determined by the management system to configure the internetworking device to carry out a switching function performed by the internetworking device;
wherein the management system is configured to receive at least some of the physical layer information from at least one aggregation point;
wherein the at least one aggregation point obtains physical layer information about the patching equipment in the network and cables in the network; and
wherein the management system is configured to use at least some of the physical layer information about the patching equipment in the network and the cables in the network in associating MAC addresses of devices on the network with the ports of the internetworking devices.

14. The system of claim 13, wherein the management system is implemented in a network management system for the network.

15. The system of claim 13, wherein the internetworking device uses a forwarding database to carry out the switching function;
wherein the management system is further configured to determine how the forwarding database in the internetworking device should be configured;
wherein the management system is configured to communicate, to the internetworking device, information indicating how the forwarding database in the internetworking device should be configured; and
wherein the internetworking device configures the forwarding database as indicated by the configuration communicated to the internetworking device by the management system.

16. The system of claim 13, wherein internetworking device comprises at least one of a LAYER 1 device, LAYER 2 device, and LAYER 3 device.

17. The system of claim 13, wherein the management system is configured to obtain information about the MAC addresses of devices on the network from a network management system.

18. The system of claim 13, wherein at least some of the physical layer information comprises information read from storage devices associated with connectors attached to at least some of the cable in the network; and
wherein the management system is configured to determine the configuration using the information read from at least some of said storage devices.

* * * * *